United States Patent
Adams

(10) Patent No.: US 9,947,423 B2
(45) Date of Patent: *Apr. 17, 2018

(54) NANOFUEL INTERNAL ENGINE

(71) Applicant: GLOBAL ENERGY RESEARCH ASSOCIATES, LLC, Saratoga Springs, NY (US)

(72) Inventor: Mark Lloyd Adams, Saratoga Springs, NY (US)

(73) Assignee: Global Energy Research Associates, LLC, Saratoga Springs, NY (US)

( * ) Notice: Subject to any disclaimer, the term of this patent is extended or adjusted under 35 U.S.C. 154(b) by 118 days.

This patent is subject to a terminal disclaimer.

(21) Appl. No.: 15/167,900

(22) Filed: May 27, 2016

(65) Prior Publication Data

US 2017/0069402 A1   Mar. 9, 2017

Related U.S. Application Data

(63) Continuation-in-part of application No. 13/974,045, filed on Aug. 23, 2013, and a continuation-in-part of
(Continued)

(51) Int. Cl.
*G21D 5/02* (2006.01)
*F02B 53/02* (2006.01)
(Continued)

(52) U.S. Cl.
CPC ............... *G21D 5/02* (2013.01); *F02B 37/00* (2013.01); *F02B 53/02* (2013.01); *F02B 53/10* (2013.01);
(Continued)

(58) Field of Classification Search
CPC .......... F02B 53/00; F02B 53/02; F02B 53/12; F02B 55/02; F02B 2201/00–2201/066; Y02T 70/5227
(Continued)

(56) References Cited

U.S. PATENT DOCUMENTS 2,846,021 A  8/1958 Encinas
2,894,891 A  7/1959 Grebe
(Continued)

FOREIGN PATENT DOCUMENTS

CA  2491352 C  7/2012
CN  103603692 A  2/2014
(Continued)

OTHER PUBLICATIONS

Neutron flux. (Dec. 25, 2016). In Wikipedia, The Free Encyclopedia. Retrieved 00:52, Dec. 25, 2016, from https://en.wikipedia.org/w/index.php?title=Neutron_flux&oldid=756541240.
(Continued)

*Primary Examiner* — Laert Dounis
(74) *Attorney, Agent, or Firm* — ATFirm PLLC; Ralph P. Albrecht

(57) ABSTRACT

A nanofuel engine including an inventive nanofuel internal engine, whereby nuclear energy is released in the working fluid and directly converted into useful work, with the qualities of an economical advanced small modular gaseous pulsed thermal reactor. Scientific feasibility is established by studying the behavior of nuclear fuels in configurations designed to support a fission chain reaction. Nanofuel is defined as nuclear fuel suitable for use in an internal engine, comprised of six essential ingredients, and can be created from clean fuel or from the transuranic elements found in light-water reactor spent nuclear fuel in a proliferation resistant manner. Three essential ingredients ensure the nanofuel is inherently stable, due to a negative temperature coefficient of reactivity. Reciprocating and Wankel (rotary) internal engine configurations, which operate in an Otto cycle, are adapted to support a fission chain reaction. Dynamic engine cores experience a decrease in criticality as the engine piston or rotor moves away from the top dead
(Continued)

center position. In this inherent safety feature, the increase in engine core volume decreases the nanofuel density and increases the neutron leakage. Technological feasibility is demonstrated by examining potential engineering limitations. The nanofuel internal engine can be operated in two modes: spark-ignition with an external neutron source such as a fusion neutron generator; and compression-ignition with an internal neutron source. The structural integrity can be maintained using standard internal combustion engine design and operation practices. The fuel system can be operated in a closed thermodynamic cycle, which allows for complete fuel utilization, continuous refueling, and easy fission product extraction. Nanofuel engine power plant configurations offer favorable economic, safety, and waste management attributes when compared to existing power generation technology. The initial (first-of-a-kind) overnight capital cost is approximately $400 per kilowatt-electric. Obvious safety features include an underground installation, autonomous operation, and an ultra-low nuclear material inventory.

20 Claims, 20 Drawing Sheets

Related U.S. Application Data application No. PCT/US2014/041769, filed on Aug. 20, 2014.

(60) Provisional application No. 62/167,278, filed on May 28, 2015.

(51) Int. Cl.

| F02B 37/00 | (2006.01) |
|---|---|
| G21C 3/42 | (2006.01) |
| F02B 53/12 | (2006.01) |
| F02B 53/10 | (2006.01) |
| F02B 55/14 | (2006.01) |
| F02P 23/04 | (2006.01) |
| G21C 1/32 | (2006.01) |
| G21C 19/42 | (2006.01) |
| G21C 5/12 | (2006.01) |
| F02B 53/00 | (2006.01) |
| B63G 8/08 | (2006.01) |
| B64G 1/40 | (2006.01) |

(52) U.S. Cl.
CPC .............. *F02B 53/12* (2013.01); *F02B 55/14* (2013.01); *F02P 23/04* (2013.01); *G21C 1/32* (2013.01); *G21C 3/42* (2013.01); *G21C 19/42* (2013.01); *B63G 8/08* (2013.01); *B64G 1/408* (2013.01); *F02B 2053/005* (2013.01); *G21C 5/12* (2013.01); *Y02E 30/37* (2013.01); *Y02E 30/38* (2013.01); *Y02T 10/144* (2013.01)

(58) Field of Classification Search
USPC ................ 123/1 A, 304, 575, 179.7–179.15
See application file for complete search history.

(56) References Cited

U.S. PATENT DOCUMENTS

| 3,160,568 | A | 12/1964 | Macfarlane | |
|---|---|---|---|---|
| 3,379,191 | A | 4/1968 | Harvey | |
| 3,549,490 | A | 12/1970 | Moore | |
| 3,793,832 | A | 2/1974 | Moon | |
| 3,848,574 | A | 11/1974 | Fujikawa et al. | |
| 3,907,468 | A | 9/1975 | Green | F01C 21/06 123/41.1 |
| 4,024,217 | A | 5/1977 | Wexler et al. | |
| 4,075,057 | A | 2/1978 | Fletcher et al. | |
| 4,251,321 | A | 2/1981 | Crowther | |
| 4,304,627 | A | 12/1981 | Lewis | |
| 4,710,222 | A | 12/1987 | Fitzpatrick et al. | |
| 5,513,226 | A | 4/1996 | Baxter et al. | |
| 5,660,038 | A | 8/1997 | Stone | |
| 6,935,304 | B1 | 8/2005 | Liu | |
| 7,055,327 | B1 | 6/2006 | Pekrul | |
| 7,350,493 | B2 | 4/2008 | Scarisbrick et al. | |
| 7,685,817 | B2 | 3/2010 | Carrott | |
| 8,100,097 | B2 | 1/2012 | Takahashi et al. | |
| 8,192,704 | B1 | 6/2012 | Kim | |
| 8,360,759 | B2 | 1/2013 | Pekrul | |
| 8,360,760 | B2 | 1/2013 | Pekrul | |
| 8,517,705 | B2 | 8/2013 | Pekrul | |
| 8,523,547 | B2 | 9/2013 | Pekrul | |
| 8,647,088 | B2 | 2/2014 | Pekrul | |
| 8,689,765 | B2 | 4/2014 | Pekrul | |
| 8,749,079 | B1 | 6/2014 | Dunn | |
| 8,794,943 | B2 | 8/2014 | Pekrul | |
| 8,800,286 | B2 | 8/2014 | Pekrul | |
| 8,833,338 | B2 | 9/2014 | Pekrul | |
| 2002/0080907 | A1 | 6/2002 | Rubbia | |
| 2008/0247897 | A1 | 10/2008 | Guthrie | |
| 2009/0277157 | A1 | 11/2009 | Martin | B03C 1/0332 60/275 |
| 2009/0323885 | A1 | 12/2009 | Bowman | |
| 2010/0061501 | A1 | 3/2010 | Vandergheynst | |
| 2011/0044416 | A1 | 2/2011 | Cabello et al. | |
| 2011/0165007 | A1 | 7/2011 | Pekrul | |
| 2011/0171051 | A1 | 7/2011 | Pekrul | |
| 2011/0206173 | A1 | 8/2011 | Walters | |
| 2011/0250108 | A1 | 10/2011 | Collins | |
| 2011/0281679 | A1 | 11/2011 | Larrabee et al. | |
| 2012/0121477 | A1 | 5/2012 | Ali et al. | |
| 2013/0005200 | A1 | 1/2013 | Mayburd | |
| 2013/0028364 | A1 | 1/2013 | Rubbia | |
| 2013/0028772 | A1 | 1/2013 | Julien | |
| 2013/0300121 | A1 | 11/2013 | Ali et al. | |
| 2015/0052886 | A1 | 2/2015 | Adams | |

FOREIGN PATENT DOCUMENTS

| DE | 102009029950 A1 | 8/2011 |
|---|---|---|
| EP | 1016785 A1 | 7/2000 |
| WO | WO 1999045545 A8 | 3/2000 |
| WO | WO 2007104831 A1 | 9/2007 |
| WO | WO2011133296 A1 | 10/2011 |
| WO | WO2013007989 A1 | 1/2013 |
| WO | WO 2013063860 A1 | 5/2013 |
| WO | WO 2013050852 A3 | 11/2013 |
| WO | PCT/US14/51769 | 8/2014 |
| WO | WO 2015/026878 | 2/2015 |

OTHER PUBLICATIONS

Plutonium-239. (Jan. 9, 2017). In Wikipedia, The Free Encyclopedia. Retrieved 16:19, Jan. 9, 2017, from https://en.wikipedia.org/w/index.php?title=Plutonium-239&oldid=759165262.

Measurements of the 14 MeV Fission Cross-Sections for 235U and 239pu. M. Mandavi and G. F. Knoll. The University of Michigan and The University of New Mexico. pp. 58-61. 1983.

Walden, Robert P., "A study of Nuclear Power Plant Construction in The United States," University of Florida, Summer 1991.

Thom, K. et al., "Gaseous-Fuel Nuclear Reactor Research for Multimegawatt Power in Space," Sep. 1, 1977.

S. Inwood. "Program on technology innovation: Integrated generation technology options," Technical Report 1022782, EPRI, Jun. 2011.

Thom, K and Schneider, R .T., "*Fissioning Uranium Plasmas,*" *Nuclear Data in Science and Technology*, vol. 1, 1973, International Atomic Energy Agency, Vienna Proceedings of a symposium, Paris, Mar. 12-16, 1973, pp. 15- 20, 29-34, FIG 5.

(56) References Cited

OTHER PUBLICATIONS

Miller, B. E., et al, "*Ballistic piston fissioning plasma experiment*," Jan. 1, 1971.
Schnitzler, B. G. et al, "*Application of Gaseous Core Reactors for Transmutation of Nuclear Waste*," Sep. 1, 1976.
Thom, K. et al., "*Physics and potentials of fissioning plasmas for space power and propulsion*," Aug. 1, 1976. Published by Elsevier Ltd.
U.S. Department of Energy, "*International Energy Outlook 2008*," Sep. 2008.
S. Solomon et al., "*Climate Change 2007: The Physical Science Basis. Contribution of Working Group I to the Fourth Assessment Report of the Intergovernmental Panel on Climate Change*," Cambridge University Press, New York, 2007.
Gal Luft and Anne Korin, "*Energy Security Challenges for the 21st Century: A Reference Handbook*," Praeger Publisher, Santa Barbara, 2009.
James J. Duderstadt and Louis J. Hamilton. *Nuclear Reactor Analysis*. John Wiley & Sons,New York, 1976.
Charles Fayette Taylor, "*The Internal-Combustion Engine in Theory and Practice; vol. I: Thermodynamics, Fluid Flow, Performance*," The M.I.T. Press, Cambridge, second revised edition, 1985.
J.M. Deutch et al, "*Update of the MIT 2003 future of nuclear power*," Technical report, MIT, 2009.
A.M. Weinberg, "The second nuclear era," *Bull. N.Y. Acad. Med.*, 59(10):1048{1059, 1983.
Alvin M. Weinberg et al., "*The Second Nuclear Era: A New Start for Nuclear Power*," Greenwood Publishing Group, Westport, CT, 1985.
Jonathan Koomey and Nathan E. Hultman. *A reactor-level analysis of busbar costs for US nuclear plants, 1970-2005. Energ. Policy*, 35:5630{5642, 2007.
Robert Rosner et al, *Analysis of GW-scale overnight capital costs*. Technical report, University of Chicago, EPIC, Nov. 2011.
J. Hempstead et al, D., "*New nuclear generation: Ratings pressure increasing*," Technical report, Moody's Investors Service, Jun. 2009.
William D. Magwood, "Report to congress on small modular nuclear reactors," Technical report, DOE, May 2001.
D.T. Ingersol, "*Deliberately small reactors and the second nuclear era,*" *Prog. Nucl. Energy*, 51:589-603, 2009.
Joseph A. Pettibone, "*A novel scheme for making cheap electricity with nuclear energy*." Technical Report UCID-18153, LLNL, Aug. 1979.
Joseph S. Pettibone, "*A novel scheme for making cheap electricity with nuclear energy*," Technical Report UCRL-JC-107068, LLNL, Apr. 1991.
Peter Alesso et al, "*Inherently safe nuclear-driven internal combustion engines*," Technical Report UCRLJC-107417, LLNL, Jun. 1991.
John Heidrich et al., "*Gaseous core nuclear-driven engines featuring a self-shuto_mechanism to provide nuclear safety*," Technical Report UCRL-JC-108959, LLNL, Nov. 1991.
John Heidrich, "Nuclear-driven technologies that could reduce the cost of electricity by several fold." Technical Report UCRL-JC-108960, LLNL, Nov. 1991.
Bussard, RW, "Concepts for Future Nuclear Rocket Propulsion," Los Alamos Scientific Laboratory, Jet Propulsion, Published Apr. 1958.
"Energy policy act of 2005," Aug. 2005. United States Public Law 109-58.
U.S. Department of Energy, Loan Programs Office: http://lpo.energy.gov/, http://energy.gov/lpo/loan-programs-office.

T.P. Wright, "*Factors Affecting the Cost of Airplanes*," Journal of Aeronautical Science, 4(4):122{128, 1936. http://arc.aiaa.org/doi/abs/10.2514/8.155.
"An examination of the safety and economics of light water small modular reactors," United States Senate Hearing on Jul. 14, 2011.
U.S. Energy Information Administration. "*Average Retail Price of Electricity to Ultimate Customers by End-Use Sector*," by State, Mar. 2011.
Samuel Glasstone and Milton C. Edlund. "The elements of nuclear reactor theory," Part I. Technical Report 1099, ORNL, 1952.
Robert V. Meghreblian and David K. Holmes. "*Reactor Analysis*," McGraw-Hill Book Company, New York, 1960.
Weston M. Stacey. "*Nuclear Reactor Physics*," Wiley-VHC Verlag GmbH & Co., Germany, second edition, 2007.
E.R. Jette, J.F. Lemons, and A.E. Florin. "Plutonium hexafluoride: second report on the preparation and properties," Technical Report LA-1168, LANL, Nov. 1950.
Bernard Weinstock and John G. Malm. "The properties of plutonium hexafluoride," Journal of Inorganic and Nuclear Chemistry, 2:380-394, 1956.
R.J. Howerton, D.E. Cullen, R.C. Haight, M.H. MacGregor, S.T. Perkins, and E.F. Plechaty, "The LLL evaluated nuclear data library (ENDL): Evaluation techniques, reaction index, and descriptions of individual evaluations," Technical Report UCRL-50400, vol. 15, Part A, LLNL, Sep. 1975, report in series, 21 volumes, vol. 15 has 5 parts, vol. 4, general ENDL reference, includes listing of all reports.
P.F. Rose. ENDF-201, ENDF/B-VI Summary Documentation. "Technical Report BNL-NCS-17541," BNL Brookhaven National Laboratory, National Nuclear Data Center:http://www.nndc.bnl.gov/., Oct. 1991.
L.J.,Templin. "Reactor physics constants." Technical Report 5800, ANL, Jul. 1963, excerpt.
S. Bays, H. Zhang, and M. Pope. "Deep burn fuel cycle integration: Evaluation of two-tier scenarios," Technical Report INL/EXT-09-15915, INL, May 2009.
Vladimir Kuznetsov and Alexey Lokhov. "Current status, technical feasibility and economics of small nuclear reactors," Technical report, NEA, Jun. 2011.
"*A technology roadmap for Generation IV nuclear energy systems*," Dec. 2002. U.S. DOE Nuclear Energy Research Advisory Committee and the Generation IV International Forum, DOE.
Charles G. Bathke, et al, "The attractiveness of materials in advanced nuclear fuel cycles for various proliferation and theft scenarios," Technical Report LA-UR-09-02466, LANL, 2009.
George I. Bell, "Calculations of the critical mass of UF6 as a gaseous core, with reflectors of D2O, Be and C," Technical Report LA-1874, LANL, Feb. 1955.
L.D. Landau and E.M. Lifshitz, "Theory of Elasticity (Course of Theoretical Physics; vol. 7)," Pergamon Press, Boston, third edition, 1986.
ING-103, Neutron Generator is available from the All-Russia Research Institute of Automatics: http://www.vniia.ru/.
N550 Neutron Generator is available from the Activation Technology Corporation:http://www.atcng.com/n550.htm Apr. 26, 2005 accessed on Archive.org.
J.W. Mather, "Investigation of the high-energy acceleration mode in the coaxial gun," Phys. Fluids, 7(11):S28{S34, 1964.
J.W. Mather, "Formation of a high-density deuterium plasma focus," *Phys. Fluids*, 8(2):366-377, 1965.
J.W. Mather, "Dense plasma focus," *In Methods of Experimental Physics*, vol. 9, pp. 187-249. 1971.
L. Michel, K.H. Schonbach, and Heinz Fischer, "Neutron emission from a small 1-kJ plasma focus," *Appl. Phys. Lett.*, 24(2):57{59, 1974.
G. Decker, W. Kies, and G. Pross. The first and the final nanoseconds of a fast focus discharge. *Phys. Fluids*, 26(2):571{578, 1983.
G. Decker, W. Kies, M. Malzig, C. van Calker, and G. Ziether, "High performance 300 kV driver speed 2 for MA pinch discharges," *Nucl. Instrum. Meth. A*, 249:477-483, 1986.
Ragheb, M, "*One group reactor theory. Nuclear Power Engineering*," May 27, 2013 Dec. 4, 2014.
K. Thom, "*Review of Fission Engine Concepts*," vol. 9, No. 9 Sep. 1972.
U.S. Dept. of Energy, "*International Energy Outlook 2011*," Sep. 2011.

NANOFUEL INTERNAL ENGINE

CROSS-REFERENCE TO RELATED APPLICATIONS

This application is 1) a continuation-in-part of, and claims priority under 35 U.S.C. § 120 to, U.S. patent application Ser. No. 13/974,045, filed on Aug. 23, 2013, entitled "Nanofuel Engine Apparatus and Nanofuel," to Mark L. Adams; and is also 2) a NonProvisional patent application of, and claims the benefit under 35 U.S.C. § 119(e) of, U.S. Provisional Patent Application Ser. No. 62/167,278, filed May 28, 2015, entitled "Nanofuel Internal Engine," also to Mark L. Adams; and 3) is related to International Patent Cooperation Treaty (PCT) Patent Application Serial No. PCT/US2014/51769 filed Aug. 20, 2014 with Applicant Global Energy Research Associates, LLC; all of which are of common Applicant and Assignee, namely Global Energy Research Associates, LLC of Saratoga Springs, N.Y. USA, to the present invention, the contents of all of which patent applications, are incorporated herein by reference in their entireties, as if they were included inserted herein. While various embodiments of the present invention have been described above, it should be understood that they have been presented by way of example only, and not limitation. Thus, the breadth and scope of the present invention should not be limited by any of the above described exemplary embodiments, but should instead be defined only in accordance with the following claims and their equivalents.

BACKGROUND

Field

Embodiments of the disclosure relate generally to nanotechnology, and more particularly to energy applications of nanotechnology.

Discussion of the Related Art

After several centuries of development, conventional internal-combustion (IC) engines are now the most reliable and widely used power source in the world, as of 2013. Notable historical milestones of the IC engine include, the first gunpowder IC engine in 1678 by Christiaan Huygens and the first commercial IC engine in 1858 by Jean Lenoir.

Modern IC engines may rely on an explosive mixture of fossil fuel and air to generate heat and produce useful mechanical work. While numerous IC engine designs exist, the designs all tend to perform the following processes: intake, where a working fluid enters the engine; compression, where the working fluid experiences a decrease in volume; combustion, where the working fluid experiences a rapid increase in pressure; expansion, where the working fluid performs useful mechanical work; and exhaust, where the working fluid exits the engine.

Conventional IC engines use fossil fuels, which are a limited resource. Unfortunately, the present rate of fossil fuel use is rapidly decreasing supply. Also, the combustion of fossil fuels produces carbon dioxide ($CO_2$), which is a greenhouse gas known to have a negative impact on the environment.

It would therefore be advantageous to provide an alternative fuel to fossil fuels for use in an IC engine that is sustainable and does not produce greenhouse gas emissions.

What is needed is an improved system and method that overcomes shortcomings of conventional engines and fuels.

SUMMARY OF VARIOUS EXEMPLARY EMBODIMENTS

According to one example but nonlimiting embodiment, a nanofuel engine apparatus can include: an internal combustion engine configured to receive a nanofuel that releases nuclear energy; receive the nanofuel internal to internal combustion engine; compress the nanofuel in the nanofuel engine; and ignite the nanofuel using a neutron source, wherein the ignite comprises where the internal combustion engine is configured to: trigger a release of nuclear energy from the nanofuel.

The nanofuel engine apparatus, in an example embodiment, can include, e.g., but not limited to, where the nanofuel engine can include a rotary engine, where the rotary engine can include a rotor, wherein said rotor comprises a rotor cavity shape that comprises any of: an arbitrary shape; a cylindrical shape; an ellipsoidal shape; a rectangular shape; and/or a spherical shape, etc.; and where performance of the rotary engine is improved by decreasing said rotor cavity shape surface to volume ratio.

The nanofuel engine apparatus, in an example embodiment, can include, e.g., but not limited to, where the rotor cavity shape can include the ellipsoidal shape, where the rotary engine dimensions are dependent on the ellipsoidal shape when the rotor is in a top dead center (TDC) position, where a geometric condition arises where a rotor center-to-tip distance (Pr) depends on a minor radius (b) of the ellipsoidal shape and a reflector thickness (A) fitting between a rotor housing minor radius and an output shaft rotor journal when the rotor is in the TDC position, $$R_r = \frac{2b + \Delta}{1 - 5\left(\frac{e}{R_r}\right)},$$

where $e/R_r$ is an eccentricity ratio.

The nanofuel engine apparatus, in an example embodiment, can include, e.g., but not limited to, where the rotary engine can include a trochoid constant (K), where the K is equal to the inverse of the eccentricity ratio ($K=R_r/e$), and where as the K increases the $R_T$ decreases and the rotary engine dimensions decrease overall.

The nanofuel engine apparatus, in an example embodiment, can include, e.g., but not limited to, where the trochoid constant K is greater than 5 and less than 11 (5<K<11).

The nanofuel engine apparatus, in an example embodiment, can include, e.g., but not limited to, where, where $K=7.725+0.2105\Delta^{\square}+0.00013\Delta^2$, where $\Delta$ is in centimeters.

Another example embodiment can include, e.g., but not limited to, a method of using nanofuel in a nanofuel engine comprising: a) compressing the nanofuel in the nanofuel engine; and b) igniting the nanofuel using a neutron source, wherein said igniting can include: triggering a release of nuclear energy from the nanofuel.

The method of using the nanofuel in the nanofuel engine, in an example embodiment, can include, e.g., but not limited to, where the nanofuel engine comprises a rotary engine, wherein said rotary engine can include a rotor, where the rotor can include a rotor cavity shape that can include any of: an arbitrary shape; a cylindrical shape; an ellipsoidal shape; a rectangular shape; and/or a spherical shape, etc.; and where performance of the rotary engine is improved by decreasing the rotor cavity shape surface to volume ratio.

The method of using the nanofuel in the nanofuel engine, in an example embodiment, can include, e.g., but not limited to, where the rotor cavity shape can include the ellipsoidal shape, where the rotary engine dimensions are dependent on the ellipsoidal shape when the rotor is in a top dead center (TDC) position, where a geometric condition arises where a rotor center-to-tip distance ($R_r$) depends on a minor radius (b) of the ellipsoidal shape and a reflector thickness ($\Delta$) fitting between a rotor housing minor radius and an output shaft rotor journal when the rotor is in the TDC position, $$R_r = \frac{2b + \Delta}{1 - 5\left(\frac{e}{R_r}\right)},$$

where $e/R_r$ is an eccentricity ratio.

The method of using the nanofuel in the nanofuel engine, in an example embodiment, can include, e.g., but not limited to, where the rotary engine can include a trochoid constant (K), where the K is equal to the inverse of the eccentricity ratio ($K=R_r/e$), and where as the K increases the $R_T$ decreases and the rotary engine dimensions decrease overall.

The method of using the nanofuel in the nanofuel engine, in an example embodiment, can include, e.g., but not limited to, where the trochoid constant K is greater than 5 and less than 11 (5<K<11).

The method of using the nanofuel in the nanofuel engine, in an example embodiment, can include, e.g., but not limited to, where the $K=7.725+0.2105\Delta^{\square}+0.00013\Delta^2$, where $\Delta$ is in centimeters.

According to another example embodiment, a nanofuel may include: a fissile fuel, where the fissile fuel may include: a nuclide that may undergo neutron induced fission; a passive agent, where the passive agent may include: a nuclide which may include a strong resonance neutron absorption cross-section in a low epithermal energy range; and a moderator, where the moderator may include: a low atomic number element.

BRIEF DESCRIPTION OF DRAWINGS

The drawings are set forth below:

FIGS. 23A, 23B, 23C, 23D, 23E, and 23F depict exemplary Wankel nanofuel engine simulation geometry snapshots, according to an exemplary embodiment;

1 INTRODUCTION

Figure 1:
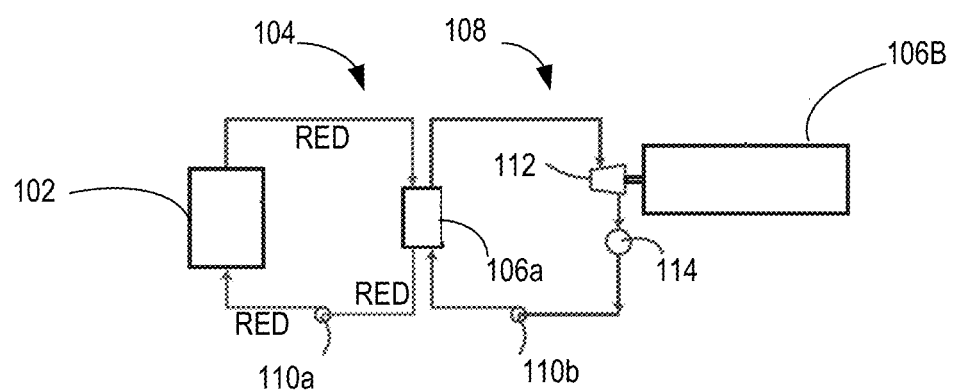
FIG. 1 depicts an exemplary simplified two-loop Rankine cycle for a pressured water reactor (PWR) nuclear power plant, according to an exemplary embodiment.

This disclosure presents an inventive nanofuel internal engine (see, e.g., FIGS. 2, 5, 6, 17-23, and 27 and engine 502, 2702), whereby nuclear energy is released in the working fluid and directly converted into useful work, that has favorable economics, safety, and waste management attributes when compared to existing power generation technology (see, e.g., FIG. 1 for comparison).

During the Industrial Revolution new devices that converted chemical energy into economically useful work begat new manufacturing processes. Launching the Industrial Revolution, Antoine-Laurent Lavoisier, the recognized father of modern chemistry, put forth the theory of combustion and other scientific advances that are vital to the general understanding of chemical energy. In concert, the firm of Boulton & Watt, founded by industrialist Matthew Boulton and engineer James Watt in 1775, successfully commercialized their Watt engine and completely reshaped the energy industry.

Lavoisier's work was a paradigm shifting scientific achievement at the end of the eighteenth century. As described by Thomas S. Kuhn in *The structure of scientific revolutions*, it redefined the legitimate problems and research methods for succeeding generations of practitioners. (Thomas S. Kuhn. *The structure of scientific revolutions*. The University of Chicago Press, Chicago, fourth edition, 2012.) In a similar fashion, one goal of this paper is to create a local paradigm shift in the energy industry by formulating the scientific basis of a nuclear powered internal engine.

According to Kuhn (Thomas S. Kuhn. *The structure of scientific revolutions*. The University of Chicago Press, Chicago, fourth edition, 2012.), a necessary condition for a new paradigm is that the work must be:

1. sufficiently unprecedented to attract an enduring group of adherents away from competing modes of scientific activity; and
2. sufficiently open-ended to leave all sorts of problems for the redefined group of practitioners to solve.

In an effort to attract adherents, this paper culminates with the presentation of a Wankel engine that is powered by nuclear waste or, more specifically, the transuranic elements from existing commercial light-water reactor (LWR) spent nuclear fuel (SNF). Leaving all sorts of problems for future practitioners, this paper uses proven research methods in nuclear engineering to establish a solid technological foundation for the nanofuel internal engine and frame legitimate problems for future exploration.

Boulton & Watt's steam engine produced economically useful work and disrupted the energy industry at the end of the eighteenth century. First, the Watt engine introduced a 75% increase in fuel efficiency over the incumbent Newcomen steam engine. In a bold business move, instead of licensing their engines, Boulton & Watt offered customers a royalty arrangement that amounted to one-third of the fuel savings. The initial Watt engine offered miners the ability to pump water at half the pervious fuel cost with no capital expenditure for new equipment. Second, through a series of engineering improvements the Watt engine operated as a reliable rotative engine for the rapidly growing textile industry. This innovation displaced the water wheel as the main source of industrial power, reduced the geographical constraints for factories, and ultimately catapulted Europe out of the Dark Ages. (Maury Klein. *The power makers: steam, electricity, and the men who invented modern America*. Bloomsbury Press, New York, 2008.)

The Watt engine was a commercial success because it had a significant economical advantage over existing engine options. In a similar fashion, another goal of this paper is to establish the nanofuel internal engine as a device capable of converting nuclear energy into economically useful work. Analogous to the Watt engine at the end of the eighteenth century, this energy innovation can disrupt the entire energy industry at the beginning of the twenty-first century and improve the quality of life for present and future generations around the world.

In normal pedagogical fashion, the remainder of this introduction presents a view on the current economic status of commercial nuclear power plant deployment, reviews the history of nuclear powered internal engines, and outlines the sections that follow.

1.1 Economics

Alvin M. Weinberg defined the first nuclear era as the time period covering the initial growth of nuclear technology. (Alvin M. Weinberg. The second nuclear era. *Bulletin of the New York Academy of Medicine*, 59(10): 1048-1059, 1983. Alvin M. Weinberg, Irving Spiewak, Jack N. Barkenbus, Robert S. Livingston, and Doan L. Phung. *The second nuclear era: a new start for nuclear power*. Praeger Publishers, Westport, Conn., 1985.) The first nuclear era lasted over 50 years, witnessed the construction of approximately 500 commercial nuclear reactors worldwide, and ended in 1978 (antecedent to the 1979 Three Mile Island accident) with the last nuclear reactor orders in the United States.

Several elements contributed to the end of this era. Foremost, the commercial nuclear power plant overnight capital cost (The overnight capital cost refers to the nuclear power plant cost constructed virtually overnight. It includes the engineering, procurement, and construction (EPC) costs associated with the nuclear steam supply system (NSSS), the turbine generator, and the balance of plant (BOP). It also includes the owner's costs associated with site-specific activities, such as: project management, legal services, licensing (state and federal), facilities, taxes, and transmission (local grid improvements). Contingency costs are included; time-dependent costs, such as financing and escalation costs, are excluded.) and construction time steadily increased due to both the economies of scale approach to reactor design and the escalating safety requirements imposed by regulatory agencies. Illustrating this point, in 1957 the 60 megawatt-electric (MWe) Generation I Shippingport Atomic Power Station had an all-in capital cost (The all-in capital cost includes the overnight capital cost and time-dependent costs, such as financing and escalation costs.) of 1,200 2012$/kWe (2012 US dollars per kilowatt-electric) and a construction time of 32 months (US Nuclear Regulatory Commission. *NRC: History*. Accessed 23 Apr. 2015. http://www.nrc.gov/about-nrc/emerg-preparedness/history.html.), while large or gigawatt-electric-scale (GWe-scale) Generation II nuclear power plants had an all-in capital cost of 2,000-13,000 2004$/kWe (2004 US dollars per kilowatt-electric) and an average construction time of 9 years (Jonathan Koomey and Nathan E. Hultman. A reactor-level analysis of busbar costs for US nuclear plants, 1970-2005. *Energy Policy*, 35:5630-5642, 2007.).

Further impeding nuclear power evolution during the first nuclear era, Title 10 Code of Federal Regulations Part 50 (10 CFR 50) (US Nuclear Regulatory Commission Regulations: Title 10, *Code of Federal Regulations, §50*.) exposes electric utility companies to the economic risk of having a fully functional nuclear power plant without a license to sell electricity. 10 CFR 50 is a two-step licensing process where the applicant obtains a construction permit and then an operation licenses. Taken together, these elements created an unacceptably high economic risk for commercial nuclear power plant deployment and brought an end to the first nuclear era.

Today, the world faces an energy crisis that stems from the confluence of unfavorable developments in the areas of energy supply and demand, climate change, and energy security. Let us discuss these areas in greater detail:

Energy supply and demand The US Energy Information Administration predicts a 56% increase in the global energy demand and a steady 80% dependence on fossil fuels (liquids, coal, and natural gas) for the global energy supply from 2010 to 2040. (US Department of Energy. US Energy Information Administration. Office of Energy Analysis. *International energy outlook* 2013: *with projections to* 2040. DOE/EIA-0484(2013), July 2013.)

A majority of the projected growth in energy demand is expected to occur in countries outside the Organization for Economic Cooperation and Development (OECD) (OECD member countries include: Australia, Austria, Belgium, Canada, Chile, Czech Republic, Denmark, Estonia, Finland, France, Germany, Greece, Hungary, Iceland, Ireland, Israel, Italy, Japan, Luxembourg, Mexico, Netherlands, New Zealand, Norway, Poland, Portugal, Slovakia, Slovenia, South Korea, Spain, Sweden, Switzerland, Turkey, United Kingdom, and United States.), known as non-OECD countries. More specifically, over the next 30 years the forecasted growth in energy consumption is 3% per year in non-OECD countries and 0.5% per year in OECD countries. (US Department of Energy. US Energy Information Administration. Office of Energy Analysis. *International energy outlook* 2013: *with projections to* 2040. DOE/EIA-0484(2013), July 2013.) Energy consumption is proportional to the standard of living. Countries with large populations and low gross domestic product (GDP) per capita, such as China and India, are increasing their energy consumption and increasing their economic output.

A majority of the projected growth in energy supply is expected to be from fossil fuels. The forecasted growth in clean energy (renewables and nuclear) consumption through 2040 is disappointingly low.

The price of fossil fuel is volatile and the cost of a fossil fuel power plant doubles when environmentally responsible components, such as carbon capture and sequestration technology, are included. These factors contribute to an increasing economic uncertainty in the global energy industry.

Climate Change

Fossil fuel combustion is responsible for introducing an unprecedented amount of greenhouse gases into the atmosphere. In particular, carbon dioxide ($CO_2$) atmospheric concentrations have risen dramatically over the last century. Before the Industrial Revolution, the $CO_2$ atmospheric concentration was around 280 parts per million (ppm). (US Environmental Protection Agency. *Climate change indicators in the United States: atmospheric concentration of greenhouse gases*. August 2013.) In 2012, the average CO2 atmospheric concentration was around 394 ppm. (US Environmental Protection Agency. *Climate change indicators in the United States: atmospheric concentration of greenhouse gases*. August 2013.) Between 2010 and 2040 the global energy-related annual $CO_2$ emissions are predicted to increase by 46%, rising from 31.2 billion metric tons in 2010 to 45.5 billion metric tons in 2040. (US Department of Energy. US Energy Information Administration. Office of Energy Analysis. *International energy outlook* 2013: *with projections to* 2040. DOE/EIA-0484(2013), July 2013.)

The impact of greenhouse gas emissions on the climate is an ever-evolving topic. It is known that fluctuations in the $CO_2$ atmospheric concentration are directly correlated to the Earth's average temperature. (Susan Solomon, Dahe Qin, Martin Manning, Melinda Marquis, Kristen Averyt, Melinda M. B. Tignor, Henry LeRoy Miller, and Zhenlin Chen. *Climate change* 2007: *the physical science basis*. Cambridge University Press, New York, 2007.) Thus, a high $CO_2$ atmospheric concentration corresponds to a high average temperature. It is also known that the terrestrial climate is a complex nonlinear system that humans are not able to control. Unfortunately, the most likely outcome of tampering with this system is a critical transition or tipping-point or state shift in the Earth's biosphere. (Anthony D. Barnosky, Elizabeth A. Hadly, Jordi Bascompte, Eric L. Berlow, James H. Brown, Mikael Fortelius, Wayne M. Getz, John Harte, Alan Hastings, Pablo A. Marquet, Neo D. Martinez, Arne Mooers, Peter Roopnarine, Geerat Vermeij, John W. Williams, Rosemary Gillespie, Justin Kitzes, Charles Marshall, Nicholas Matzke, David P. Mindell, Eloy Revilla, and Adam B. Smith. Approaching a state shift in Earth's biosphere. *Nature*, 486:52-58, 2012.) The consequence of such a change would be devastating.

Energy Security

Energy security encompasses the relationship between an individual nation's energy demands and their ability to mitigate energy supply disruptions. (Gal Luft and Anne Korin. *Energy security challenges for the 21st century: a reference handbook*. Praeger Publisher, Westport, Conn., 2009.) Energy independence describes the concept that an individual nation's energy supply completely meets its energy demand. However, after accounting for foreign policy, every country participates in the global energy market and is not energy independent. Competition over energy resources can rapidly escalate into international conflict.

Consequently, there is an immediate need for sustainable alternative energy sources and, as predicted by Weinberg, a renewed interest in nuclear power.

Nuclear energy is a clean (with respect to greenhouse gas emissions), safe, and sustainable energy source. Commercial nuclear power plants stand alone as the only proven carbon-free large-capacity means of generating electricity. Nuclear fuel has approximately 106 times the energy density of fossil fuels. For example, the plutonium isotope 239 ($^{239}Pu$) contains 80,120,000 kilojoules per gram (kJ/g) (James J.

Duderstadt and Louis J. Hamilton. *Nuclear reactor analysis*. John Wiley & Sons, New York, 1976.) and gasoline ($C_8H_{17}$) contains only 45.92 kJ/g (Charles Fayette Taylor. *The internal-combustion engine in theory and practice; volume I: thermodynamics, fluidflow, performance*. The MIT Press, Cambridge, second revised edition, 1985.). Even with these advantages over fossil fuels, the start of the second nuclear era (or nuclear renaissance) is struggling for the same reason the first nuclear era ended—economics.

In 1989, the US Nuclear Regulatory Commission (NRC), which succeeded the US Atomic Energy Commission as the federal agency that regulates the peaceful and commercial uses of nuclear material in 1975, introduced several new commercial nuclear power plant licensing options. As set forth in 10 CFR 52 (US Nuclear Regulatory Commission Regulations: Title 10, *Code of Federal Regulations, §52.*), a combined (construction and operation) license (COL) permits both the construction and operation of a new commercial nuclear power plant. The major components of a COL can reference an early site permit (ESP), which covers site or location specific elements, and a design certification (DC), which covers nu-clear power reactor design details. (Jay M. Gutierrez and Alex S. Polonsky. *Fundamentals of nuclear regulation in the United States*. Morgan Lewis, Second edition, July 2007.) From the perspective of an electric utility company, these new licensing options reduce the economic risk of deploying a new nuclear power generating station. However, while this licensing update is an improvement for the deployment of present nuclear technology the capital cost of such an endeavor is still too large.

According to a recent Energy Policy Institute at Chicago (EPIC) report (Robert Rosner and Stephen Goldberg. Analysis of GW-scale overnight capital costs. Technical report, University of Chicago, EPIC, November 2011.), the overnight capital cost of a new $GW_e$ scale Generation III+ nuclear power plant is 3,617-5,339 2010$/$kW_e$. This implies that the overnight capital cost of building a new Westinghouse Electric AP1000 is approximately 3.979-5.873 billion 2010$. The resulting economic risk of such an endeavor is unacceptably high. For example, Moody's Investors Service classified the risk at the bet-the-farm level. (J. Hempstead, D. Aschenbach, A. J. Sabatelle, M. Haggarty, L. Schumacher, and W. L. Hess. New nuclear generation: ratings pressure increasing. Technical report, Moody's Investors Service, June 2009.)

Let us turn to an incentive based discussion and ask the question, Is there a more economical path forward for nuclear power? Performing a simple commercial nuclear power plant gedanken economic analysis, where the dominant terms are the assets long-term value and all-in capital cost, can shed light on this important economical question. The longterm value is derived from the low cost of nuclear fuel; the all-in capital cost is directly proportional to the plant size and construction time. Given only these terms, it is economically favorable to maintain the low cost of nuclear fuel and reduce either the plant size or construction time. Hence, moving toward smaller capacities (lower overnight capital cost) and shorter construction times (lower financing cost) reduces the economic risk of deploying a nuclear power plant. This is part of the motivation for deploying small modular reactor (SMR) (William D. Magwood. Report to congress on small modular nuclear reactors. Technical report, US Department of Energy, May 2001. D. T. Ingersoll. Deliberately small reactors and the second nuclear era. *Progress in Nuclear Energy*, 51:589-603, 2009.) nuclear power plants, and has driven several nuclear reactor vendors around the world to aggressively shift their reactor design philosophy from economies of scale to economies of mass manufacturing.

SMRs are characterized by capacities less than 300 $MW_e$ and construction times less than two years, or roughly 18 months for site assembly followed by six months for inspections, tests, analysis, and acceptance criteria (ITAAC). The idealized approach to deploying SMR nuclear power plants starts with the fabrication (and inspection) of SMR components in a controlled factory environment (by highly skilled workers) and is followed by an express site-specific plant assembly. The economic benefits of factory fabrication for complex engineering jobs have been demonstrated in the shipbuilding and aerospace industries, such as manufacturing Space Shuttles. Chiefly, learning theory dictates that the unit cost decreases by a constant percentage (the improvement) each time the number of production units doubles. (T. P. Wright. Factors affecting the cost of airplanes. *Journal of Aeronautical Science*, 4(4): 122-128, 1936.) In business management the experience curve expresses a similar concept.

Another economic advantage of deploying a large capacity electricity generation station comprised of several SMR nuclear power plants is that operating plants provide revenue through the sale of electricity and act as a valuable asset in financing additional plants. This reduces the bet-the-farm level of economic risk.

Further motivation for deploying SMRs is found on the safety front. SMRs build on the general safety standards of $GW_e$-scale Generation III+ nuclear power plants and possess additional safety benefits due to straightforward changes in their design and operation. SMR designs have enhanced passive safety features (eliminating external water and auxiliary power requirements in the event of an accident) and reduced nuclear fuel inventories. Their operation revolves around standardized components (such as common instrumentation and controls) that improve the operations and maintenance personnel training quality and depth of talent. These increased safety factors decrease the potential risk to the environment and the public in an emergency, increase site location possibilities, and create new markets for nuclear power.

While the economies of mass manufacturing approach to nuclear power plant development are appealing, the desirable economic realization of this approach remains to be seen. A recent EPIC report on the economics of SMRs anticipates the all-in capital cost for the first electricity generation station comprised of six 100 $MW_e$ SMRs is 6,700-11,000 2011$/$kW_e$. (Robert Rosner, Stephen Goldberg, and Joseph S. Hezir. Small modular reactors key to future nuclear power generation in the U.S. Technical report, University of Chicago, EPIC, November 2011.) Although this is economically favorable when compared to other clean alternative energy technology (wind, solar, and biomass), it is unprofitable in the present market. Although the SMR approach to building a nuclear power plant reduces the economic risk of the endeavor by requiring less capital outlay, the larger all-in capital cost per $kW_e$ makes the project less profitable and requires a much longer payback period.

Successful adoption of new nuclear power generation technology will require addressing the present economic challenges hindering the deployment of existing nuclear options. It behooves the energy industry to leverage the enormous nuclear energy density advantage over fossil fuels; it is wise to explore options that fit within existing regulatory requirements; and it is a good idea to leverage the economic and safety advantages of small nuclear technology (minimizing component number and fuel inventory) and modular manufacturing techniques (learning and improving product quality). This paper follows these guidelines and encourages future research in this direction.

1.2 History

Hitherto the idea of a nuclear powered internal engine has been given little consideration. Following World War II, nuclear engine research and development focused on extraterrestrial propulsion applications. (R. W. Bussard and Richard D. DeLauer. *Nuclear rocket propulsion*. McGraw-Hill, New York, 1958.) In these rocket propulsion systems a working fluid is heated by a nuclear reactor with solid fuel and then expelled through an exhaust nozzle to generate thrust. These propulsion systems are external engines operating in an open thermodynamic cycle, where mass is allowed to cross the system boundary. In sharp contrast, this paper focuses on internal engines operating in a closed thermodynamic cycle.

In 1953 Edward H. Kerner published the first paper on *the possible use of gaseous fissionable materials in an engine of internal-combustion type*. (Edward H. Kerner. The expansion of a fissionable gas as a source of atomic power. *Journal of Applied Physics*, 24:815-6, 1953.) This brief theoretical paper mentions that such an engine could have a relatively small size, a high thermal efficiency, and eliminate the formidable heat-transfer problems in conventional reactors.

In 1967 Richard L. Moore patented what he called a pulsating nuclear reactor motor. (Richard L. Moore. Nuclear reactor motor. U.S. Pat. No. 3,549,490, issue date 22 Dec. 1970.) In this external engine a nuclear reactor with solid fuel heats the working fluid, the working fluid volume increases, and the working fluid performs work on a piston. The nuclear reactor had a negative void coefficient of reactivity to control the release of nuclear energy per cycle. In 1979 Joseph Pettibone conceived of a large water piston external engine driven by a nuclear weapon-like release of nuclear energy. (Joseph A. Pettibone. A novel scheme for making cheap electricity with nuclear energy. Technical Report UCID-18153, LLNL, August 1979. Joseph S. Pettibone. A novel scheme for making cheap electricity with nuclear energy. Technical Report UCRL-JC-107068, LLNL, April 1991.) Although this engine had obvious proliferation problems, it highlights the scientific feasibility and the economic advantages of eliminating the nuclear steam supply system.

Previous internal engine designs include the development of a nuclear piston engine or Otto-motor around 1970. (Karlheinz Thornm. Review of fission engine concepts. *Journal of Spacecraft and Rockets*, 9(9):633-639, 1972. K. Thornm and R. T. Schneider. Fissioning uranium plasmas. *Nuclear data in science and technology*, 1:15-38, 1975.) These engines had a reciprocating piston geometry. The housing acted as a moderator and reflector, the engine was fueled with a mixture of uranium isotope 235 hexafluoride ($^{235}UF_6$) and helium, and the device was initiated by an external neutron source. Since this engine was not inherently safe, a second piston and control rods were added to control criticality. In 1991 John Heidrich et al. (Peter Alesso, Tze-Show Chow, Ralph Condit, John Heidrich, Joseph Pettibone, and Ronald Streit. Inherently safe nuclear-driven internal combustion engines. Technical Report UCRL-JC-107417, LLNL, June 1991. John Heidrich, Joseph Pettibone, Tze-Show Chow, Ralph Condit, and George Zimmerman. Gaseous core nuclear-driven engines featuring a self-shutoff mechanism to provide nuclear safety. Technical Report UCRL-JC-108959, LLNL, November 1991. John Heidrich, T. Scott Carman, Tze-Show Chow, Ralph Condit, B. Grant Logan, and Joseph Pettibone. Nuclear-driven technologies that could reduce the cost of electricity by several fold. Technical Report UCRL-JC-108960, LLNL, November 1991.) designed a reciprocating piston internal engine featuring a self-shutoff mechanism to provide nuclear safety. This design emphasized a potential 10-fold reduction in the capital cost of a nuclear power plant and gave considerable attention to the closed fuel cycle. Neither theoretical design was ever reduced to practice.

1.3 Outline

The remainder of this paper is structured as follows:

Section 2:

Power cycles reviews the ideal Otto cycle, which provides a simplified thermodynamic description of the pertinent processes in an actual internal engine and enables analytic quantitative comparisons of engine design alternatives, and presents several internal engine power plant configurations Section 3:

Nanofuel explores nuclear fuel compositions that are suitable for use in an internal engine and presents an important inherent safety feature that is characteristic of certain nanofuels, namely the nanofuel negative temperature coefficient of reactivity.

Section 4:

Engine core criticality performs theoretical one-speed diffusion theory criticality calculations to estimate the critical size of an engine (reactor) core in a reciprocating nanofuel internal engine and discusses a second inherent safety feature where the dynamic engine core geometry experiences a decrease in criticality as the engine piston moves away from the top dead center crank position.

Section 5:

Ideal engine performance returns to the ideal Otto cycle and models nanofuel engine performance.

Section 6:

Engine performance models the performance of a generic 4-stroke reciprocating nanofuel engine operating in spark-ignition and compression-ignition mode.

Section 7:

LWR SNF nanofuel explores nanofuels comprised of the transuranic elements from LWR SNF and their performance in a nanofuel engine.

Section 8:

Wankel nanofuel engine reviews the Wankel engine geometry, adapts the Wankel engine to support a nuclear chain reaction, and explores compact and economical Wankel nanofuel engine configurations.

Section 9:

Advanced reactor performance models a Wankel nanofuel engine with a nanofuel comprised of the transuranic elements from LWR SNF.

Section 10:

Outlook analyzes the economic, safety, waste management, and nonproliferation attributes of a Wankel nanofuel internal engine electric power plant.

Appendix A:

Housing neutron transport analytically determines the probability that a fission neutron is thermalized in the reflector and returned to the engine core.

Appendix B:

Housing strength calculates the reciprocating nanofuel engine piston case (housing) deformation due to an internal gaseous nanofuel pressure using the theory of elasticity.

2 POWER CYCLES

Power cycles are thermodynamic cycles that produce useful work. Systems that perform power cycles are commonly called engines and categorized as either external engines or internal engines depending on whether the working fluid is heated by an external source or releases energy, respectively.

Conventional commercial nuclear power plants, and alternative advanced nuclear power plant concepts, are external engines. FIG. 1 illustrates a simplified two-loop (see primary coolant loop 104 with pump 110a, and working fluid loop 108 with pump 110b and condenser 114) Rankine cycle for a conventional pressured water reactor (PWR) nuclear power plant. (Neil E. Todreas and Mujid S. Kazimi. *Nuclear systems: volume 1: thermal hydraulic fundamentals*. CRC Press, New York, second edition, 2012.) In this external engine there are several stages between the release of nuclear energy in the reactor 102 and the production of useful work by the turbine 112. At a minimum:
1. the solid fuel in the reactor 102 releases nuclear energy;
2. the primary coolant 104 extracts heat from the solid fuel in the reactor 102;
3. the working fluid 108 extracts heat from the primary coolant 104 in the steam generator 106a; and
4. the turbine 112 extracts heat from the working fluid 108 and produces work in the form of a rotating shaft (not labeled) that drives the electric generator 106B.
Every Stage Incurs a Cost.

Internal engines are the most reliable and widely used power source in the world. This paper builds on the mature science of designing and operating internal engines that release chemical energy and introduces the design and operation of high-power internal engines that release nuclear energy.

Figure 3:
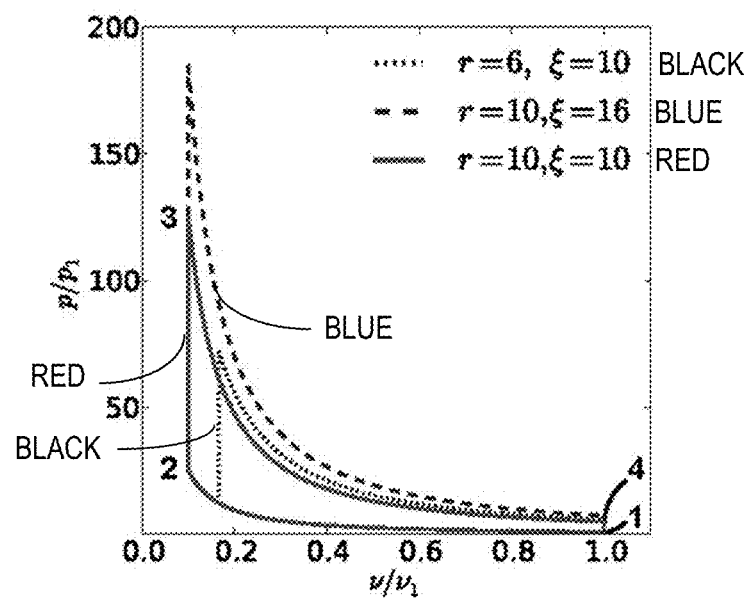
FIG. 3 depicts an Ideal Otto cycle process diagram illustrating variations in the dimensionless parameters r and $\xi$: solid (red) curve, r=10 and $\xi$=10; dashed (blue) curve, r=10 and $\xi$=16; and dotted (black) curve, r=6 and $\xi$=10, according to an exemplary embodiment.
Figure 2:
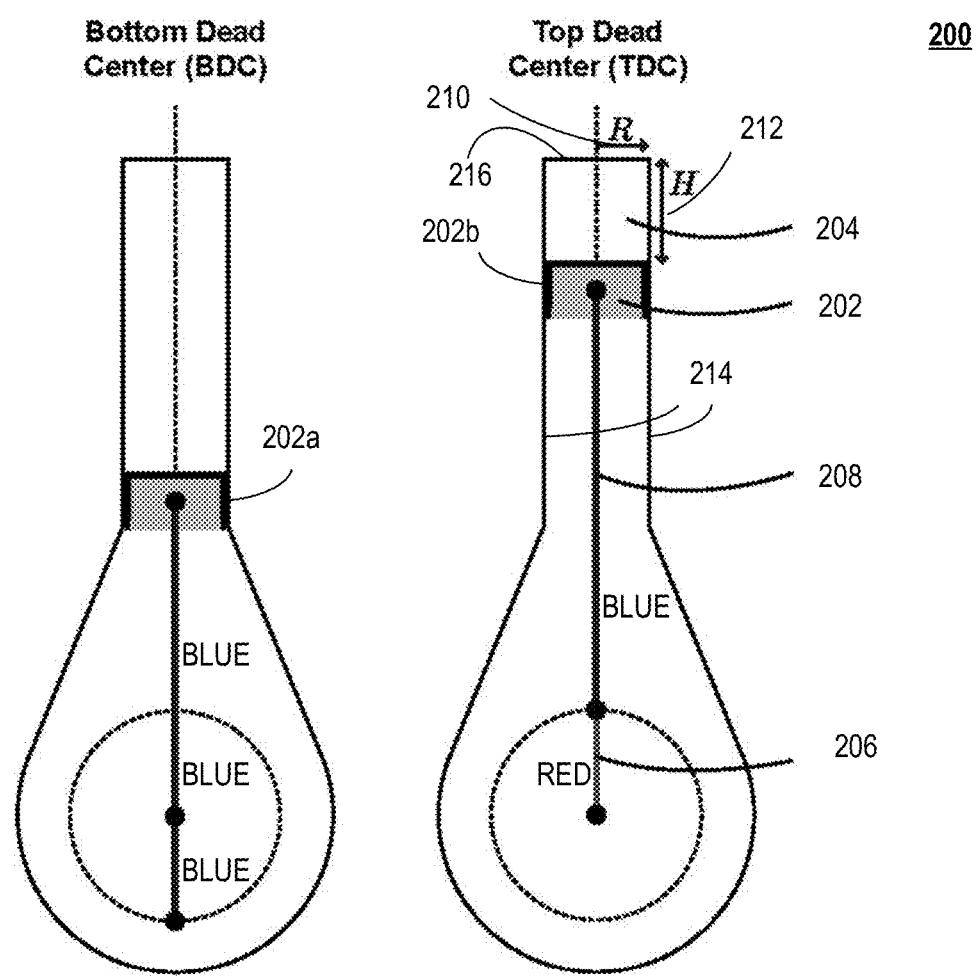
FIG. 2 depicts a reciprocating internal engine piston stopping positions, namely bottom dead center (BDC) crank position (left), and the top dead center (TDC) crank position (right), respectively, according to an exemplary embodiment.

This section reviews the ideal Otto cycle, which provides a simplified thermodynamic description of the pertinent processes in an actual internal engine and enables analytic quantitative comparisons of engine design alternatives. This section also presents several internal engine power plant configurations (see, e.g., diagrams 200, 500, 600, and 2700 of FIGS. 2, 5, 6, and 27, respectively).
2.1 Otto Cycle The reciprocating internal engine is a convenient device for reviewing the ideal Otto cycle. In this device a piston oscillates in a cylinder and transmits power to a rotating shaft. FIG. 2 illustrates in diagram 200 the two main piston stopping positions in a reciprocating internal engine, namely the bottom dead center (BDC) crank position 202a and the top dead center (TDC) crank position 202b. FIG. 3 illustrates the ideal Otto cycle process diagram 300.

The ideal Otto cycle assumes that all processes are internally reversible and the working fluid is an ideal gas with constant specific heats. The cycle begins in state 1, where the piston 202 is located in the BDC crank 206 position 202a. A mass of fuel (M), which is also the working fluid, is confined within a cylinder bounded by 216, 214 (or engine core 204) of volume $V_1 = \pi R^2 H_1$, where R 210 (H 212) is the cylinder radius 210 (height 212) and the subscripts refer to the cycle state.

The ideal Otto cycle processes and their common internal-combustion engine labels (see FIGS. 2 and 3) are:
Compression During process 1-2 the working fluid is isentropically compressed and in state 2 the piston 202 is located in the TDC crank position 202b (see FIG. 2, depicting connecting rod 208 coupled to crank 206 at a top dead center position, on the right).

Combustion

During process 2-3 the working fluid internal energy (U) increases at constant volume.

Expansion

During process 3-4 the working fluid isentropically expands and in state 4 the piston 202 returns to the BDC crank 206 position 202a (see FIG. 2, depicting connecting rod 208 coupled to crank 206 at a bottom dead center position, on the left).

Exhaust and Intake

During process 4-1 the working fluid exits the engine and returns to the engine through an engine specific exhaust and intake process.

In actual internal engines there is a certain degree of irreversibility. (John B. Heywood. *Internal combustion engine fundamentals*. McGraw-Hill, New York, 1988.)

Two dimensionless parameters describe the ideal Otto cycle. First, the compression ratio is given by $$r = \frac{v_1}{v_2} = \frac{\rho_2}{\rho_1} = \frac{H_1}{H_2}. \tag{1}$$

where $v=V/M (\rho=M/V)$ is the working fluid specific volume (mass density). Second, the ratio of the energy deposited in the working fluid during process 2-3 (Q) to the working fluid internal energy in state 1 (U1) defines the following parameter ($\xi$):

$$\xi = \frac{Q}{U_1}. \tag{2}$$

With these dimensionless quantities, several ideal Otto cycle thermodynamic properties can be conveniently expressed relative to their initial state.

Another important dimensionless parameter is the thermal efficiency ($\eta$). The ideal Otto cycle thermal efficiency for a working fluid with constant specific heat ratio ($\gamma$) is given by $$\eta = 1 - r^{1-\gamma}. \tag{3}$$

For $\gamma > 1$, this formula shows that $\eta$ increases with r.

Similar to the dimensionless representation of the air cycle given by Taylor (Charles Fayette Taylor. *The internal-combustion engine in theory and practice; volume I: thermodynamics, fluid flow, performance*. The MIT Press, Cambridge, second revised edition, 1985.), the working fluid pressure (p) and temperature (T) at several states can be written as:

$$\frac{p_2}{p_1} = r^\gamma, \frac{p_3}{p_1} = r^\gamma + r\xi, \tag{4}$$

$$\frac{T_2}{T_1} = r^{\gamma-1}, \frac{T_3}{T_1} = r^\gamma + \xi, \tag{5}$$

It is also useful to define the mean effective pressure (mep) as the ratio of the net work done by the cycle to the cylinder displacement volume, which is the difference between the maximum (BDC) and minimum (TDC) cylinder volumes (see FIG. 2). In terms of dimensionless parameters the mep is given by $$\frac{mep}{p_1} = \xi \frac{1 - \left(\frac{1}{r}\right)^{\gamma-1}}{(\gamma-1)\left(1 - \frac{1}{r}\right)}. \quad (6)$$

Figure 4:
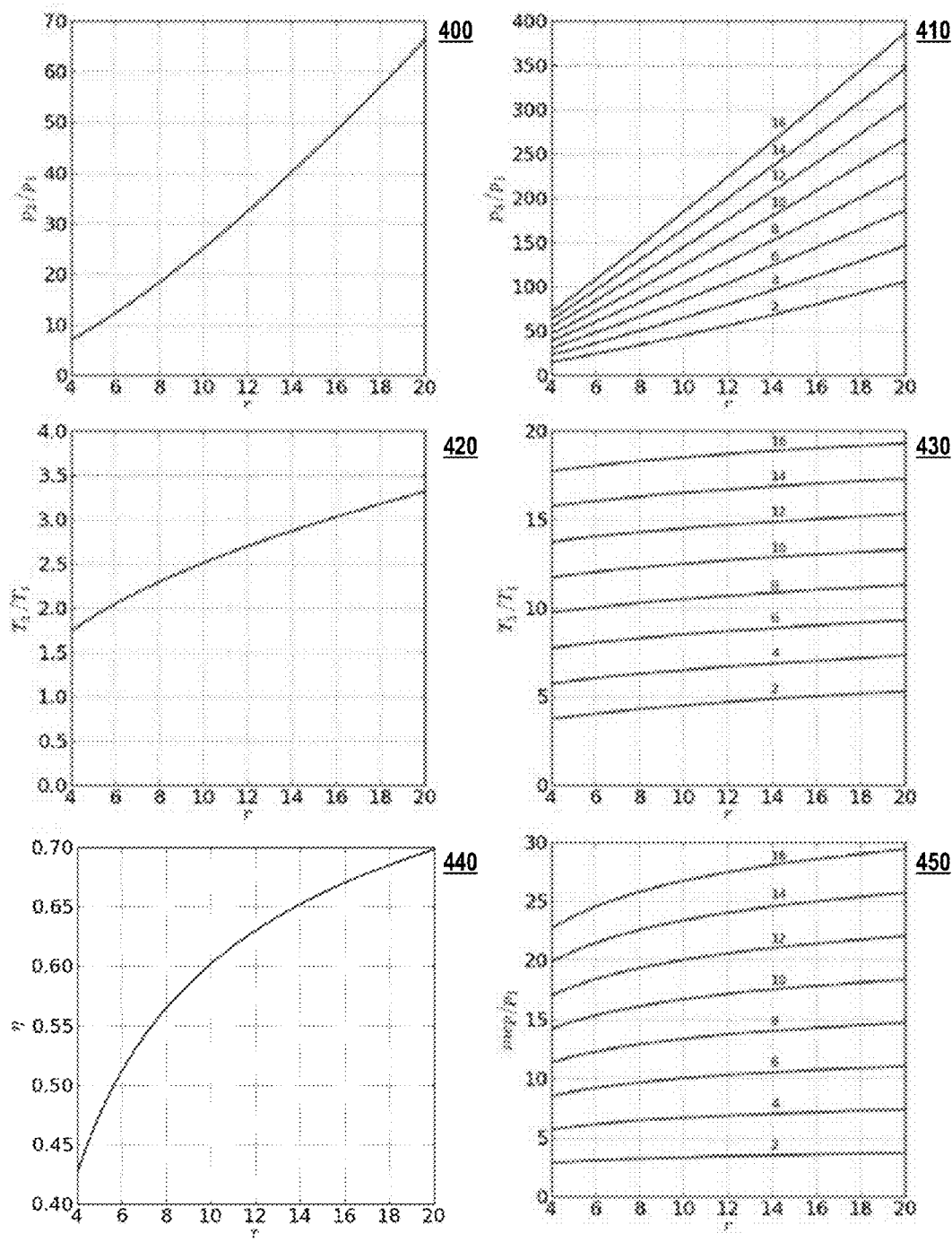
FIG. 4 depicts characteristics of the ideal Otto cycle as a function of the dimensionless parameters r and $\xi$, curve labels correspond to $\xi$, according to an exemplary embodiment.

The work done in applying the mep to the piston during the expansion stroke is equivalent to the work of the actual cycle. FIG. 4 illustrates these expressions in graphs 400, 410, 420, 430, 440, and 450.

2.2 Power Plant Configurations

The internal engine directly couples to a rotating shaft that can drive an electric generator. In an internal engine, the expansion stroke (or process 3-4) directly converts the energy absorbed in the working fluid during the combustion process (or process 2-3) into useful work in the form of a rotating shaft that can drive an electric generator. This direct coupling significantly reduces the number of components in a power plant and dramatically reduces cost.

For internal engines that release nuclear energy, several simple power plant configurations provide environmental benefits and increase the power cycle economics. A closed recycling fuel system isolates the working fluid in the power plant from the surrounding environment and improves fuel utilization. A supercharging system or turbine increases the engine power and efficiency. Supercharging systems use compressors or pumps or blowers to increase the inlet working fluid density ($\rho_1$). Turbines produce additional useful work by extracting energy from the exhaust.

Figure 5:
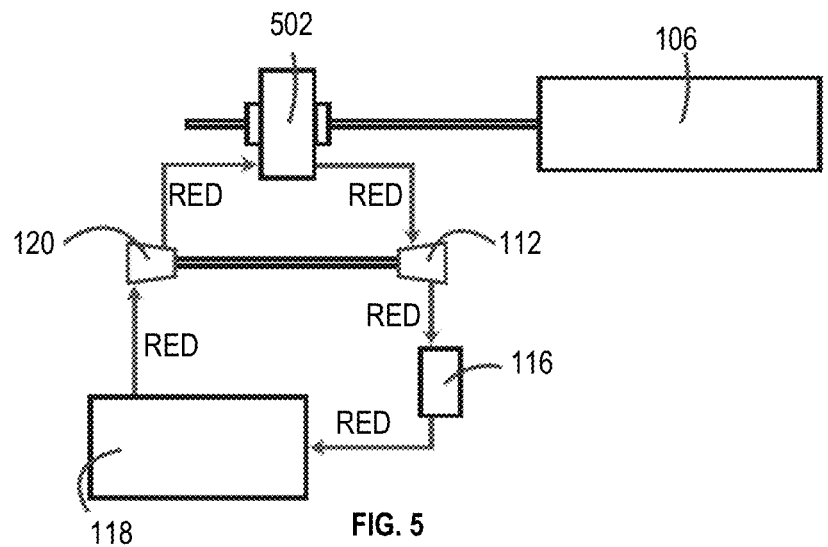
FIG. 5 depicts in a turbocharged engine the turbocharger compressor and turbocharger turbine are connected on a single shaft. according to an exemplary embodiment.

FIG. 5 illustrates a turbocharged engine. The red loop (from internal engine 502 to turbine 112, to heat exchanger 116, to fuel system 118, to compressor 120, and back to internal engine 102) represents a closed recycling fuel system that is suitable for nuclear material. This configuration uses a compressor 120 to increase the inlet working fluid density and a turbine 112 to extract energy from the exhaust. The turbocharger compressor 120 and turbocharger turbine 112 are connected on a single shaft (coupling the engine 502 to the generator 106) in an example embodiment.

Figure 6:
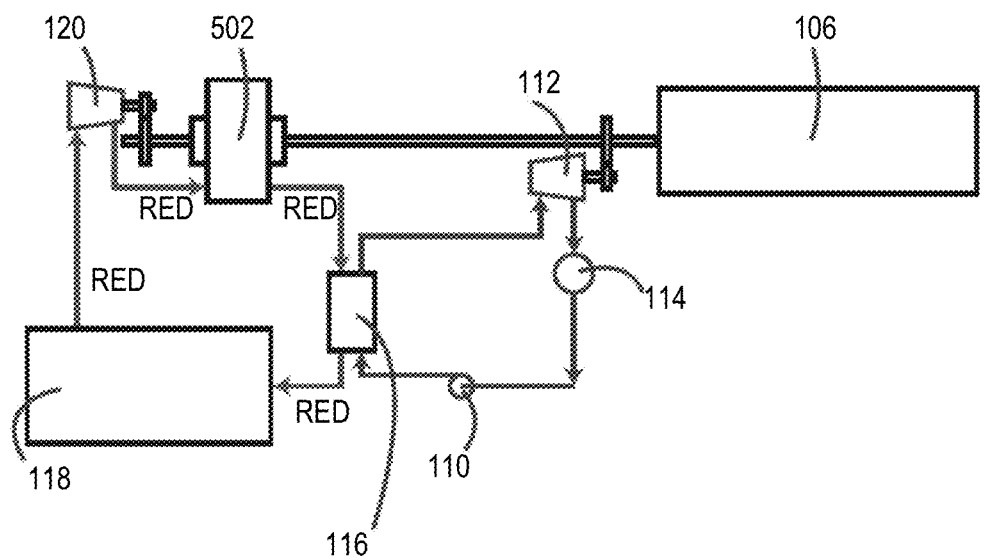
FIG. 6 depicts a power plant configuration involving mechanical supercharging (compressor) and turbocompounding (turbine), according to an exemplary embodiment.

FIG. 6 illustrates an alternative engine configuration that involves mechanical supercharging and turbocompounding. (John B. Heywood. *Internal combustion engine fundamentals*. McGraw-Hill, New York, 1988.) Mechanical supercharging uses a compressor 120 powered by the drive shaft (coupling the engine to the generator) to increase the inlet working fluid density. Turbocompounding uses a turbine 112 connected (or coupled) to the drive shaft (coupling the engine 502 to the generator 106) to increase the overall system power and efficiency. This configuration simplifies the system components in contact with nuclear material. As shown, the turbocompounding uses the turbine 112 in a loop with condenser 114, pump 110, and heat exchanger 116, and back to turbine 112.

3 NANOFUEL

Nuclear engineering is a mature science with proven research methods. Divide and conquer is the traditional approach to begin studying the behavior of a nuclear fuel in a configuration designed to support a fission chain reaction. For example, the effective multiplication factor ($k_{eff}$), which describes the possible fate of neutrons in a finite system for a given fission generation, is calculated by division into an infinite medium multiplication factor ($k_\infty$), which depends on the nuclear fuel, and a nonleakage probability ($P_{NL}$), which depends on the reactor core geometry. (Samuel Glasstone and Milton C. Edlund. The elements of nuclear reactor theory. Part I. Technical Report 1099, ORNL, 1952. Robert V. Meghreblian and David K. Holmes. *Reactor analysis*. McGraw-Hill Book Company, New York, 1960. James J. Duderstadt and Louis J. Hamilton. *Nuclear reactor analysis*. John Wiley & Sons, New York, 1976. Weston M. Stacey. *Nuclear reactor physics*. Wiley-VHC Verlag GmbH & Co., Germany, second edition, 2007.)

This section explores nuclear fuel compositions that are suitable for use in an internal engine. These fuels are called nanofuels, where the prefix nano is added to emphasize the general presence of molecules and complex clusters that have dimensions on the nanometer scale and introduce quantum statistical phenomena that affect engine performance. The prefix is also a tribute to Richard P. Feynman's famous paper, *There's plenty of room at the bottom*. (Richard P. Feynman. There's plenty of room at the bottom. *Engineering and science*, 23:22, 1960.)

Nanofuel is comprised of six general ingredients:

Fissile Fuel

Nuclides that undergo thermal neutron induced fission. Common examples include: $^{233}U$, $^{235}U$, and $^{239}Pu$.

Passive Agent

Nuclides that have a resonance neutron absorption cross-section in the low epithermal energy range. Common examples with a strong resonance neutron absorption cross-section near 1 eV include: $^{115}In$, $^{177}Hf$, and $^{240}Pu$.

Moderator Elements with low atomic number that are capable of thermalizing the neutron population and absorbing fission fragment kinetic energy. Common examples include: H and He.

Fertile Fuel

Nuclides that undergo neutron induced transmutation into fissile fuel. Also known as breeding material. Common examples include: $^{232}Th$ for breeding $^{233}U$, and $^{238}U$ for breeding $^{239}Pu$.

Transuranic Elements

Elements with atomic number (Z) greater than U (Z>92). This definition intentionally includes material that is considered by the US Atomic Energy Act of 1954 (Atomic Energy Act of 1954, as Amended. Public Law 83-703 (30 Aug. 1954).) to be high-level waste (HLW) and transuranic (TRU) waste.

Fission Products

Matter that includes the fission reaction products and anything else not covered by the other ingredients.

The fissile fuel, passive agent, and moderator are essential nanofuel ingredients. The interplay between the essential ingredients is illustrated using plutonium isotope 239 hexafluoride ($^{239}PuF_6$) for the fissile fuel, plutonium isotope 240 hexafluoride ($^{240}PuF_6$) for the passive agent, and molecular hydrogen ($H_2$) for the moderator. Although sophisticated theoretical and computational models are required to accurately quantify the properties of general nanofuels, for instance the mixture of uranium dioxide ($UO_2$) and molecular hydrogen ($H_2$) is an aerosol that behaves as a colloidal system with solid particulates dispersed in a gaseous medium, the nanofuel ingredients explored in this section are accurately modeled as a simple homogeneous gaseous molecular mixture.

Creating a nanofuel comprised of the aforementioned essential ingredients involves a few basic chemical processes, namely:

1. Form plutonium tetrafluoride ($PuF_4$) or plutonium dioxide ($PuO_2$) with the desired ratio of fissile fuel to passive agent. The resultant product contains a mixture of plutonium isotopes and can be prepared using existing proliferation resistant UREX+ (uranium reduction extraction) reprocessing techniques. (M. C. Regalbuto. Alternative separation and extraction: UREX+ processes for actinide and targeted fission product recovery. In Kenneth L. Nash and Gregg J. Lumetta, editors, *Advanced separation techniques for nuclear fuel reprocessing and radioactive waste treatment.* Woodhead Publishing, Philadelphia, 2011.)

2. Convert the plutonium mixture into plutonium hexafluoride (PuF6) using elemental fluorine as the fluorinating or oxidizing agent. The main chemical reactions are:

$$PuF_4 + F_2 \rightarrow PuF_6, \quad (7)$$

$$PuO_2 + 3F_2 \rightarrow PuF_6 + O_2. \quad (8)$$

lutonium hexafluoride has a low melting point temperature (323.9 K at the triple point (E. R. Jette, J. F. Lemons, and A. E. Florin. Plutonium hexafluoride: second report on the preparation and properties. Technical Report LA-1168, LANL, November 1950. Bernard Weinstock and John G. Malm. The properties of plutonium hexafluoride. *Journal of inorganic and nuclear chemistry*, 2:380-394, 1956.)), which permits low engine intake temperatures.

3. Mix the plutonium hexafluoride with molecular hydrogen until the desired concentration is achieved. Plutonium hexafluoride and molecular hydrogen react on a timescale much longer than a power cycle. (Martin J. Steindler. Laboratory investigations in support of fluid bed fluoride volatility processes: part II, the properties of plutonium hexafluoride. Technical Report ANL-6753, ANL, August 1963.)

Additional nanofuel ingredients are considered throughout this paper. For instance, Sec. 10 discusses the benefits of fertile fuel, Sec. 7 focuses on the addition of transuranics elements from LWR SNF, and Sec. 6 covers the presence of fission products and the role of delayed neutrons in long-term nanofuel engine operation.

Now let us turn to the numerical calculation of two nanofuel properties that are key to describing a fission chain reaction, namely the infinite medium multiplication factor ($k_\infty$) and the neutron population exponential growth factor ($\alpha$). First, $k_\infty$ is defined as the ratio of the neutron population in one generation to the neutron population in the preceding generation in a reactor of infinite extent. (James J. Duderstadt and Louis J. Hamilton. *Nuclear reactor analysis*. John Wiley & Sons, New York, 1976.) When $k_\infty>1$ ($k_\infty<1$) the neutron population is increasing (decreasing) and the system is supercritical (subcritical). Second, $\alpha$ is defined by $$N(t) = N_0 e^{\alpha t}, \quad (9)$$

where N is the neutron population at time t and No is the initial neutron population at time $t_0=0$ s. The role of $\alpha$ is to exponentially alter the neutron population. When $\alpha>0$ 1/s ($\alpha<0$ 1/s) the neutron population is exponentially increasing (decreasing).

The ensuing simulations use MCNP5 (X-5 Monte Carlo Team. MCNP—a general Monte Carlo N-Particle transport code, version 5. Technical Report LA-UR-03-1987, LANL, February 2008.) to computationally model neutron-photon-electron transport in systems that contain nuclear material. Simulation input includes: neutron interaction data from the ENDF/B-VII.0 library; photoatomic interaction data and electron interaction data from the 03 libraries; and S($\alpha$, $\beta$) cross-section libraries when appropriate. All simulations use makxsf (Forrest B. Brown. The makxsf code with Doppler broadening. Technical Report LA-UR-06-7002, LANL, 2006.) to create temperature-dependent libraries.

TABLE 1

Various nanofuels and their properties at $\rho = 0.02$ g/cm$^3$ and T = 879 K.

| label | m(H$_2$) | m($^{239}$PuF$_6$) | m($^{240}$PuF$_6$) | $k_\infty$ | $\alpha$ [1/s] |
|---|---|---|---|---|---|
| a | 0.50 | 0.34 | 0.16 | 1.380 | 3,173 |
| b | 0.50 | 0.40 | 0.10 | 1.478 | 4,339 |
| c | 0.50 | 0.45 | 0.05 | 1.575 | 5,433 |
| d | 0.60 | 0.27 | 0.13 | 1.374 | 2,554 |
| e | 0.60 | 0.32 | 0.08 | 1.476 | 3,541 |
| f | 0.60 | 0.36 | 0.04 | 1.566 | 4,449 |
| g | 0.70 | 0.21 | 0.09 | 1.368 | 1,989 |
| h | 0.70 | 0.24 | 0.06 | 1.450 | 2,605 |
| i | 0.70 | 0.28 | 0.02 | 1.564 | 3,510 |

Figure 7A:
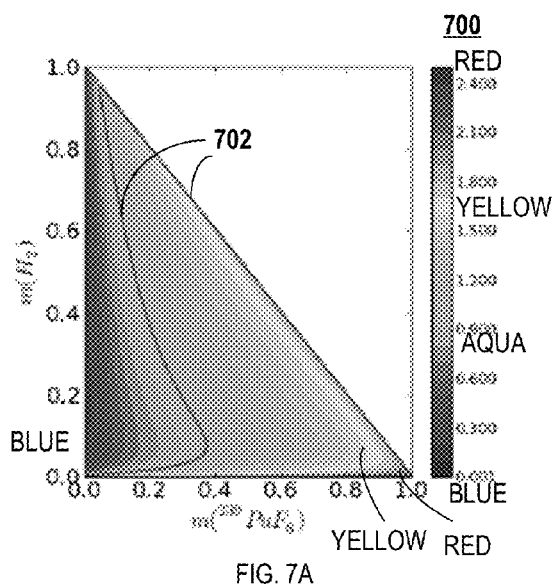
FIGS. 7A and 7B depict 5,151 MCNP5 simulations depicting (a) $k_\infty$ and (b) $\alpha$ as a function of the nanofuel ingredient mass fractions m($H_2$, $^{239}PuF_6$, $^{240}PuF_6$) for a fixed $\rho=0.02$ g/cm$^3$ and T=800 K, the solid black contour corresponds to (a) $k_\infty=1$ and (b) $\alpha=0$ 1/s, according to an exemplary embodiment.
Figure 7B:
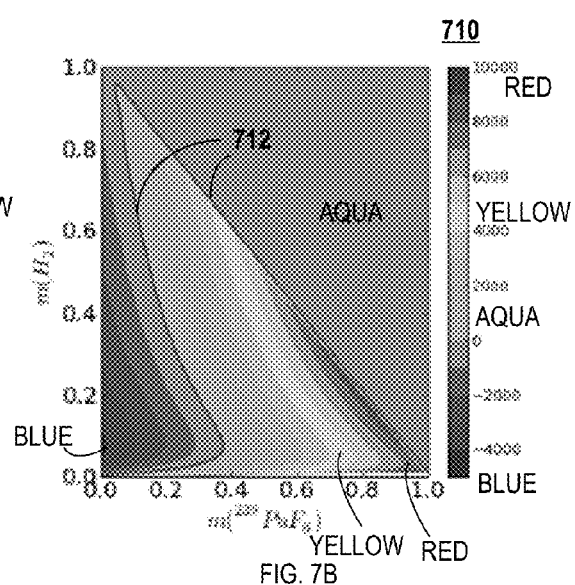

FIGS. 7A and 7B plot $k_\infty$ and $\alpha$ as a function of the nanofuel ingredient mass fractions m(H$_2$, $^{239}$PuF$_6$, $^{240}$PUF$_6$) for a fixed $\rho=0.02$ g/cm$^3$ and T=800 K. In these simulations the system has an infinite extent and the effects of delayed neutrons are neglected. The mass fractions form a convex combination, the abscissa (ordinate) reflects the mass fraction m($^{239}$PuF$_6$) (m(H$_2$)), and the mass fraction m($^{240}$PuF$_6$) mass fraction is found from $$m(^{240}PuF_6) = 1 - m(H_2) - m(^{239}PuF_6). \quad (10)$$

There are n=101 data points in each dimension and the figure contains n(n+1)/2=5, 151 simulation results.

FIG. 7A illustrates a large range of supercritical ($k_\infty>1$) nanofuels. Almost the entire moderator mass fraction domain can support a fission chain reaction. FIG. 7A chart 700 also shows that $k_\infty>2$ for small values of m(H$_2$) and m($^{240}$PuF$_6$) (or large values of m($^{239}$PuF$_6$)), which is not obvious given the abundance of F atoms present in the nanofuel. Table 1 reports $k_\infty$ and $\alpha$ for 9 nanofuels with moderator mass fractions in [0.5, 0.6, 0.7] and $k_\infty$ approaching [1.4, 1.5, 1.6] for a fixed nanofuel $\rho=0.02$ g/cm$^3$ and T=879 K. FIG. 7B chart 710 and Table 1 show that a majority of the supercritical nanofuels have an $\alpha$ on the order of a few times 10$^3$ 1/s. In particular, for Fuel c: $k_\infty=1.575$ and $\alpha=5$, 433 1/s.

Figure 8A:
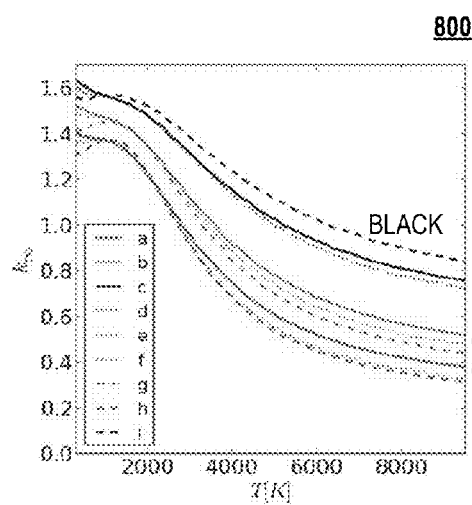
FIGS. 8A and 8B depict 900 MCNP5 simulations depicting (a) $k_\infty$ and (b) $\alpha$ as a function of T for the nanofuels identified in Table 1 and a fixed $\rho=0.02$ g/cm$^3$, respectively, according to an exemplary embodiment.
Figure 8B:
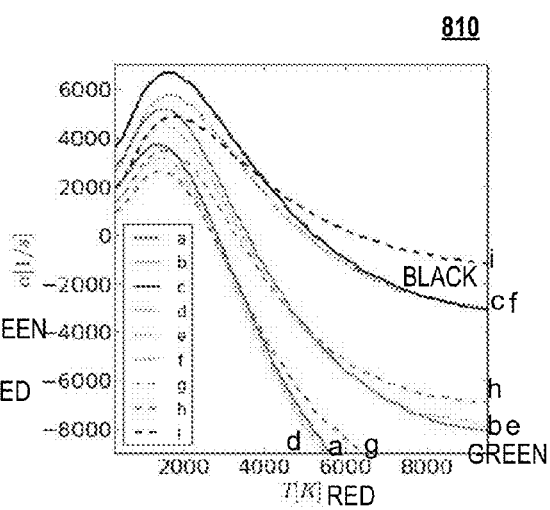

Another important nanofuel property is the temperature coefficient of reactivity ($\alpha_T$), which is given by $$\alpha_T = \frac{\partial}{\partial T}\left(\frac{k-1}{k}\right) = \frac{1}{k^2}\frac{\partial k}{\partial T}. \quad (11)$$

where k is the neutron multiplication factor. Since k is a positive number, the sign of $\alpha_T$ is proportional to the derivative of k with respect to T(k'(T)). Negative (positive) $_\alpha$T describes a decrease (an increase) in k with an increase in T. FIGS. 8 A and 8B plot $k_\infty$ in chart 800, and $\alpha$ in chart 810, respectively, as a function of T, for the nanofuels identified in Table 1 and a fixed $\rho=0.02$ g/cm$^3$, and shows that k'(T)<0 1/K across a large temperature domain. For example, Fuel c has a negative $\alpha_T$ across the entire temperature domain plotted.

Nanofuels with negative $\alpha_T$ are inherently stable. (John R. Lamarsh. *Introduction to nuclear engineering*. Addison-Wesley Publishing Company, Reading, Mass., second edition, 1983.) This is an important safety feature. According to the Nordheim-Fuchs model, in systems where the effects of delayed neutrons and heat transfer can be neglected, nuclear fuels with a negative $\alpha_T$ undergo a self-limiting power excursion (or burst) with a burst duration $\tau_b\sim4/\alpha$. (David L. Hetrick. *Dynamics of nuclear reactors*. American Nuclear Society, La Grange Park, Ill., 1993.) Therefore, in a power cycle a nanofuel with a negative $\alpha_T$ ensures a finite release of nuclear energy.

Now let us turn to the ideal Otto cycle combustion process for nanofuels with a negative $\alpha_T$. This process involves the following intermediate stages:

1. In state 2 the nanofuel is supercritical (k>1) and the injection of neutrons starts an exponential growth in the neutron population according to Eq. 9.

2. The nuclear energy production rate is proportional to the neutron population. As the neutron population exponentially increases: the fissile fuel fissions and releases nuclear energy; the moderator absorbs the fission fragment kinetic energy, which accounts for approximately 80% of the total energy released in a fission reaction (James J. Duderstadt and Louis J. Hamilton. Nuclear reactor analysis. John Wiley & Sons, New York, 1976.); and the nanofuel temperature increases.

3. For negative $\alpha_T$, k decreases as T increases and the nanofuel undergoes a critical transition. When the nanofuel is subcritical (k<1) the neutron population and the nuclear energy production rate decrease exponentially.

4. In state 3 the nanofuel is subcritical (k<1), the neutron population and the nuclear energy production rate are negligible, and the combustion process ends.

The physical explanation for the nanofuel negative $\alpha_T$ involves the strong resonance neutron absorption cross-section in the passive agent. As the neutrons collide with the moderator, the neutron velocity distribution function rapidly relaxes toward a Maxwellian velocity distribution characterized by the macroscopic nanofuel properties. As the nanofuel temperatures increases, the neutron velocity distribution function broadens and there are more neutrons with energies near the passive agent neutron resonance absorption cross-section. This capture mechanism creates a neutron sink that significantly increases with the nanofuel temperature.

4 ENGINE CORE CRITICALITY

Neutrons propagate a fission chain reaction. Criticality calculations account for the neutron source (fission reaction) and sink (capture and leakage) terms in a fission chain reaction. This section performs theoretical one-speed diffusion theory criticality calculations to estimate the critical size of an engine (reactor) core in a reciprocating nanofuel internal engine. This section also discusses the second nanofuel engine inherent safety feature, which pertains to the dynamic engine core geometry.

Let us begin by identifying an engine core geometry that minimizes neutron leakage. The engine core in a reciprocating internal engine (see schematic diagram 200 of FIG. 2) is a right circular cylinder with fixed radius (R) and variable height (H).

Neutron leakage is proportional to the ratio of the engine core surface ($S=2\pi (R+H)$) to the engine core volume ($V=\pi R^2 H$):

$$\frac{S}{V} = \frac{2}{R} + \frac{2}{H}. \tag{12}$$

To minimize the engine core surface-to-volume ratio: consider a unit volume $V=\pi R^2 H=1$; let $H=xR$, where x is the quantity to be determined; and look for solutions where the derivative vanishes. Performing these steps:

$$R = (\pi x)^{-1/2};\ f(x) = S/V = 2\pi^{1/3} x^{-2/3}(1-x);$$

$$f'(x) = \frac{2}{3}\pi^{1/3}(x-2)x^{-5/3};$$

and the pertinent solution is x=2. Thus, H=2R minimizes neutron leakage and defines an optimal engine core geometry with volume $V=2\pi R^3$. This solution makes the cylinder closest to being a sphere.

For optimal engine core geometries, let us calculate the engine core critical radius using the one-speed diffusion theory general criticality condition. Assume the engine core contains a homogeneous gaseous nanofuel surrounded by a vacuum. The general criticality condition is given by $$B_m^2 = B_g^2 \tag{13}$$

where $B^2_m$ is the material buckling (nanofuel properties) and $B^2_g$ is the geometric buckling (engine core geometry).

The material buckling is determined by the nanofuel properties:

$$B_m^2 = \frac{k_\infty - 1}{L^2}. \tag{14}$$

where $L=\sqrt{D/\Sigma_a}$ is the neutron diffusion length (a measure of how far a neutron will travel from its source before it is absorbed), D is the neutron diffusion coefficient, and $\Sigma_a$ is the macroscopic neutron absorption cross-section. The geometric buckling is determined by the engine core geometry:

$$B_g^2 = \left(\frac{v_0}{\tilde{R}_c}\right)^2 + \left(\frac{H}{\tilde{H}_c}\right)^2, \tag{15}$$

where $v_0=2.40483$ is the first zero of the Bessel function of the first kind ($J_0(x)$) and $\tilde{R}_c$ ($\tilde{H}_c$) is the extrapolated critical radius (height). The slab geometry extrapolated distance (d) with a vacuum boundary condition is $$d=0.7104\lambda_{tr}=2.131D \tag{16}$$

where
$\lambda_{tr}=3D$ is the neutron transport mean free path. (James J. Duderstadt and Louis J. Hamilton. *Nuclear reactor analysis*. John Wiley & Sons, New York, 1976.)

TABLE 2

Critical engine core characteristics for the nanofuels identified in Table 1.

| label | L [cm] | D [cm] | $\Sigma_a$ [1/m] | $\tilde{R}_c$ [cm] | $R_c$ [cm] | $M_c$ [kg] |
|---|---|---|---|---|---|---|
| a | 13.14 | 1.186 | 0.6869 | 61.23 | 58.70 | 25.42 |
| b | 13.14 | 1.180 | 0.6834 | 54.59 | 52.08 | 17.75 |
| c | 13.14 | 1.174 | 0.6800 | 49.77 | 47.27 | 13.27 |
| d | 12.66 | 1.006 | 0.6277 | 59.46 | 57.32 | 23.66 |
| e | 12.66 | 1.002 | 0.6252 | 52.71 | 50.57 | 16.25 |
| f | 12.67 | 0.9988 | 0.6222 | 48.37 | 46.25 | 12.43 |
| g | 12.39 | 0.8724 | 0.5688 | 58.67 | 56.81 | 23.04 |
| h | 12.40 | 0.8707 | 0.5663 | 53.10 | 51.24 | 16.91 |
| i | 12.41 | 0.8683 | 0.5638 | 47.47 | 45.61 | 11.93 |

To find the critical radius: substitute Eq. 14 (material buckling) and Eq. 15 (geometric buckling) into Eq. 13 (general criticality condition); set H=2R (optimal engine core geometry); solve for the extrapolated critical radius; and subtract the extrapolation distance. The extrapolated critical radius is $$\tilde{R}_c = \sqrt{\frac{L^2}{k_\infty - 1}\left(v_0^2 + \frac{\pi^2}{4}\right)}. \quad (17)$$

The critical radius (mass) is $R_c = \tilde{R}_c - d (M_c = \rho V = \rho 2\pi R_c^3)$. Table 2 presents the critical radius (mass) for the nanofuels identified in Table 1. In particular, Fuel c has $R_c = 47.27$ cm, $M_c = 13.27$ kg, and $M_c(^{239}PuF_6) = 5.972$ kg.

This result estimates the minimum size of an engine core. However, in a reciprocating internal engine the engine core height varies as the piston oscillates in the cylinder and the criticality changes. To explore this effect let us introduce a variable compression ratio ($\mathfrak{r}$). During the compression stroke $\mathfrak{r}$ is defined by $$r = \frac{H_1}{H}, \quad (18)$$

where $\mathfrak{r} = 1$ ($\mathfrak{r} = r$) in state 1 (state 2).

To find the critical radius in a variable engine core geometry: define $H_c$ in terms of $\mathfrak{r}$ ($H_c = H_1/\mathfrak{r}$), which accounts for the change in engine core volume; let $L = L_1/\mathfrak{r}$, since the neutron diffusion length is proportional to the nanofuel density; set $H_c = 2R_c$ (optimal engine core geometry); solve for the extrapolated critical radius; and subtract the extrapolation distance. The result is $$R_c = \frac{v_0}{\tau}\left\{\frac{k_\infty - 1}{L_1^2} - \frac{\pi^2}{(H_1 + 2d\varepsilon)^2}\right\}^{-1/2} - d. \quad (19)$$

This expression shows that $R_c \sim 1/\tau$. In particular, for Fuel c, expanding Eq. 19 in $\mathfrak{r}$ gives $$R_c[\text{cm}] \cong \frac{509.7}{\tau} - 3.840 + 0.01589\tau - O(\tau^2). \quad (20)$$

where $H_1 = 945.4$ cm and the initial critical mass is $M_c = 1,627$ kg.

This surprisingly large initial critical radius (enormous initial critical mass) is the primary reason why gaseous nuclear technology has not been heavily explored. The scaling is easy to explain using a column density argument. The column density in spherical geometry is $\rho R_s$, where $R_s$ is the spherical radius. In order to maintain a critical spherical assembly, any change in $\rho$ must be balanced by a change in $R_s$ in such a way that $\rho R_s$ remains constant. For transitions from state a to state b, this column density argument implies the following scaling:

$$M_b = M_a \left(\frac{\rho_a}{\rho_b}\right)^2, \quad (21)$$

$$V_b = V_a \left(\frac{\rho_a}{\rho_b}\right)^3. \quad (22)$$

Thus, in transitioning from a solid fuel to a gaseous fuel, the density decreases by $10^{-3}$ and the critical mass (volume) increases by $10^6$ ($10^9$). Stating the obvious, increasing the reactor volume by a factor of $10^9$ incurs a significant cost. Thus this would not be an obvious design choice.

Figure 9:
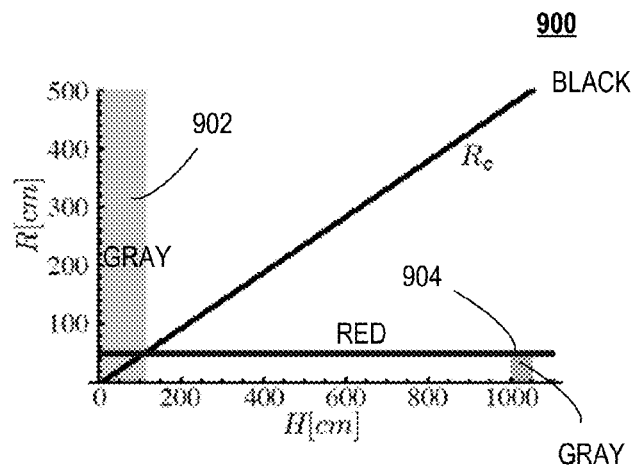
FIG. 9 depicts Engine core critical radius for Fuel c (in Tables 1 and 2) as a function of piston position, the horizontal (red) line represents the engine core radius, according to an exemplary embodiment.

Conversely, in a nanofuel engine this scaling has an advantage. As the piston moves from state 1 (BDC) to state 2 (TDC), the nanofuel density increases by a factor of r and the nanofuel critical mass decreases by a factor of $r^2$. In designing a nanofuel engine, the engine core radius is intentionally selected to ensure that the critical radius is less than the engine core radius only when the piston is near the TDC crank position. In other words, a nanofuel engine is only supercritical (R>Rc) when the piston is near the TDC crank position. In particular, for Fuel c, FIG. 9 illustrates this concept using $H_1 = 1,000$ cm and $R = 50$ cm. This engine forms a critical assembly when $H = 107.6$ cm, which is near the optimal TDC crank position of $H_2 = 100$ cm.

The effect of the variable or dynamic engine core geometry on criticality is second important inherent safety feature of nanofuel engines. First, since the engine core is subcritical ($R < R_c$) during a majority of the Otto cycle, an accidental injection of neutrons or the presence of background neutrons has little effect on the neutron population. The spurious neutrons will simply exponentially decay in time. Second, in a power cycle the change in engine core volume is another means of placing an upper limit on the release of nuclear energy. Energy production ceases once the engine core volume is too large. As the engine core volume increases, $\rho$ decreases and the neutron leakage increases.

5 IDEAL ENGINE PERFORMANCE

The previous two sections followed a traditional nuclear engineering approach to studying the behavior of a nanofuel (nuclear fuel) in a reciprocating internal engine (configuration designed to support a fission chain reaction). This section returns to the ideal Otto cycle and models nanofuel engine performance.

The ideal Otto cycle processes for a reciprocating nanofuel engine are:

Intake

During the intake process the nanofuel must be in the gaseous phase, which sets a lower bound on the temperature at any given state. The Otto cycle begins in state 1, where the piston is located in the BDC crank position and a mass of nanofuel (M) is confined within an engine core of volume $V_1 = \pi R^2 H_1$.

Compression

During process 1-2 the nanofuel is isentropically compressed. The system forms a critical assembly before reaching state 2. This occurs for a bare (no reflector) engine core when $R = R_c$, where $R_c$ is given by Eq. 19. In state 2, the piston is located in the TDC crank position, the system is supercritical, and the nanofuel properties are given by: $\rho_2 = r\rho_1$, $T_2 = r^{\gamma-1}T_1$, and $p_2 = r^\gamma p_1$.

Combustion

During process 2-3 the nanofuel internal energy increases at constant volume. This process begins when neutrons are introduced into the system and ends due to the nanofuel negative $\alpha_T$. In state 3, the nanofuel temperature ($T_3$) and pressure ($p_3$) attain maximum values.

Expansion

During process 3-4 the nanofuel isentropically expands and the piston drives the crankshaft. In state 4, the piston is in the BDC crank position.

Exhaust

During the exhaust process the nanofuel exits the engine.

In a non-ideal nanofuel engine the Otto cycle combustion process does not occur at constant volume. It starts when neutrons are present in a supercritical system, which occurs before the piston reaches the TDC crank position. It can end when the engine core volume increases and the system turns subcritical, due to decrease in $\rho$ and an increase in neutron leakage. This occurs for a bare core when $R<R_c$, where $R_c$ is given by Eq. 19.

Neutrons are introduced into the system using either an external or an internal neutron source. Analogous to the ignition methods in internal-combustion engines that release chemical energy, spark-ignition refers to the use of an external neutron source and compression-ignition refers to the use of an internal neutron source. In general, both external and internal sources can include any radioactive material that emits neutrons.

Two classes of pulsed fusion neutron generators are ideal for spark-ignition:

1. Accelerator-based neutron generators are a mature technology and commercial products are readily available. For example, the All-Russia Research Institute of Automatics ING-013 produces $10^8$ neutrons within 0.8 µs and has an operating lifetime of $3.6 \times 10^5$ shots. (All-Russia Research Institute of Automatics. *VNIIA—neutron generators*. Accessed 20 Mar. 2015. http://www.vniia.ru/eng/ng/index.html/.) A similar product is the Activation Technology Corporation N550, which produces 108 neutrons within 10 µs. (Activation Technology Corporation. N550. http://www.atcng.com/n550.htm/.)

2. Z-pinch-based dense plasma focus (DPF) (J. W. Mather. Investigation of the highenergy acceleration mode in the coaxial gun. *Physics of Fluids*, 7(11):S28-S34, 1964. J. W. Mather. Formation of a high-density deuterium plasma focus. *Physics of Fluids*, 8(2):366-377, 1965. J. W. Mather. Dense plasma focus. In *Methods of Experimental Physics*, volume 9B, pages 187-249. Elsevier, 1971.) neutron generators offer an energy efficient and cost effective means of performing nuclear fusion. For example, Michel et al. (L. Michel, K. H. Schonbach, and Heinz Fischer. Neutron emission from a small 1-kJ plasma focus. *Applied Physics Letters*, 24(2):57-59, 1974.) experimentally demonstrated a neutron yield $Y \sim 2.8 \times 10^8$ using molecular deuterium ($D_2$) and a driver with energy (voltage) 1.35 kJ (20 kV). In addition, Decker et al. (G. Decker, W. Kies, and G. Pross. The first and the final fifty nanoseconds of a fast focus discharge. *Physics of Fluids*, 26(2):571-578, 1983. G. Decker, W. Kies, M. Malzig, C. van Calker, and G. Ziethen. High performance 300 kV driver SPEED 2 for MA pinch discharges. *Nuclear Instruments and Methods in Physics Research A*, 249:477-483, 1986.) experimentally demonstrated that fast (400 ns rise time) high-impedance (60 mΩ) drivers increase the ratio of neutron yield to driver energy (Y/kJ).

Pulsed fusion neutron generators have an operating lifetime of $10^5$ shots, due to the capacitor lifetime. For a spark-ignition nanofuel engine operating at 1 cycle per second (cps), this requires replacing the neutron generator on a daily basis. Alternatively, after a minute of spark-ignition engine operation, fission product delayed neutrons provide a natural internal neutron source and allow a transition to compression-ignition engine operation.

Now let us turn to the numerical calculation of the ideal Otto cycle combustion process. The following simulations use a self-consistent time-dependent Lagrangian hydrodynamics and Monte Carlo neutron-photon-electron transport model. The Lagrangian hydrodynamics model uses second-order discretizations (William D. Schulz. Two-Dimensional Lagrangian Hydrodynamic Difference Equations. Technical Report UCRL-6776, LRL, April 1963. Robert D. Richtmyer and K. W. Morton. *Difference methods for initial-value problems*. Interscience Publishers, New York, second edition, 1967. William H. Press, Saul A. Teukolsky, William T. Vetterling, and Brian P. Flannery. *Numerical recipes infortran: the art of scientific computing*. Cambridge University Press, New York, second edition, 1992.); the Monte Carlo transport model is MCNP5 (X-5 Monte Carlo Team. MCNP—a general

TABLE 3

Nanofuel engine ideal Otto cycle combustion process simulations for the nanofuels identified in Table 1 and the critical dimensions presented in Table 2.

| label | Q [MJ] | $T_3$ [K] | $p_3$ [bar] | $\sigma_{\theta\theta}$ [bar] | $\alpha_2$ [1/s] | $\tau_b$ [ms] |
|---|---|---|---|---|---|---|
| a | 436.0 | 2,997 | 1,243 | 2,603 | 246.5 | 16.23 |
| b | 427.3 | 4,730 | 1,553 | 3,014 | 324.2 | 12.34 |
| c | 483.0 | 4,988 | 2,069 | 3,787 | 398.4 | 10.04 |
| d | 398.8 | 2,664 | 1,323 | 2,728 | 193.0 | 20.73 |
| e | 423.4 | 3,514 | 1,740 | 3,328 | 281.4 | 14.21 |
| f | 490.4 | 4,666 | 2,318 | 4,189 | 336.5 | 11.89 |
| g | 456.4 | 2,686 | 1,555 | 3,188 | 142.1 | 28.15 |
| h | 455.2 | 3,258 | 1,886 | 3,623 | 202.1 | 19.79 |
| i | 602.1 | 5,005 | 2,898 | 5,195 | 261.0 | 15.32 |

Monte Carlo N-Particle transport code, version 5. Technical Report LA-UR-03-1987, LANL, February 2008.).

Nanofuel engine simulation initialization includes:

1. Set the nanofuel properties in state 1: $\rho_1=0.002$ g/cm$^3$ and $T_1=350$ K.

2. For isentropic compression (r=10) of an ideal gas ($\gamma=1.4$), the nanofuel properties in state 2 are: $\rho_2=0.02$ g/cm$^3$ and $T_2=879$ K.

3. Set $H_2=2R$ (optimal engine core geometry) to minimize neutron leakage from the engine core when the piston is in the TDC crank position.

4. Surround the engine core with a 40 cm thick Be neutron reflector (T=800 K) to further reduce neutron leakage (see App. A). The reflector includes both the piston case and the piston itself.

5. Inject $10^8$ fusion (14 MeV) neutrons into the engine core over 1 µs. This starts the combustion process, which ends due to the nanofuel negative $\alpha_T$.

Table 3 presents the simulation results for the nanofuels identified in Table 1 and the critical dimensions presented in Table 2. Q is the energy absorbed in the nanofuel during the combustion process; $T_3$ ($p_3$) is the nanofuel temperature (pressure) in state 3; $\sigma_{\theta\theta}$ is the maximum hoop stress at the piston case inner surface (see App. B); $\alpha_2$ is the neutron population exponential growth factor in state 2; and $\tau_b=4/\alpha_2$ is the Nordheim-Fuchs burst duration. In particular, for Fuel c: Q=483.0 MJ; $T_3=4,988$ K ($p_3=2,069$ bar); $\sigma_{\theta\theta}=3,787$ bar; $\alpha_2=398.4$ 1/s; and $\tau_b=10.04$ ms.

The ideal Otto cycle efficiency is $\eta=60.19\%$. For a nanofuel engine operating at 1 cps, the Fuel c ideal engine performance metrics include: net work per cycle W=290.7 MJ; engine power P=290.7 MW ($3.899 \times 10^5$ hp); and electric power output $P_e=284.9$ MW$_e$ (assuming 98% generator efficiency). This is an efficient nuclear reactor. In general, these results are consistent with experimental data from a number of reactor safety tests and pulsed reactor systems. (David L. Hetrick. *Dynamics of nuclear reactors*. American Nuclear Society, La Grange Park, Ill., 1993.)

6 ENGINE PERFORMANCE

Numerous design factors affect nanofuel engine performance. Engine design involves optimizing the economics, size, weight, power, durability, reliability, efficiency, life expectancy, and many other factors for a particular application. Before designing a nanofuel engine for an electric power plant, this section models the performance of a generic 4-stroke reciprocating nanofuel engine operating in spark-ignition and compression-ignition mode.

For both ignition methods, nanofuel engine simulation initialization includes:

1. Select the nanofuel given by Fuel c in Table 1.
2. Set the nanofuel properties in state 1: $\rho_1$=0.002 g/cm$^3$ and $T_1$=350 K.
3. Assign the engine core dimensions: R=$H_1$/20=50 cm. These dimensions form the optimal engine core geometry (H=2R) when r=10.
4. Surround the engine core with a 40 cm thick Be neutron reflector (T=800 K), which includes both the piston case and the piston itself.

The piston dynamics and engine core height are treated as a moving boundary condition that evolves in time according to $$H(t)=(l_r+l_c+2H)+l_c \cos(cps 4\pi t)-\sqrt{l_r^2-l_c^2\sin^2(cps 4\pi t)}, \quad (23)$$

where $l_r$ ($l_c$) is the connecting rod 208 (crank) length (see FIG. 2). The following nanofuel engine simulations use $l_r$=18 m and $l_c$=4.5 m.

6.1 Spark-Ignition Mode

Figure 10:
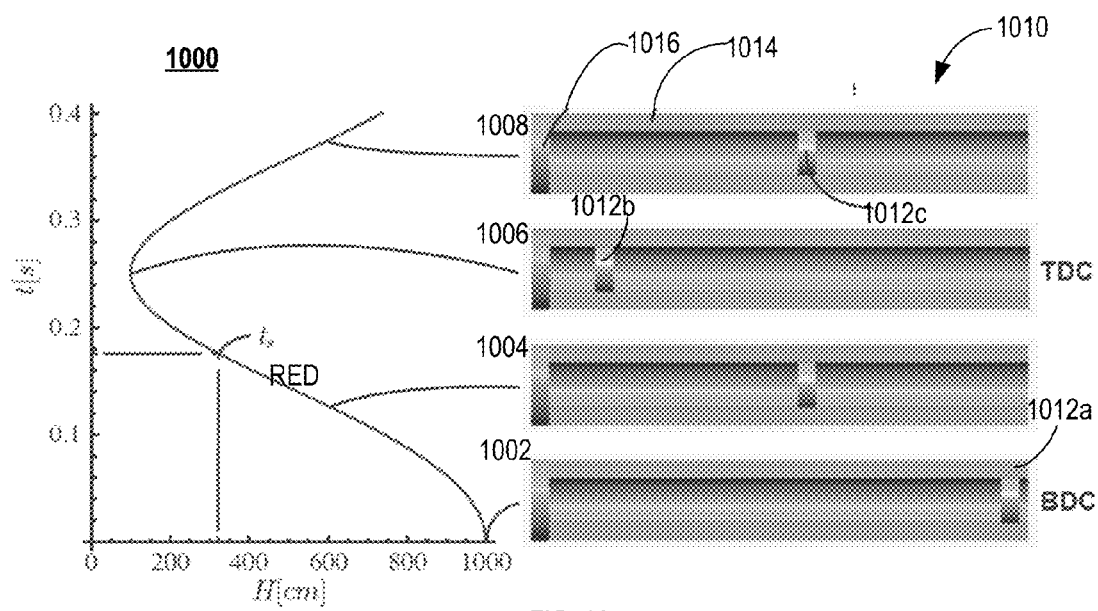
FIG. 10 depicts a simulation geometry and piston dynamics of a 4-stroke reciprocating nanofuel engine ($l_r=18$ m, $l_c=4.5$ m) operating at 1 cps, according to an exemplary embodiment.

Spark-ignition is the preferred method of starting a nanofuel engine. FIG. 10 including graph 1000 and piston illustration, illustrates the simulation geometry and piston 1014 dynamics of a 4-stroke reciprocating nanofuel engine operating at 1 cps, where a BDC crank position 1012a has the maximum surface-to-volume ratio 1002, and where the volume of the engine core is bounded by the inner piston cylindrical wall of 1014, the end cap 1016 and moving crank position 1012c. The piston 1014 reaches the TDC crank position 1012b (quarter cycle) and the engine core attains the minimum surface-to-volume ratio 1006 ($H_2$=2R=100 cm) at t=250 ms. The system forms a critical assembly at t=146.1 ms (H=485.2 cm, $\ell$=2.061). Compared to the bare engine core example in Sec. 4, where the system formed a critical assembly at H=107.6 cm, the neutron reflector significantly decreases the critical radius (size) of the engine core for given mass of nanofuel.

The spark time ($t_s$) is the time when the pulsed fusion neutron generator is fired and neutrons are injected into the system. The optimal spark time maximizes torque. In spark ignition mode, where the main objective is to start the engine and allow fission product delayed neutrons to accumulate, it is sufficient to ensure the peak nanofuel pressure occurs after the piston reaches the TDC crank position 1012b. Since there is little neutron population amplification near the critical transition, this nanofuel engine simulation set $t_s$=175 ms (H=322.7 cm, r=3.099) and injected $10^8$ fusion (14 MeV) neutrons into the system within 1 µs.

Spark-ignition nanofuel engine simulation results include: Q=613.1 MJ, $\xi$=20.92, $T_3$=5,078 K, and $p_3$=1,870 bar. For comparison, the equivalent ideal Otto cycle combustion process simulation results are: Q=622.5 MJ, $\xi$=21.24, T3=5,274 K, and $p_3$=2,188 bar. In the non-ideal simulation the engine core spends more time away from the optimal geometry, which increases the neutron leakage and decreases the peak nanofuel properties.

Maintaining the structural integrity of the material surrounding the engine core sets an upper limit on the peak nanofuel properties, and hence the maximum energy released per power cycle. It is undesirable to allow any portion of the piston case or piston to melt or undergo plastic deformation. Compared to a fossil-fuel based internal-combustion engine, a nanofuel engine has similar heat transfer characteristics (heat flux, thermal stress) and higher intake fuel pressures (to reduce engine core size). To study the effect of this pressure increase, App. B uses the theory of elasticity to calculate the piston case deformation due to the nanofuel pressure. The piston case will undergo elastic deformation provided the hoop stress at the inner surface of the piston case is below 90% of the material yield strength.

From Eq. 67 (Eq. 68) the hoop stress (deflection) at the inner surface of the piston case is $\sigma_{\theta\theta}$=3,540 bar (u=670.3 µm); from Eq. 69 the Be yield strength is $\sigma_y$(800K)=2,114 bar; and the peak nanofuel pressure limit is $p_{max}$<~1005 bar. In this engine simulation: $p_3$>$p_{max}$. Although $\sigma_{\theta\theta}$>$\sigma_y$(800K), the hoop stress drops below the Be yield strength at R=72.70 cm or 22.70 cm into the reflector.

Aside from limiting the energy released per power cycle, there are two engineering approaches to improving the structural integrity of a nanofuel engine. First, applying an external pressure of $p_{out}$=565.9 bar to the piston case outer surface reduces the hoop stress at the inner surface of the piston case to 90% of the Be yield strength. With this applied pressure the deflection at the inner surface of the piston case is u=365.6 µm. Second, cooling the piston case to T=400 K (T=600 K) increases the Be yield strength to $\sigma_y$(400K)=3,541 bar ($\sigma_y$(600K)=2,788 bar).

Figure 11A:
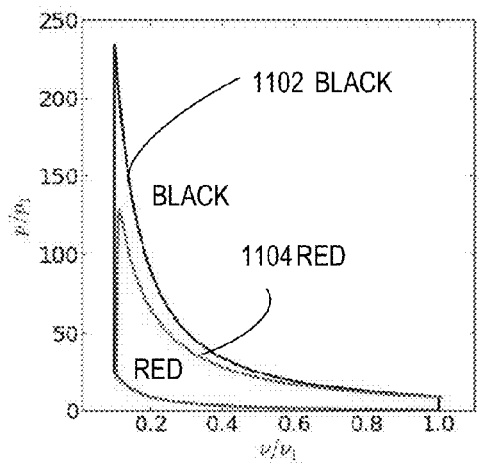
FIGS. 11A and 11B depict spark-ignition reciprocating nanofuel engine simulation, (a) Simulated (red) and ideal (black, r=10, $\xi$=20.92, and $\gamma$=1.389) Otto cycle, (b) Nanofuel (black) and motored (dashed red) p as a function of time, respectively, according to an exemplary embodiment.
Figure 11B:
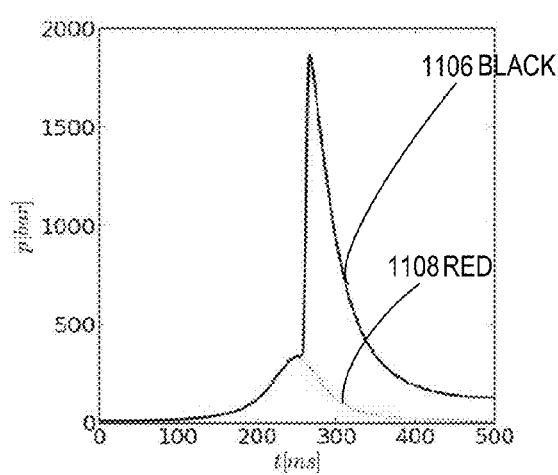

FIG. 11A graph 1100 compares the simulated and ideal (r=10, $\xi$=20.92, and $\gamma$=1.389) Otto cycles. In particular, the simulated (ideal) nanofuel engine efficiency is $\eta$=38.23% (59.17%). General spark-ignition engine performance metrics include: net work per cycle W=234.4 MJ; engine power P=234.4 MW (3.138×10$^5$ hp); and electric power output Pe=229.7 MW$_e$ (assuming 98% generator efficiency). FIG. 11B graph 1110 illustrates the increase in nanofuel pressure during the combustion process compared to the motored pressure, which is the pressure in an engine that does not release energy. Nuclear energy is clearly absorbed in the working fluid and the peak pressure occurs at t=266.0 ms, which is after the quarter cycle time.

In a conventional spark-ignition engine the fuel-air mixture combustion process is initiated by an electric discharge. A deflagration front starts at the initiation point and propagates through the fuel-air mixture until it reaches the engine core surface. In a spark-ignition nanofuel engine a deflagration front does not exist. Instead, the combustion process is initiated by the injection of fast fusion neutrons into the system. Fast neutrons rapidly escape the engine core and are thermalized in the reflector; thermal neutrons diffuse into the engine core from all reflector surfaces and propagate the fission chain reaction. Simulation results show that thermal (fast) neutrons account for more than 95% (less than 0.5%) of the fissions. This nanofuel engine combustion process exhibits uniform volumetric heating of the working fluid and allows scaling to high-power single-cylinder engines.

Figure 12A:
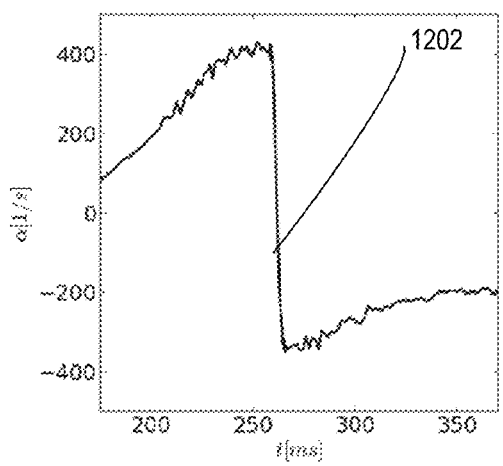
FIGS. 12A and 12B depict spark-ignition reciprocating nanofuel engine simulation depicting (a) $\alpha$ 1/s, and (b) Q GJ/s as a function of time, respectively, according to an exemplary embodiment.
Figure 12B:
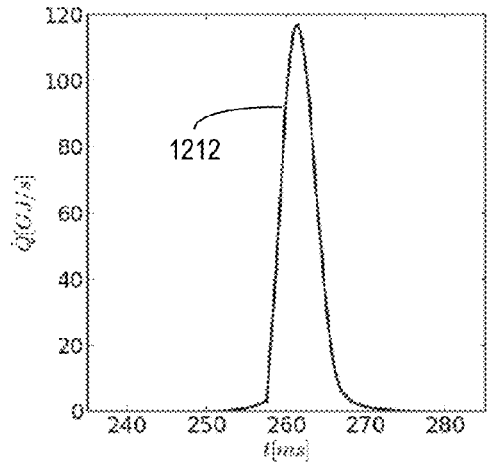

FIG. 12A graph 1200 plots $\alpha$ as a function of time. During the compression stroke $\alpha$ increases as the nanofuel density increases; $\alpha$ rapidly decreases due to the nanofuel negative $\alpha_T$; and during the expansion stroke $\alpha$ slightly increases as the nanofuel temperature decreases. FIG. 12B graph 1210 plots the nanofuel energy absorption rate ($\dot{Q}$) as a function of time. According to the Nordheim-Fuchs model, the burst duration is approximately $\sigma_b$=4/$\alpha$~4/400 s~10 ms. This curve can be approximated by a square wave function of height $Q\sim58.4$ GJ/s (halfmax) and duration $\sigma_b\sim10$ ms, thereby absorbing $Q\sim584$ MJ. This estimate is close to the spark-ignition simulation result $Q=613.1$ MJ.

6.2 Compression-Ignition Mode

Compression-ignition is the preferred method of long-term nanofuel engine operation. During spark-ignition engine operation, fission product delayed neutrons accumulate and after about a minute they provide a sufficient internal neutron source ($S_N$) for compression ignition engine operation.

In the previous spark-ignition nanofuel engine simulation the initial mass of nanofuel contained $N_0=1.206\times10^{25}$ fissile fuel ($^{239}$puF$_6$) molecules and the power cycle produced Nf=$2.410\times10^{19}$ fissions, assuming the effective energy released per $^{239}$Pu fission is 198.5 MeV/f and 80% of this energy is deposited in the nanofuel (James J. Duderstadt and Louis J. Hamilton. *Nuclear reactor analysis*. John Wiley & Sons, New York, 1976.). Therefore, only a small fraction of the fissile fuel is depleted during the power cycle ($N_f/N_0=1.999\times10^{-6}$) and the initial mass of nanofuel contains fissile fuel for several power cycles ($5.003\times10^5$ cycles assuming complete utilization).

Thermal neutron-induced $^{239}$Pu fission produces 0.0061 delayed neutrons distributed over several precursor groups with half-lives less than 60 s. (R. J. Templin. Reactor physics constants. Technical Report 5800, ANL, July 1963.) Therefore, retaining 1% of the exhaust (nanofuel) in the engine core provides an internal neutron source of SN$\sim2.450\times10^{13}$ N/s. An internal neutron source of SN=1014 N/s can be maintained by retaining 4.081% of the exhaust through orificing, which is the process of adjusting the nanofuel intake and exhaust properties.

Since the nanofuel properties in state 1 and the variable compression ratio are set by the simulation initial conditions, maximum torque is obtained by adjusting the operating speed to 1.5 cps. Compression-ignition nanofuel engine simulation results include: Q=614.1 MJ, $\xi$=20.95, $T_3$=5, 106 K, and $p_3$=1, 966 bar. At these operating conditions: $S_N$ is maintained by retaining 2.716% of the exhaust in the engine core; and the nanofuel properties in state 1 are maintained by reducing the intake nanofuel mass flow rate and temperature.

Figure 13A:
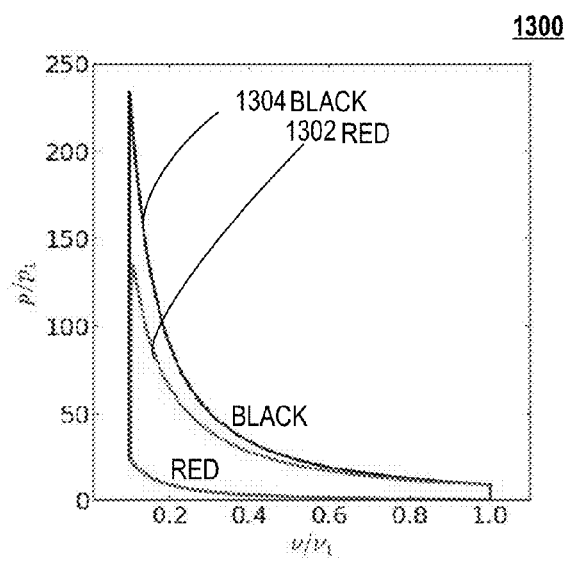
FIGS. 13A and 13B depict compression-ignition reciprocating nanofuel engine simulation, (a) Simulated (red) and ideal (black, r=10, $\xi$=20.95, and $\gamma$=1.389) Otto Cycle, (b) Nanofuel (black) and motored (dashed red) p as a function of time, according to an exemplary embodiment.
Figure 13B:
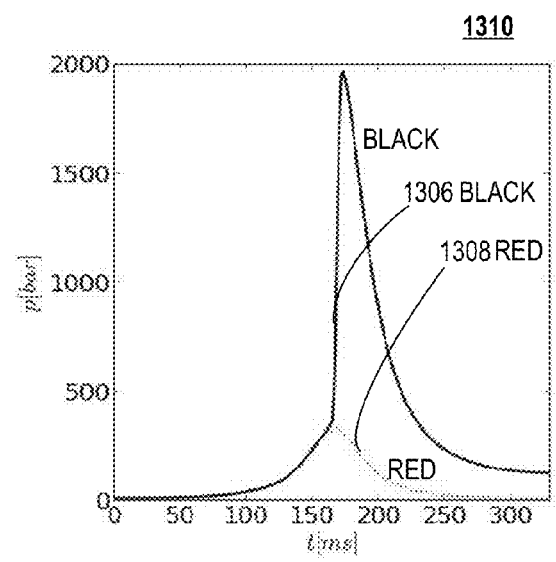

FIG. 13A graph 1300 compares the simulated and ideal (r=10, $\xi$=20.95, and $\gamma$=1.389) Otto cycles. In particular, the simulated (ideal) nanofuel engine efficiency is $\eta$=43.22% (59.17%). Compression-ignition engine performance metrics include: net work per cycle W=265.4 MJ; engine power P=398.1 MW ($5.339\times10^5$ hp); and electric power output $P_e$=390.1 MW$_e$ (assuming 98% generator efficiency). FIG. 13B graph 1310 illustrates the increase in nanofuel pressure during the combustion process compared to the motored pressure. The nanofuel pressure begins to depart from the motored pressure before the quarter cycle time (t=166.7 ms) and peaks at t=173.1 ms.

FIG. 14 (collectively referring to FIGS. 14A-14D) plots several system properties as a function of time from the compression ignition reciprocating nanofuel engine simulation. FIG. 14A graph 1400 graphing ($k_{eff}$) and FIG. 14B graph 1410 graphing ($\alpha$) show that the system turns critical ($k_{eff}$=1, $\alpha$=0 1/s) at t=98.23 ms. FIG. 14C graph 1420 graphing (N) shows that the neutron population does not exponentially amplify until the system turns critical. It also shows that the neutron population peaks at t=169.0 ms, which is 70.77 ms after the system turns critical. FIG. 14D graph 1430 shows that most of the nuclear energy is absorbed in the nanofuel (working fluid) within a 10 ms window around the neutron population peak.

In a nanofuel engine the combustion process significantly overlaps the compression and expansion strokes. Although a majority of the nuclear energy absorbed in the working fluid during the combustion process occurs in a short period of time (10 ms), the entire combustion process occurs over a much longer period of time (140 ms). This latter time-scale affects the nanofuel engine operating speed.

Figure 14A:
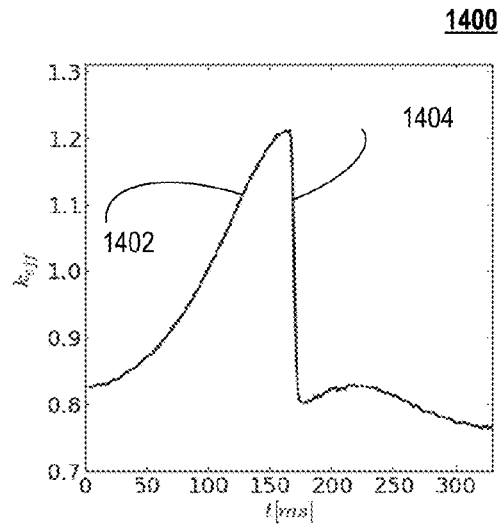
FIGS. 14A, 14B, 14C, and 14D depict compression-ignition reciprocating nanofuel engine simulation depicting several system properties, namely $k_{eff}$, $\alpha$ [1/s], N, and U[MJ] (black dark line) and Q [MJ] (red light line), respectively, as a function of time, according to an exemplary embodiment.
Figure 14B:
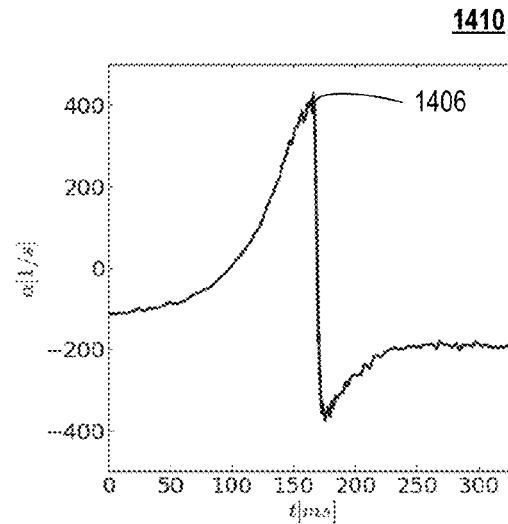
Figure 14C:
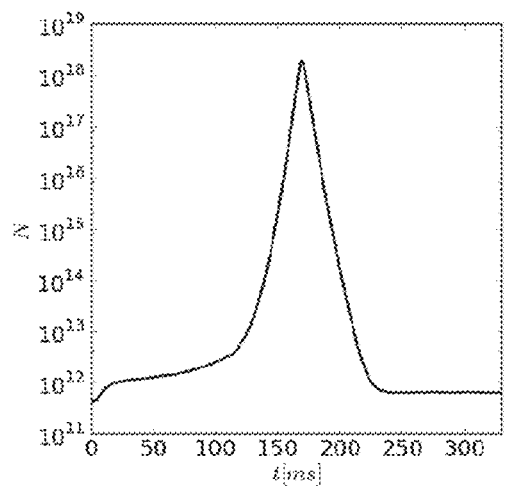
Figure 14D:
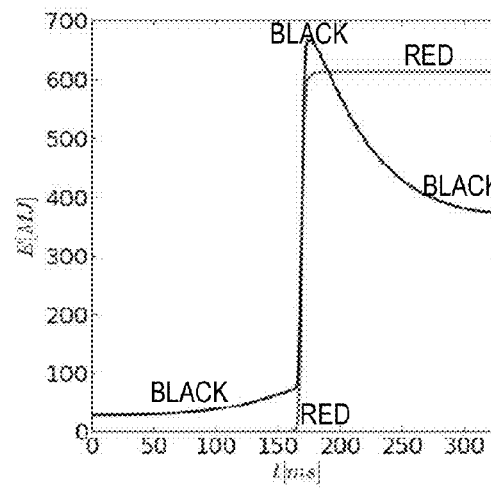
Figures 15A, 15B:
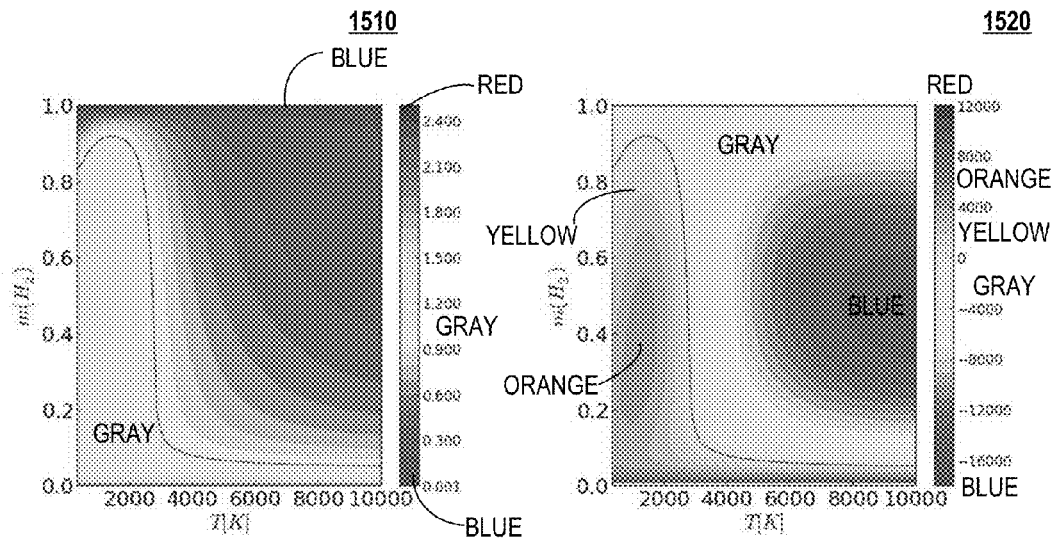
FIGS. 15A and 15B depict 10,100 MCNP5 simulations depicting (a) $k_\infty$ and (b) $\alpha$ as a function of m($H_2$, Transuranic) and T for a fixed $\rho=0.028$ g/cm$^3$, the solid black contour corresponds to (a) $k_\infty=1$ and (b) $\alpha=0$ [1/s], respectively, according to an exemplary embodiment.
Figures 16A, 16B:
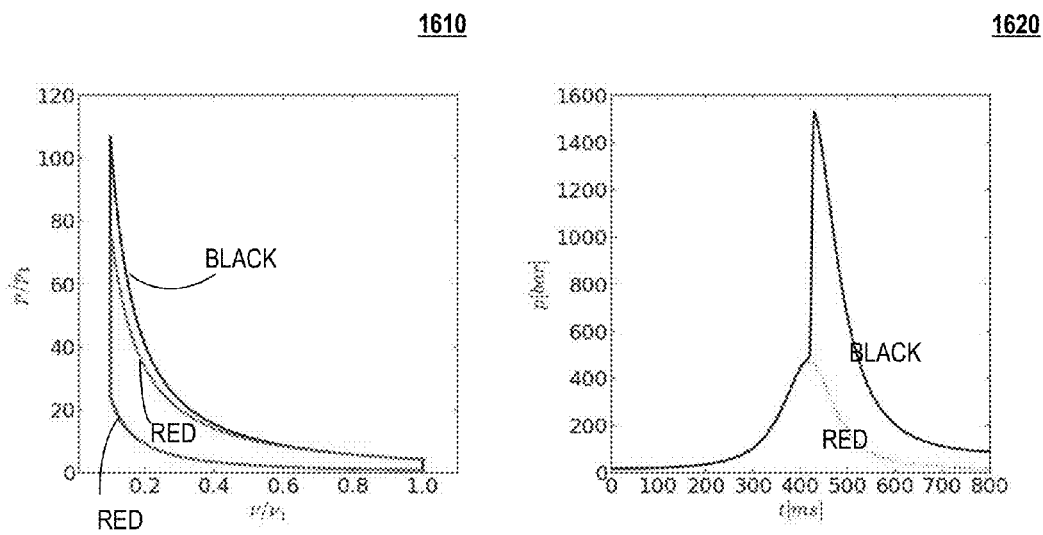
FIGS. 16A and 16B depict compression-ignition reciprocating LWR SNF nanofuel engine simulation, (a) Simulated (red) and ideal (black, r=10, $\xi$=8.225, and $\gamma$=1.389) Otto cycle, and (b) Nanofuel (black) and motored (dashed red) p [bar] as a function of time, respectively, according to an exemplary embodiment.

FIG. 14D graph 1430 shows that the exhaust contains a substantial amount of energy. In particular, the heat lost from the system is $Q_{41}$=$-$348.7 MJ. Converting half this energy into useful work can boost the total system efficiency ($\eta$>70%).

7 LWR SNF NANOFUEL

The UREX+ (uranium reduction extraction) process offers several proliferation resistant options for commercial light-water reactor (LWR) spent nuclear fuel (SNF) treatment. In particular, the UREX+1a process separates the transuranic elements, which are the primary long-term dose rate contributors in nuclear waste, in a single product stream. (M. C. Regalbuto. Alternative separation and extraction: UREX+ processes for actinides and targeted fission product recovery. In Kenneth L. Nash and Gregg J. Lumetta, editors, *Advanced separation techniques for nuclear fuel reprocessing and radioactive waste treatment*. Woodhead Publishing, Philadelphia, 2011.) Transmuting (or otherwise eliminating) these elements reduces the volume and radiotoxicity of nuclear waste. This section explores nanofuels comprised of the transuranic elements from LWR SNF and their performance in a nanofuel engine.

Creating a nanofuel comprised of the transuranic elements from LWR SNF involves a few basic chemical processes, namely:

1. Form a tetrafluoride mixture of the transuranic elements (NpF$_4$, PuF$_4$, and AmF$_4$), which can be accomplished thorough one or more UREX+ modules. The resultant product includes fissile fuel ($^{239}$PuF$_4$), passive agent ($^{240}$PuF$_4$), and transuranic elements (everything else). The ratio of fissile fuel to passive agent is determined by the LWR SNF feedstock.

2. Convert the tetrafluoride mixture into a hexafluoride mixture using elemental fluorine as the fluorinating agent. Since AmF$_4$ does not fluorinate, the presence of solid AmF$_4$ particulates dispersed within the gaseous hexafluoride medium forms a colloidal system.

TABLE 4

Renormalized LWR SNF transuranic isotopic mass fractions. The MCNP5 $k_\infty$ and $\alpha$ results correspond to a nanofuel with: m(H$_2$) = m(SNF) = 0.5, $\rho$ = 0.02 g/cm$^3$, and T = 879 K.

| Isotope | Pu-Only | Transuranic |
|---|---|---|
| $^{237}$Np | — | 0.0679 |
| $^{238}$Pu | 0.0326 | 0.0290 |
| $^{239}$Pu | 0.5556 | 0.4944 |
| $^{240}$Pu | 0.2581 | 0.2297 |
| $^{241}$Pu | 0.0988 | 0.0879 |
| $^{242}$Pu | 0.0549 | 0.0489 |
| $^{241}$Am | — | 0.0280 |
| $^{242}$Am | — | 0.0002 |
| $^{243}$Am | — | 0.0140 |
| $k_\infty$ | 1.421 | 1.360 |
| $\alpha$ [1/s] | 3,320 | 2,670 |

3. Mix the aerosol with molecular hydrogen (moderator) until the desired concentration is achieved.

Given the large variation in LWR SNF composition, let us focus on a particular scenario from the fuel cycle analysis group at the Idaho National Laboratory. (R. M. Ferrer, S. Bays, and M. Pope. Evaluation of homogeneous options: effects of minor actinide exclusion from single and double tier recycle in sodium fast reactors. Technical Report INL/EXT-08-14034, INL, March 2008. S. Bays, H. Zhang, and M. Pope. Deep burn fuel cycle integration: evaluation of two-tier scenarios. Technical Report INL/EXT-09-15915, INL, May 2009.) The characteristics of this feedstock include: 4.21% initial enrichment; 50 GWd/t (gigawatt-days of thermal output per metric ton of heavy metal) burnup; 5 years of storage; and an additional 2 years of reprocessing and fabrication before reuse. Table 4 presents the renormalized transuranic isotopic mass fractions for a Pu-Only product stream and a Transuranic product stream.

Table 4 includes MCNP5 $k_\infty$ and $\alpha$ results for a nanofuel with: $m(H_2)=m(SNF)=0.5$, $\rho=0.02$ g/cm3, and T=879 K. SNF refers to either the Pu-Only or Transuranic isotopic distribution. For the Pu-Only (Transuranic) isotopic distribution $k_\infty=1.421$ (1.360) and $\alpha$=3, 320 l/s (2,670 l/s). The Transuranic nanofuel properties are comparable to Fuel d.

FIG. 15A graph 1510 plots $k_\infty$ and FIG. 15B graph 1520 plots $\alpha$ as a function of the nanofuel ingredient mass fractions m (Hz Transuranic) and T for a fixed $\rho=0.028$ g/cm$^3$. The mass fractions form a convex combination and the mass fraction m(Transuranic) is found from m(Transuranic)=1−$m(H_2)$. The abscissa (ordinate) reflects 100 (101) logarithmically (uniformly) spaced nanofuel temperatures (mass fraction m(Transuranic)).

FIGS. 15A and 15B illustrates a large range of supercritical ($k_\infty>1$, $\alpha>0$ l/s) nanofuels at low T. In particular, there exists a sizeable plateau with $k_\infty\sim1.3$ and $\alpha\sim4$, 000 l/s. For moderator mass factions in the domain $0.2<m(H_2)<0.8$, the nanofuels clearly exhibit a negative $\alpha$T with a criticality transition near T~2, 700 K.

Now let us model the performance of a 4-stroke reciprocating LWR SNF nanofuel engine operating in compression-ignition mode. Nanofuel engine simulation initialization includes:

1. Select the nanofuel with an equal mass fraction mixture of molecular hydrogen and the Transuranic isotopic distribution given in Table 4 ($m(H_2)$=m(Transuranic)=0.5).
2. Set the nanofuel properties in state 1: $\rho_1=0.0028$ g/cm$^3$ and $T_1=350$ K.
3. Assign the engine core dimensions: $R=H_1/20=60$ cm.
4. Use the piston moving boundary condition (see Eq. 23) with $l_r=21.6$ m and $l_c=5.4$ m, these dimensions form the optimal engine core geometry (H=2R) when r=10.
5. Surround the engine core with a 40 cm thick Be neutron reflector (T=800 K).
6. Operate the engine at 0.6 cps and $S_N=10^{14}$ N/s.

LWR SNF nanofuel engine simulation results include: Q=583.2 MJ, $\xi=8.225$, $T_3$=2, 723 K, and $p_3$=1, 530 bar. From App. B, the hoop stress (deflection) at the inner surface of the piston case is $\sigma_{\theta\theta}$=3, 251 bar (u=737.4 μm) and the Be yield strength is $\sigma_y$(800K)=2, 114 bar. Applying an external pressure of pout=895.2 bar to the piston case outer surface reduces the hoop stress at the inner surface of the piston case to 90% of the Be yield strength.

FIG. 16A graph 1610 compares the simulated and ideal (r=10, $\xi=8.225$, and $\gamma=1.389$) Otto cycles. In particular, the simulated (ideal) nanofuel engine efficiency is $\eta=48.48\%$ (59.17%). LWR SNF nanofuel engine performance metrics include: net work per cycle W=282.7 MJ; engine power P=169.6 MW ($2.274\times10^5$ hp); and electric power output $P_e=166.2$ $MW_e$ (assuming 98% generator efficiency). FIG. 16B graph 1620 illustrates the increase in nanofuel pressure during the combustion process compared to the motored pressure. The nanofuel pressure begins to depart from the motored pressure before the quarter cycle time (t=416.7 ms) and peaks at t=428.6 ms.

Compared to the compression-ignition nanofuel engine simulation in Sec 6.2, the compression-ignition LWR SNF nanofuel engine simulation releases less energy in a larger volume and operates at a lower speed. The decrease in engine core pressure improves the structural integrity. The decrease in operating speed is due to a decrease in the peak neutron population exponential growth factor from $\alpha$ ~425 l/s to $\alpha$ ~220 l/s. Since the electric power output is proportional to the operating speed, there is an equivalent reduction in electric power output from $P_e=390.1$ $MW_e$ to $P_e=166.2$ $MW_e$.

These preliminary results demonstrate the feasibility of using the transuranic elements from LWR SNF in a nanofuel engine. The nanofuel can incorporate trace amounts of radioactive isotopes with minimal degradation in nanofuel engine performance. Compared to nanofuels comprised of the essential ingredients, the theft attractiveness of nanofuels comprised of the transuranic elements from LWR SNF decreases. (Charles G. Bathke, Bartley B. Ebbinghaus, Brad W. Sleaford, Richard K. Wallace, Brian A. Collins, Kevin R. Hase, Gordon D. Jarvinen, Keith S. Bradley, John R. Ireland, M. W. Johnson, Andrew W. Prichard, and Brian W. Smith. The attractiveness of materials in advanced nuclear fuel cycles for various proliferation and theft scenarios. Technical Report LA-UR-09-02466, LANL, 2009.)

8 WANKEL NANOFUEL ENGINE

The Wankel engine, named after the German engineer Felix H. Wankel, is a type of rotary engine. (Kenichi Yamamoto. *Rotary engine*. Toyo Kogyo Co., Hiroshima, Japan, 1971. Kenichi Yamamoto. *Rotary engine*. Sankaido Co., Tokyo, Japan, 1981. Kenneth C. Weston. *Energy conversion*. PWS Publishing Company, Boston, 1992.) It performs the intake, compression, expansion, and exhaust strokes while the engine core changes volume and the moving parts rotate in the same direction. For a power cycle the Wankel engine offers several advantages over the reciprocating engine, including:

1. an increase in the power system density, which is defined as the ratio of the engine core volume to the total engine volume;
2. a decrease in engine vibration, since the moving parts are in a continuous unidirectional motion and a rotating mass can be completely balanced by a counterweight;
3. the elimination of the intake-exhaust valve mechanism, which increases the engine operating speed and reduces the mechanical noise;
4. the elimination of the crank mechanism, which simplifies engine construction; and
5. a decrease in torque fluctuation, since the working fluid pressure is directly transmitted to the output shaft.

These Advantages Reduce Cost.

This section reviews the Wankel engine geometry, adapts the Wankel engine to support a nuclear chain reaction, and explores compact and economical Wankel nanofuel engine configurations. The next section models Wankel nanofuel engine performance.

8.1 Wankel Engine Geometry

Figures 17A, 17B:
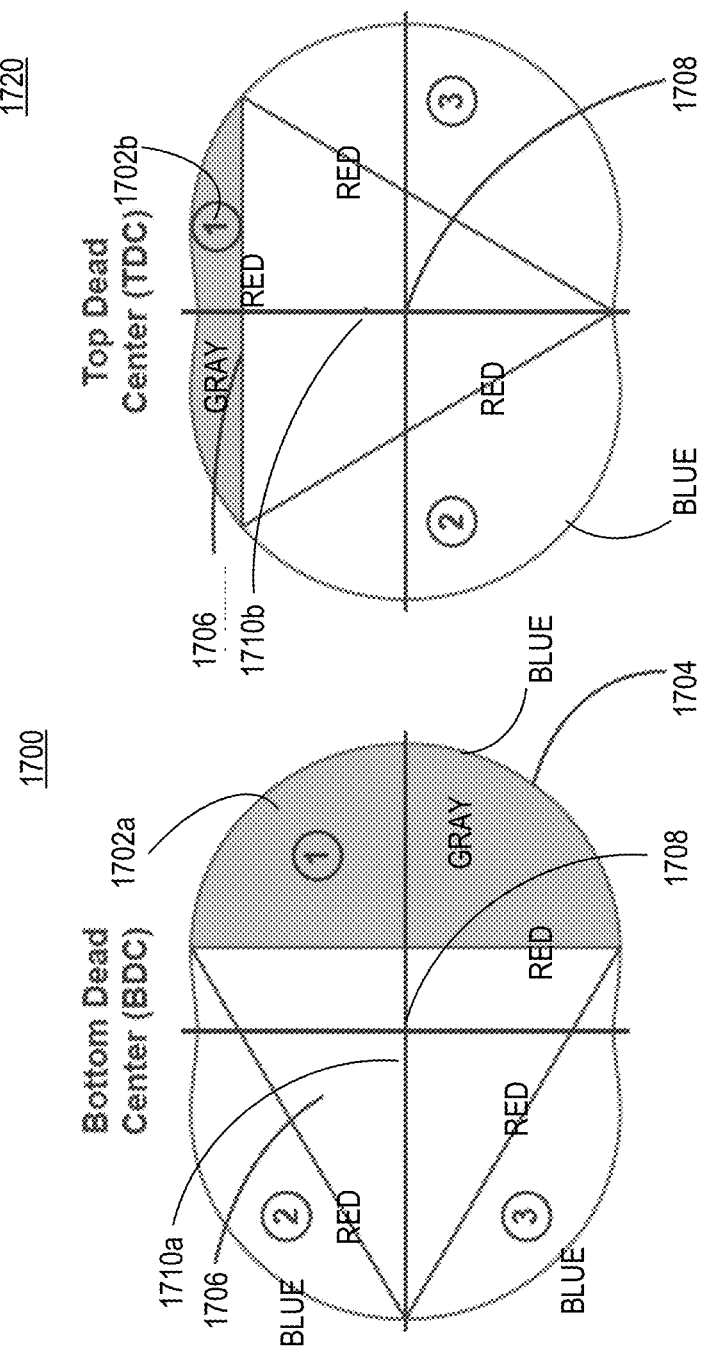
FIGS. 17A and 17B depict Wankel engine working fluid volumes and the main Otto cycle engine core configurations, namely the bottom dead center (BDC) position (left), and the top dead center (TDC) position (right), respectively, according to an exemplary embodiment.

FIGS. 17A and 17B illustrates the Wankel engine two-lobe epitrochoid rotor housing and triangular rotor geometry. The rotor in a Wankel engine replaces the piston in a reciprocating engine. Instead of an oscillatory piston motion, the rotor executes a continuous unidirectional motion that directly transmits power to an output shaft.

The Wankel engine operates in an Otto cycle. During operation there are three variable working fluid volumes (engine cores) in different Otto cycle states. Each volume (V) contains a mass of fuel (M) that is constrained by the rotor housing, one rotor flank, and the side housing (which limits the volume along the output shaft axis). FIGS. 17A and 17B illustrate the three working fluid volumes along with the two main engine core configurations, namely the bottom dead center (BDC) position 1700 and the top dead center (TDC) position 1720.

Figure 18:
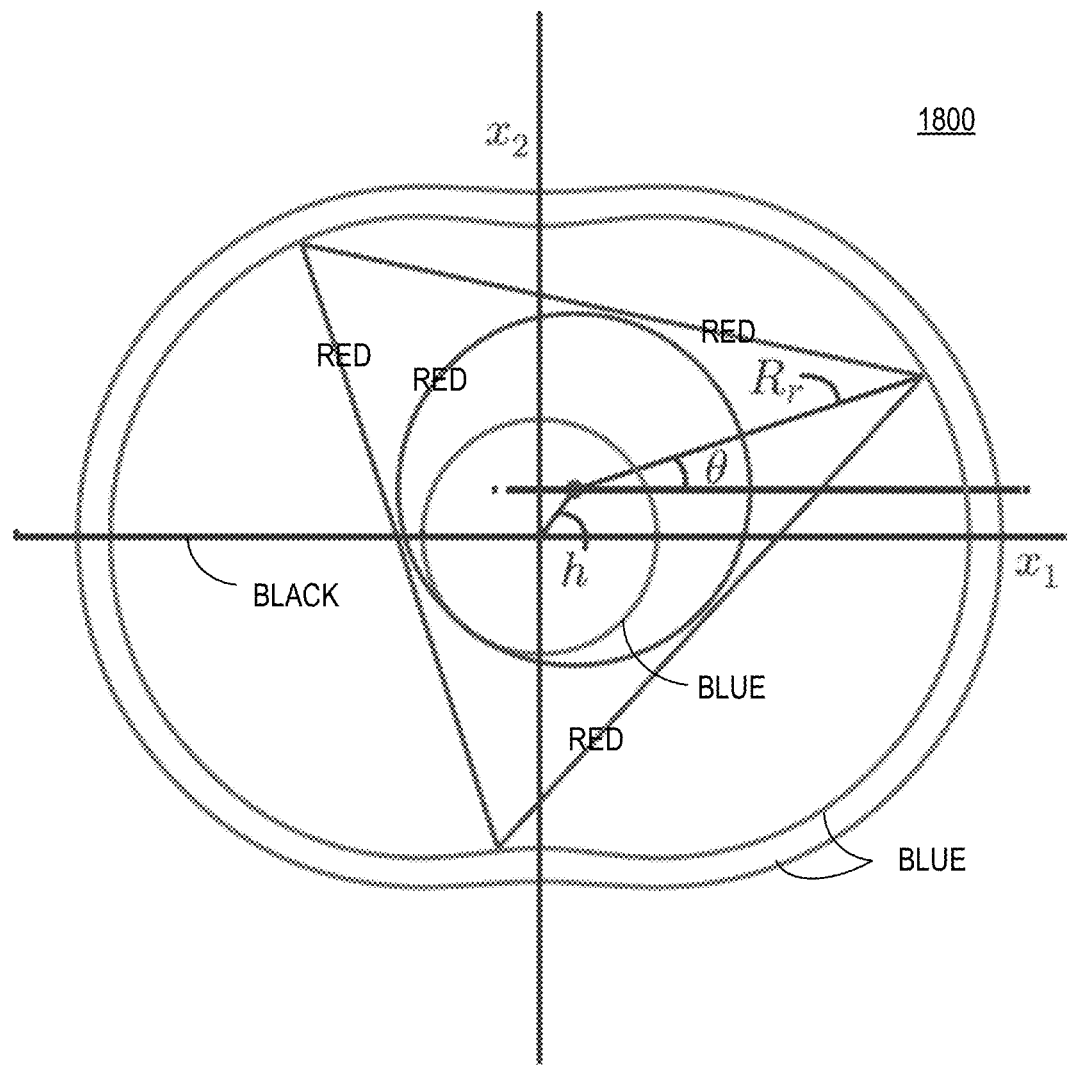
FIG. 18 depicts a Wankel engine rotor housing geometry, according to an exemplary embodiment.

FIG. 18 schematic diagram 1800 illustrates the Wankel engine rotor housing geometry. This two-lobe epitrochoid is given by $$x_1(\theta) = R_r \cos(\theta) + h \cos(3\theta), \qquad (24)$$

$$x_2(\theta) = R_r \sin(\theta) + h \sin(3\theta), \qquad (25)$$

where $(x_1, x_2)$ denotes the rotor housing curve in Cartesian coordinates, $\theta \in [0, 2\pi)$ is defined from the positive $x_1$-axis in the counterclockwise sense, $R_r$ is the generating radius (rotor center-to-tip distance), and $h$ is the eccentricity. (David H. Nash. Rotary engine geometry. Mathematics Magazine, 50(2):87-89, March 1977.) The rotor tip positions are given by $$x_{1m}(\theta) = R_r \cos\left(\theta + \frac{2m\pi}{3}\right) + h\cos(3\theta), \qquad (26)$$

$$x_{2m}(\theta) = R_r \sin\left(\theta + \frac{2m\pi}{3}\right) + h\sin(3\theta), \qquad (27)$$

where $m \in [0, 1, 2]$.

The ratio of h to Rr is the eccentricity ratio (h/Rr), which is geometrically constrained to $h/R_r \in [0, \frac{1}{4}]$. The upper limit requires a finite distance ($d_1$) between the rotor flank and the rotor housing minor axis when the engine core is in the TDC position:

$$d_1 = (R_r - h) - \left(\frac{1}{2}R_r + h\right) = \frac{1}{2}R_r - 2h > 0. \qquad (28)$$

The lower limit delivers no compression (r=1) and generates no torque.

Figure 19:
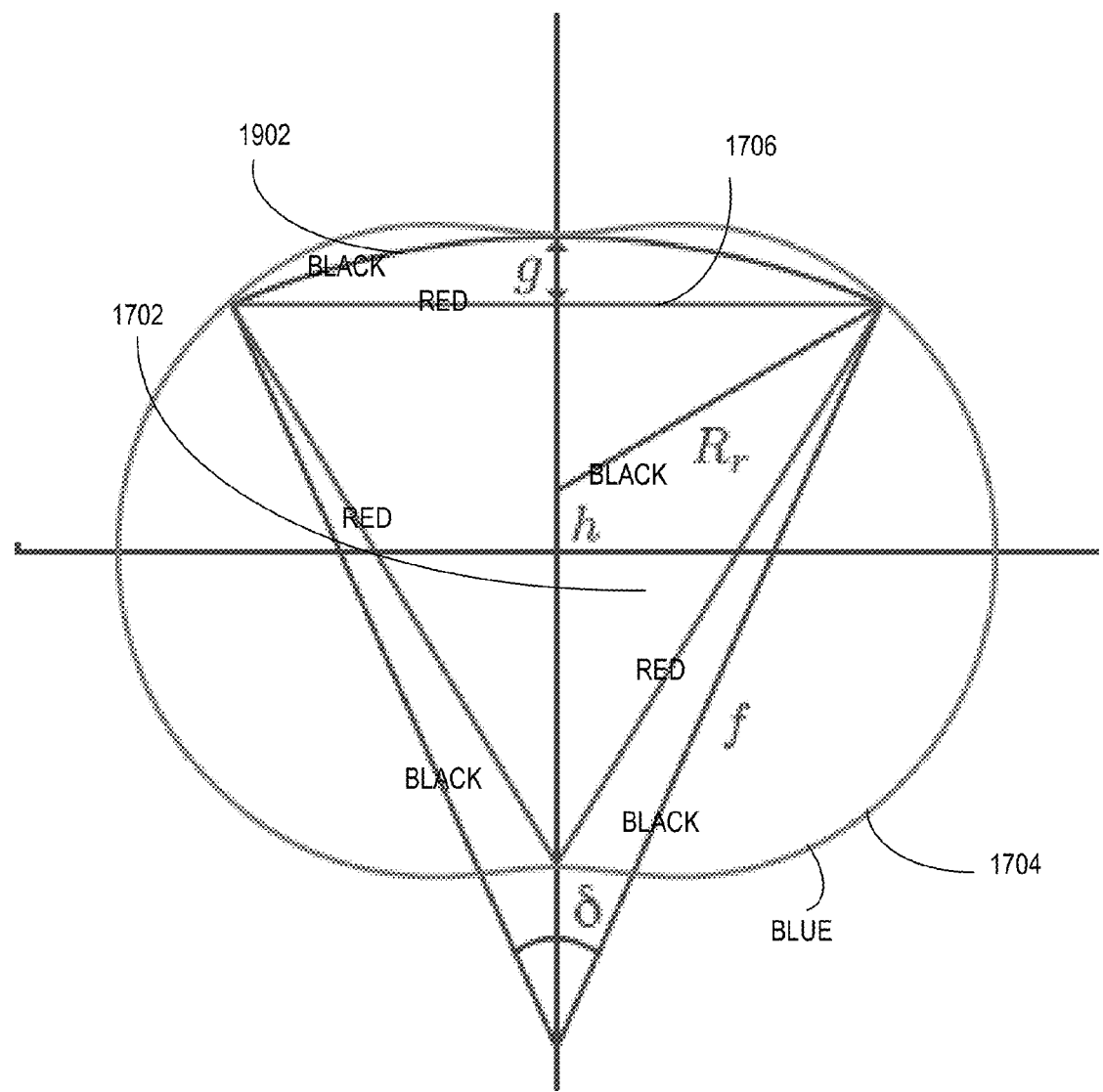
FIG. 19 depicts a Wankel engine circular arc flank rounding geometry, according to an exemplary embodiment.

Flank rounding modifies the rotor flank to reduce the engine core volume in the TDC position. This increases the Wankel engine compression ratio and thermal efficiency. FIG. 19 schematic diagram 1900 illustrates a circular arc flank, which is a common shape for flank rounding, and establishes the following geometric relations:

$$\frac{f}{R_r} = \frac{\sqrt{3}}{2}\csc\left(\frac{\delta}{2}\right), \qquad (29)$$

$$\frac{g}{R_r} = \frac{\sqrt{3}}{2}\tan\left(\frac{\delta}{4}\right), \qquad (30)$$

where f is the circular arc radius, $\delta$ is the angle subtended by the circular arc, and g is the maximum distance of the circular arc flank above the triangular flank. The condition $g < d_1$ ensures the rotor flank does not contact the rotor housing.

The Wankel engine compression ratio is given by $$r = \frac{V_{max} - V_{seg}}{V_{min} - V_{seg}}, \qquad (31)$$

where $V_{max}$ ($V_{min}$) is the engine core volume in the BDC (TDC) position and $V_{seg}$ is the additional rotor volume due to flank rounding. These volumes are given by $$\frac{V_{max}}{R_r^2 w} = \pi\left[\left(\frac{h}{R_r}\right)^2 + \frac{1}{3}\right] + \frac{\sqrt{3}}{4}\left[6\left(\frac{h}{R_r}\right) - 1\right], \qquad (32)$$

$$\frac{V_{min}}{R_r^2 w} = \pi\left[\left(\frac{h}{R_r}\right)^2 + \frac{1}{3}\right] - \frac{\sqrt{3}}{4}\left[6\left(\frac{h}{R_r}\right) + 1\right], \qquad (33)$$

$$\frac{V_{seg}}{R_r^2 w} = \frac{3}{8}\frac{\delta - \sin(\delta)}{\sin^2(\delta/2)}. \qquad (34)$$

where w is the rotor width.

8.2 Flank Cavity Design

Wankel engines introduce a flank cavity (or rotor recess) to improve performance. In an analogous fashion, let us study the behavior of a nanofuel (nuclear fuel) in a flank cavity (configuration designed to support a chain reaction).

Figure 20:
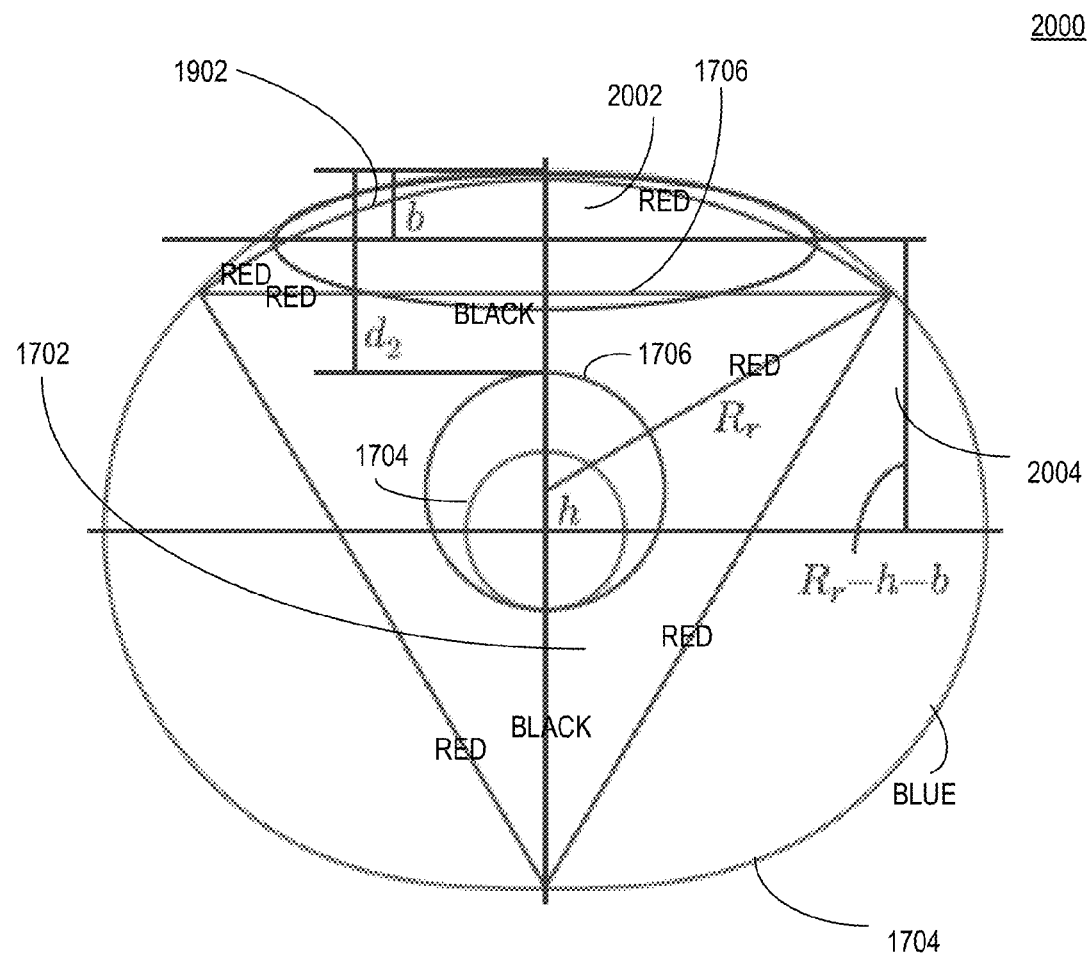
FIG. 20 depicts a Wankel nanofuel engine flank cavity geometry in the TDC position, according to an exemplary embodiment.

A spherical geometry minimizes the surface-to-volume ratio and hence neutron leakage. FIGS. 17A and 17B shows that the engine core in the TDC position 1720 is elongated along the major axis. Ellipsoids naturally accommodate this elongated shape and maintain the favorable neutron leakage properties of a sphere. FIG. 20 schematic diagram 2000 illustrates an ellipsoidal cavity with a minor axis length 2b and a major axis length 2a=2xb, where x is the ratio of the major axis length to the minor axis length and x=1 corresponds to a sphere.

Figure 21A:
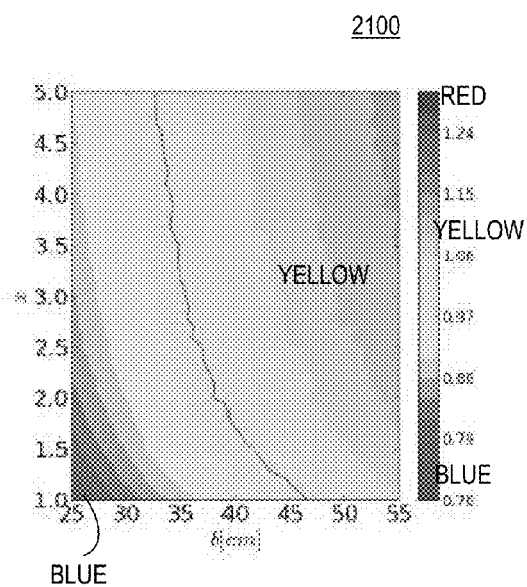
FIGS. 21A and 21B depict 1,271 MCNP5 simulations depicting (a) $k_{eff}$ and (b) $\alpha$ as a function of the ellipsoidal minor radius (b) and the multiplier x, where a=xb. The solid black contour corresponds to (a) $k_{eff}=1$ and (b) $\alpha=0$ [1/s], respectively, according to an exemplary embodiment.
Figure 21B:
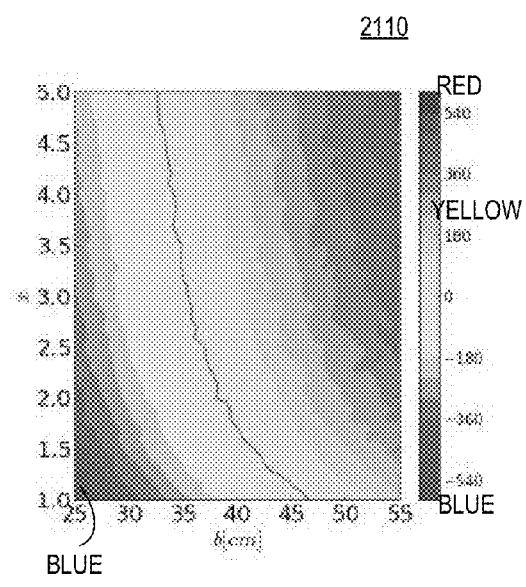

FIG. 21A plots $k_{eff}$ in graph 2100, and FIG. 21B plots $\alpha$ in graph 2110 as a function of the ellipsoidal minor radius (b) and the multiplier x. The nanofuel is comprised of an equal mass fraction mixture of $H_2$ and the Transuranic isotopic distribution given in Table 4 (m($H_2$)=m(Transuranic)=0.5) at a fixed $\rho$=0.028 g/cm$^3$ and T=734 K. The engine core is surrounded by a 30 cm thick Be neutron reflector at T=573.15 K (300 C).

FIG. 21 (collectively referring to FIGS. 21A and 21B) shows that the critical b decreases as x increases. In particular, the nanofuel is critical when: b=46.62 cm, x=1.0 (spherical cavity); b=36.00 cm, x=2.734; and b=32.70 cm, x=5.0. Comparing the x=1.0 and x=5.0 (x=2.734) results, the volume increases by 72.53% (25.88%).

8.3 Compact Economical Configurations

The Wankel nanofuel engine size and efficiency strongly affect cost. The size is a function of the generating radius ($R_r$), the eccentricity (h), the reflector thickness ($\Delta$), and the ellipsoidal flank cavity dimensions (b, a=xb). The thermal efficiency ($\eta$) is a function of the compression ratio (r). Let us consider how these quantities are related and search for configurations that minimize cost and maximize profitability.

Nuclear performance influences $\Delta$ and (b, a). Appendix A shows that there is a practical upper limit on the reflector thickness for a given material, which is Δ=30 cm for Be. Section 8.2 shows that there is a critical ellipsoidal size for a given type and mass of nanofuel. In general, selecting a nanofuel and performing theoretical or computational criticality calculations reveals a range of feasible flank cavity dimensions.

Mechanical performance influences several quantities. FIG. 20 illustrates that the ellipsoidal flank cavity minor axis length and the reflector thickness (2b+Δ) must fit between the rotor housing and the output shaft rotor journal (d2). For an output shaft rotor journal diameter of 6h, this condition is $$2b+\Delta=d_2=R_r-5h. \tag{35}$$

A generating radius solution to the above equation is $$R_r = \frac{2b+\Delta}{1-5(h/R_r)} = \frac{2b+\Delta}{1-5(1/K)}, \tag{36}$$

where $K=R_r/h$ is the trochoid constant. Equation 36 shows that Rr decreases as K (h/Rr) increases (decreases), which is not obvious from the definition of K.

For b=32 cm and x=4, Eq. 36 reduces to $$R_r[cm] = \frac{94}{1-5(1/K)}, \tag{37}$$

Figure 22:
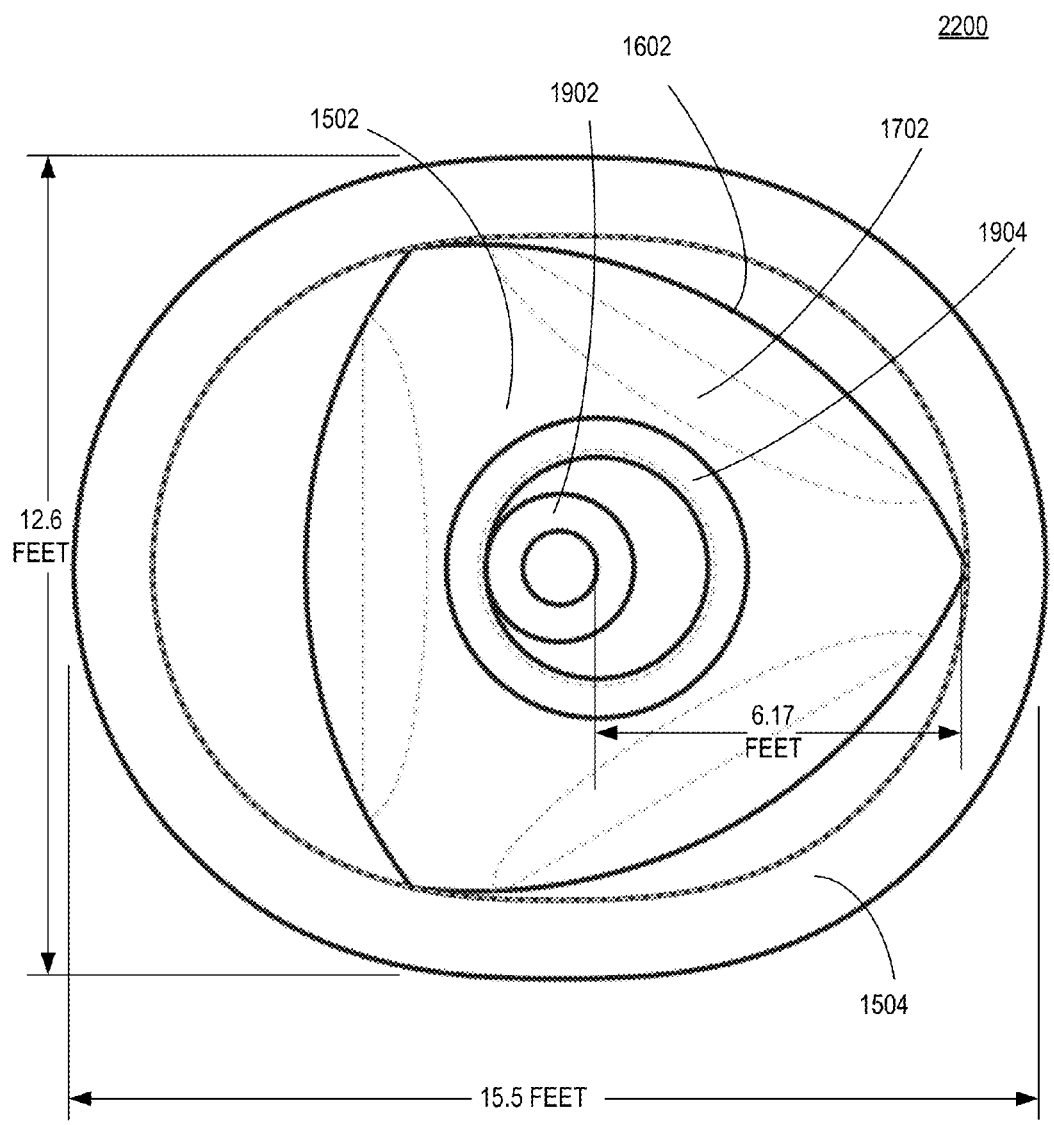
FIG. 22 depicts Wankel nanofuel engine geometry, according to an exemplary embodiment.
Figure 23A:
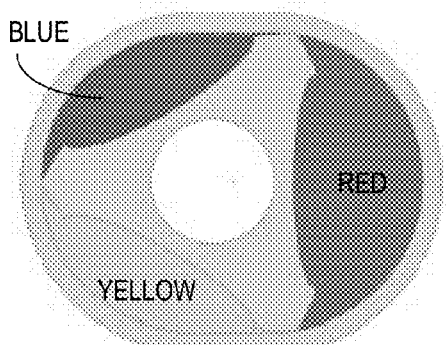
Figure 23C:
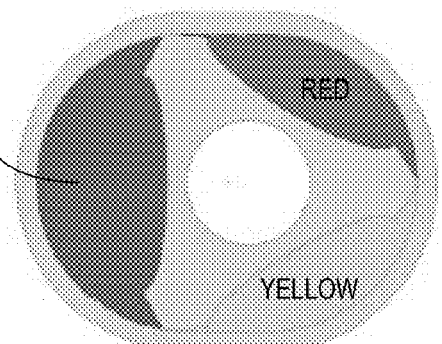
Figure 23D:
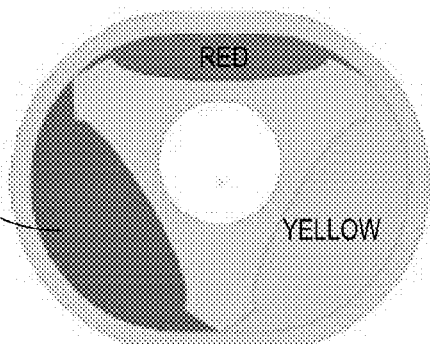
Figure 23E:
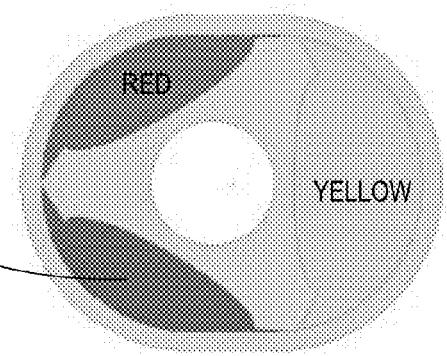
Figure 23F:
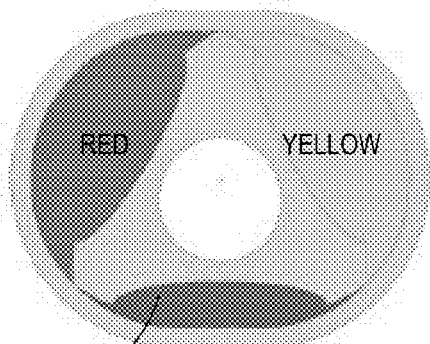

As K increases from 6 to 10, which is within the normal Wankel engine design space, Rr decreases from 564 cm to 188 cm. FIG. 22 schematic diagram 2200 shows that for K=10 the outer rotor housing major (minor) axis length is approximately 15.5 ft (12.6 ft) in an exemplary embodiment.

Engine efficiency strongly influences profitability. To maximize efficiency and minimize the total engine volume, let us consider the quantity $r/L_r$, where $L_r=2(R_r+h+\Delta)$ is the outer rotor housing major axis length. Using Eq. 36, setting the flank cavity major radius (a) to the intersection of the flank cavity major axis and the circular arc flank, and maximizing the quantity $r/L_r$ gives the solution $$K=7.725+0.02105\Delta+0.00013\Delta^2, \tag{38}$$

where Δ is in cm. This optimal condition is valid for any flank cavity minor radius (b).

These relationships among Wankel nanofuel engine quantities are merely a starting point. Although every application is different and every design will require a different optimization process, let us consider a generic Wankel nanofuel engine design that pulls together the results in this section:
1. Select the nanofuel comprised of an equal mass fraction mixture of $H_2$ and the Transuranic isotopic distribution given in Table 4 (m($H_2$)=m(Transuranic)=0.5).
2. Select a 30 cm thick Be reflector (Δ=30 cm).
3. Use FIG. 21 to select b=36 cm.
4. Set a to the intersection of the flank cavity major axis and the circular arc flank, which is one of the assumptions used to derive Eq. 38.
5. Use Eq. 38 to find K=8.473
6. Use Eq. 36 to find $R_r$=248.9 cm.
Other Wankel nanofuel engine properties include: h=29.37 cm; x=4.420 (a=159.1 cm); r=4.735 (η=45.39%); and the outer rotor housing major (minor) axis length is approximately 20.2 ft (16.0 ft).

Balancing nuclear and mechanical engine performance influences size, cost, and profitability. Although engine cost is generally proportional to size (and number of components), the same cannot be said of profitability. An incremental decrease in engine cost can produce a larger reduction in profitability. This is precisely what happened as LWRs (economies of scale) moved to SMRs (economies of mass manufacturing).

9 ADVANCED REACTOR PERFORMANCE

A nuclear reactor is an apparatus that sustains nuclear fission in a self-supporting chain reaction. (US Nuclear Regulatory Commission Regulations: Title 10, *Code of Federal Regulations*, §50.2.) In the United States, the NRC has the mandate to regulate civil nuclear reactors and ensure adequate protection of the environment and public health and safety and the common defense and security. (US Nuclear Regulatory Commission. Policy statement on the regulation of advanced reactors. *Federal Register*, 73(199): 60612, October 2008.)

An advanced reactor is a nuclear reactor with, at a minimum, the same degree of protection of the environment and public health and safety and the common defense and security required for the current generation of operational commercial LWRs. In addition, advanced reactors will provide enhanced margins of safety and/or use simplified, inherent, passive, or other innovative means to accomplish their safety and security functions. (US Nuclear Regulatory Commission. Policy statement on the regulation of advanced reactors. *Federal Register*, 73(199):60612, October 2008.)

This section models a Wankel nanofuel engine with a nanofuel comprised of the transuranic elements from LWR SNF. Since a Wankel nanofuel engine sustains nuclear fission in a self-supporting chain reaction, it is a nuclear reactor. Since a Wankel nanofuel engine has several advanced reactor attributes, such as the inherent safety features found in the nanofuel and dynamic engine core geometry, it is indeed an advanced reactor.

Wankel nanofuel engine simulation initialization includes:
1. Select the nanofuel comprised of an equal mass fraction mixture of $H_2$ and the Transuranic isotopic distribution given in Table 4 (m($H_2$)=m(Transuranic)=0.5).
2. Select a 30 cm thick Be neutron reflector (T=573.15 K), which includes portions of the rotor and the rotor housing.
3. Assign b=36 cm and set α to the intersection of the flank cavity major axis and the circular arc flank.
4. Set K=8.235, which is slightly different from the optimal K=8.473 given by Eq. 38 for Δ=30 cm. This modification increases the compression ratio. Now $R_r$=259.7 cm, h=31.53 cm, and x=4.568.
5. Assign w=2(b+Δ)=132.0 cm.
6. Select a 30 cm thick Cr—Fe—Ni alloy for the side housing (T=400 K).
7. Set θ=−π/3 at t=0 s. This places the Wankel nanofuel engine in the BDC position identified in FIG. 1.
8. Set the engine core 1 nanofuel properties in state 1: $\rho_1$=0.005670 g/cm$^3$ and $T_1$=400 K. The other engine core properties are set by the engine core 1 performance.
9. Operate the Wankel nanofuel engine at ⅓ rotor rotations per second, where the engine has one power pulse per shaft rotation and three output shaft rotations per rotor rotation.
10. Operate the Wankel nanofuel engine in compression-ignition mode with an internal neutron source of $S_N$=10$^{13}$ N/s.

FIG. 23 (collectively referring to FIG. 23A schematic 2300, through FIG. 23F schematic 2350) illustrates the time evolution of the Wankel nanofuel engine simulation geometry, displaying snapshots at 250 ms time intervals. The compression stroke for engine core 1 (red) begins at t=0 ms (BDC position) and ends at t=750 ms (TDC position). Engine core 2 (blue) and engine core 3 (yellow) are phased 1,000 ms apart.

Figure 24A:
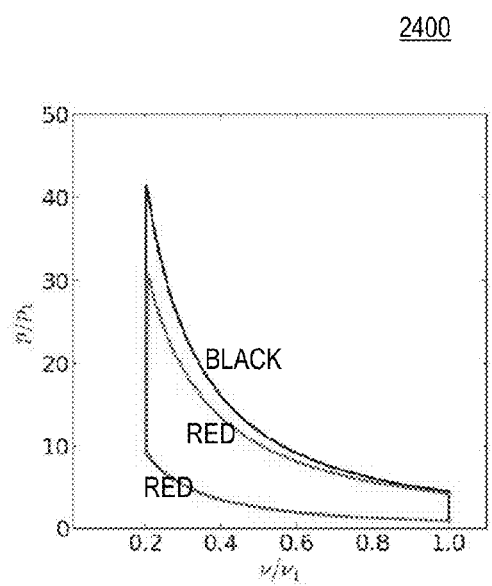
FIGS. 24A and 24B depict Wankel nanofuel engine simulation, (a) Simulated (red) and ideal (black, r=4.939, $\xi=6.504$, and $\gamma=1.387$) Otto cycle, (b) Nanofuel (black) and motored (dashed red) p as a function of time, according to an exemplary embodiment.
Figure 24B:
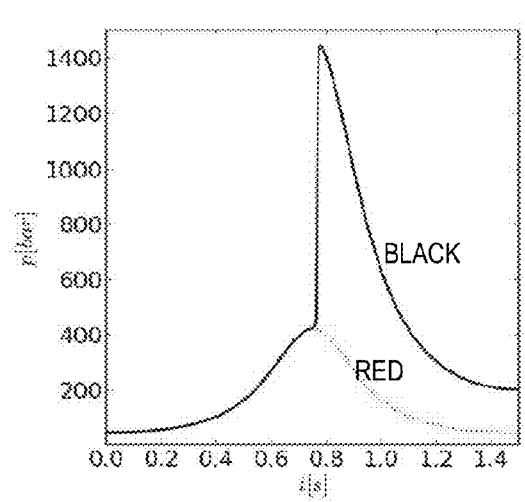

Wankel nanofuel engine simulation results include: Q=557.1 MJ, ξ=6.504, $T_3$=2, 525 K, and $p_3$=1, 446 bar. FIG. 24A graph 2400 compares the simulated and ideal (r=4.939, ξ=6.504, and γ=1.387) Otto cycles. In particular, the simulated (ideal) nanofuel engine efficiency is η=36.85% (45.49%). Wankel nanofuel engine performance metrics include: net work per cycle W=205.3 MJ; engine power P=205.3 MW ($2.753 \times 10^5$ hp); and electric power output $P_e$=201.2 $MW_e$ (assuming 98% generator efficiency). FIG. 24B graph 2410 illustrates the increase in nanofuel pressure during the combustion process compared to the motored pressure. The nanofuel pressure begins to depart from the motored pressure before the engine core reaches the TDC position (t=750.0 ms) and peaks at t=776.3 ms.

The structural integrity can be explored by examining the Be reflector surrounding the flank cavity when the engine core is in the TDC position. Taking a cross-section orthogonal to the flank cavity major axis and along the flank cavity minor axis, the engine core can be approximated as a thick-walled cylinder with radius b=36.0 cm and thickness Δ=30.0 cm. From App. B, for $p_3$=1, 446 bar the hoop stress (deflection) at the inner surface of the engine core is $\sigma_{\theta\theta}$=2, 671 bar (u=364.3 μm) and the Be yield strength is $\sigma_y$(573.15K)=2, 884 bar.
This hoop stress is 92.61% of the Be yield strength.

Figure 25A:
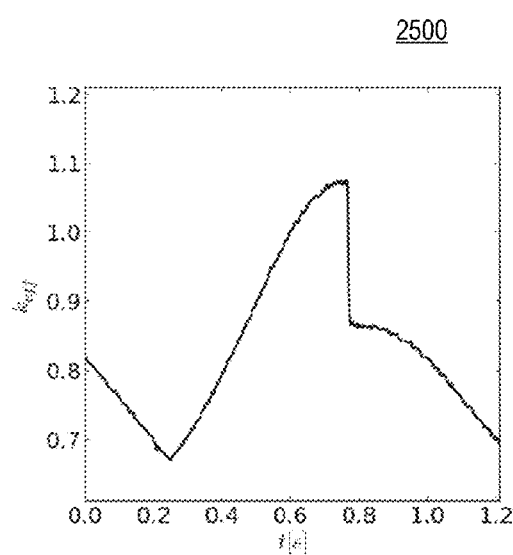
FIGS. 25A and 25B depict Wankel nanofuel engine simulation depicting (a) keff and (b) N as a function of time. according to an exemplary embodiment.

FIG. 25 plots two nuclear properties from the Wankel nanofuel engine simulation. Specifically, FIG. 25A graph 2500 ($k_{eff}$) shows that the system turns critical ($k_{eff}$=1) at t=597.6 ms (θ=0.2044). Early in time $k_{eff}$ decreases as the nanofuel density in engine core 2 decreases; $k_{eff}$ begins to increase during the engine core 1 compression stroke; $k_{eff}$ rapidly drops during the combustion process due to the nanofuel negative αT; and then $k_{eff}$ decreases during the engine core 1 expansion stroke.

Figure 25B:
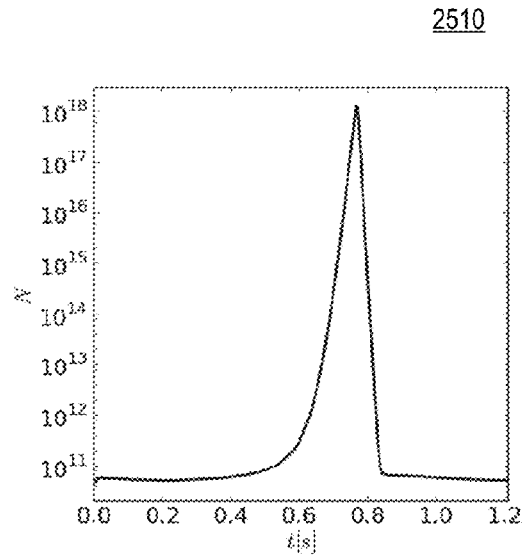

FIG. 25B graph 2510 (N) shows that the neutron population does not exponentially amplify until the system turns critical. The neutron population peaks at t=766.9 ms, which is 169.3 ms after the system turns critical. It also shows that the neutron population rapidly decreases to the background level within 60 ms after the peak time. The Wankel nanofuel engine simulation combustion process lasts approximately 230 ms and the Nordheim-Fuchs burst duration is approximately $\tau_b$=29 ms. Thus, the combustion process significantly overlaps the compression and expansion strokes.

The Wankel nanofuel engine is inherently safe. It only releases nuclear energy after successful intake and compression strokes. The combustion process is limited by either the nanofuel negative $\alpha_T$ or, at higher operating speeds, the increase in engine core volume during the expansion stroke.

FIG. 26 plots several nanofuel properties as a function of time from the Wankel nanofuel engine simulation. During the exhaust and intake process (process 4-1) the simulation maintains the nanofuel in state 1. FIG. 26A graph 2600 plots ρ for the three engine cores. Engine core 1 performs a compression (expansion) stroke from t=0 ms (t=750 ms) to t=750 ms (t=1, 500 ms); engine core 2 ends an expansion stroke at t=500 ms; and engine core 3 begins a compression stroke at t=1, 000 ms.

Figure 26A:
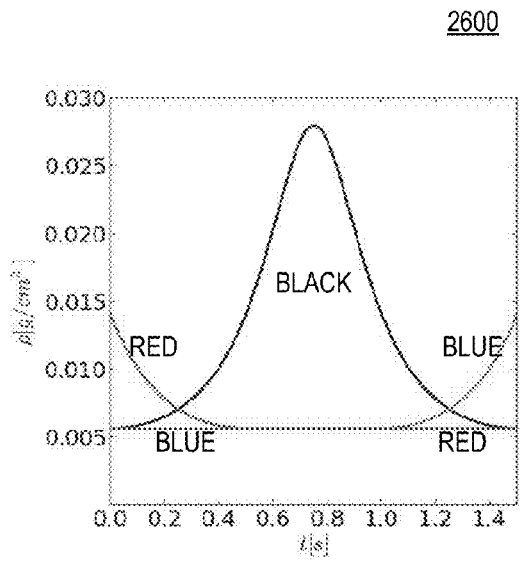
FIGS. 26A, 26B, 26C and 26D depict Wankel nanofuel engine simulation depicting several nanofuel properties as a function of time, ro density [g/cm$^3$], U [MJ], T[K], and p[bar], respectively, engine core 1 (2) [3] is black (red) [blue], respectively, according to an exemplary embodiment.
Figure 26B:
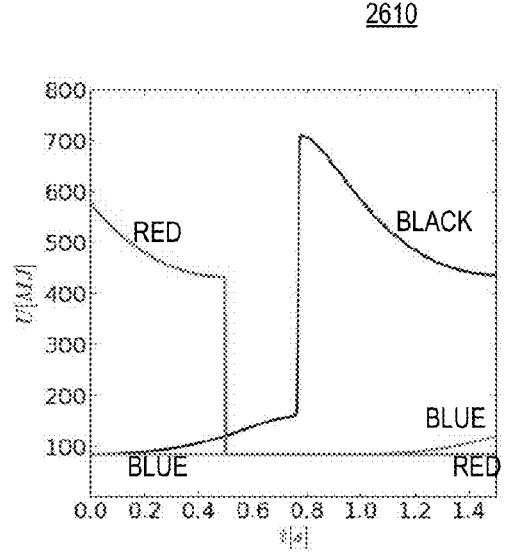
Figure 26C:
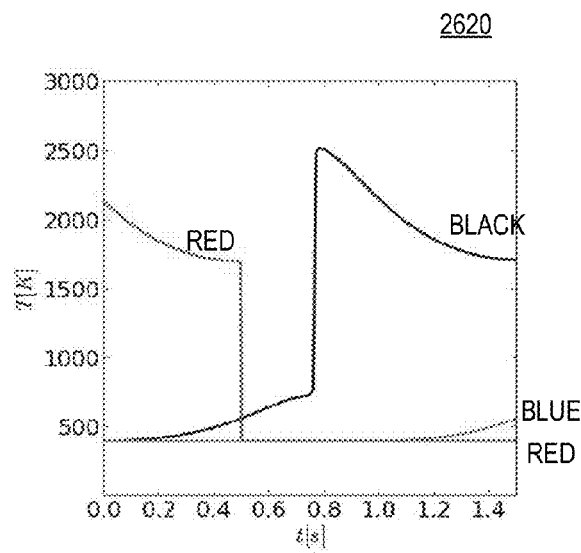
Figure 26D:
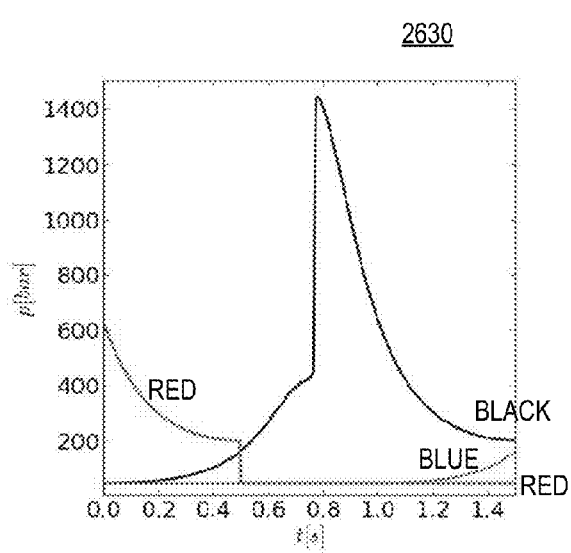

FIG. 26B graph 2610 shows that the exhaust heat in the Wankel nanofuel engine is $Q_{41}$=−351.8 MJ. This heat can be converted into useful work using turbines in either a turbocharged (see FIG. 5) or turbocompounding (see FIG. 6) configuration. A 60% thermal-to-electric conversion efficiency provides an additional electric power output $P_e$=211.1 $MW_e$. FIG. 26C graph 2620 plots T [K], and FIG. 26D graph 2630 plots p [bar] for the three engine cores.

Each engine core in the Wankel nanofuel engine simulation contains $N_0$=1.683×$10^{25}$ fissile fuel ($^{239}$$PuF_6$) molecules and each power cycle produces $N_f$=2.189×$10^{19}$ fissions, assuming the effective energy released per $^{239}$Pu fission is 198.5 MeV/f and 80% of this energy is deposited in the nanofuel (James J. Duderstadt and Louis J. Hamilton. *Nuclear reactor analysis*. John Wiley & Sons, New York, 1976.). Therefore, the initial mass of nanofuel (M) in an engine core contains fissile fuel for 7.701×$10^5$ power cycles assuming complete fuel utilization.

AWankel nanofuel engine power plant, with 40M of nanofuel loaded into the fuel system and operated at ⅓ rotor rotations per second, can operate continuously for 320.9 days before the fissile fuel reaches 90% burnup. The operating duration is proportional to the operating speed. Upon initial nanofuel loading the fuel system contains 40m ($^{239}$$PuF_6$)=394.8 kg (870.4 lbs) of fissile fuel, where the fissile fuel mass in an engine core is m($^{239}$$PuF_6$)=9.869 kg, and 40m(Transuranic)=798.5 kg (1,760 lbs) of nuclear material. Compared to an AP1000 pressurized-water reactor (PWR), the Wankel nanofuel engine (advanced reactor) power plant contains approximately 120 times less nuclear material. (Neil E. Todreas and Mujid S. Kazimi. *Nuclear systems: volume 1: thermal hydraulic fundamentals*. CRC Press, New York, second edition, 2012.)

The Wankel nanofuel engine fulfills two safety criteria, identified by Dr. Edward Teller, that are important for the widespread public acceptance of an advanced reactor design. (E. Teller, M. Ishikawa, L. Wood, R. Hyde, and J. Nuckolls. Complete automated nuclear power reactors for long-term operation: III. enabling technology for large-scale, low-risk affordable nuclear electricity. Technical Report UCRL-JRNL-122708, LLNL, 2003.). First, the entire power plant can be placed underground and heavily fortified against natural disasters and sabotage. Andrei D. Sakharov advocated this design measure. The Wankel nanofuel engine cross section (21.1 ft×16.6 ft) is comparable to a 200 MWe-class electric generator (12.1 ft×22.3 ft) and the entire power system is less than 60 ft long. Second, the Wankel nanofuel engine functions autonomously and is shielded from all types of human error. The engine operating speed and orificing strongly affect the electric power output and permit rapid load following. Similar to a backup generator, the Wankel nanofuel engine can automatically start and stop as needed.

10 OUTLOOK

Economics determines the market adoption of power generation technology. To a lesser extent, the safety and waste management facets of the power generation technology may influence market penetration. For any nuclear technology there is the added concern of nuclear weapon proliferation. This section analyzes the economic, safety, waste management, and nonproliferation attributes of a Wankel nanofuel internal engine electric power plant and concludes with a brief statement on the enormous positive impact this revolutionary new power generation technology can have on the quality of life for present and future generations around the world.

Figure 27:
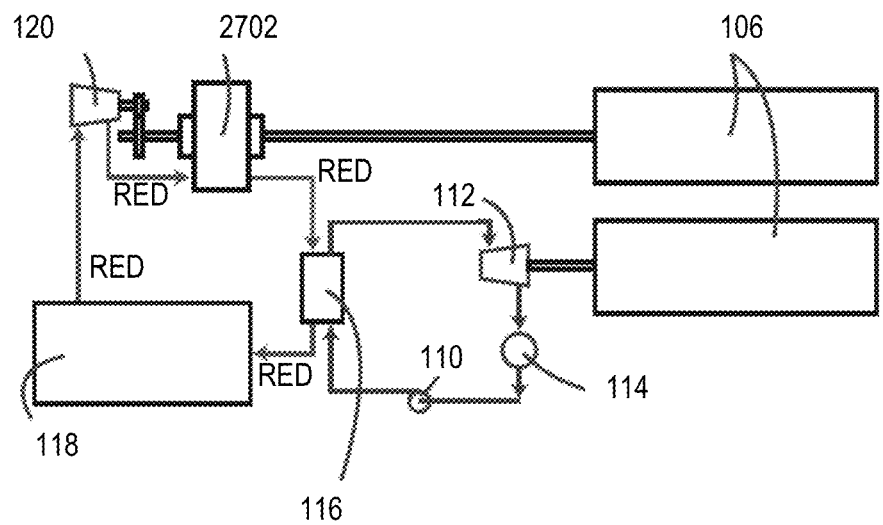
FIG. 27 depicts Schematic 420 MWe Wankel nanofuel engine electric power plant according to an exemplary embodiment.

Let us begin by considering an electric power plant comprised of a Wankel nanofuel engine in a mechanical supercharging configuration. FIG. 27 schematic diagram 2700 illustrates a power plant configuration for the Wankel nanofuel engine presented in Sec. 9. This is an example 420 $MW_e$ power plant containing two 234 megavolt-ampere (MVA), 13.8 kilovolt (kV), 60 hertz (Hz) electric generators 106, engine 2702, compressor 120, heat exchanger 116, turbine 112, condenser 114, and fuel system 118.

The Wankel nanofuel engine is sized to maximize the compression ratio and minimize the overall engine volume. Although moving to a higher compression ratio increases the thermal efficiency and allows more direct power from the engine, the added cost diminishes the benefit. At this size the exhaust contains a significant amount of energy. To balance the electric power produced by the engine and the exhaust, Sec. 9 set K=8.235 over the optimal K=8.473. A different balance between producing useful work and generating heat can be selected for different applications. In general, nanofuel engine power plant configurations can easily be developed to meet rapidly changing (over the course of seconds) electric power and heat demands.

10.1 Economics

Let us start this power plant economic analysis with an estimate of the overnight capital cost (OCC). This estimate follows the methodology established by the US Energy Information Administration (EIA) to compare the OCC of different power plant technologies. (US Department of Energy. US Energy Information Administration. Office of Energy Analysis. Updated capital cost estimates for electricity generation plants. November 2010. US Department of Energy. US Energy Information Administration. Independent Statistics & Analysis. Updated capital cost estimates for utility scale electricity generation plants. April 2013.)

The Wankel nanofuel engine electric power plant OCC is divided into several capital cost categories, including:

Civil and structural material and installation costs include site preparation activities, such as: clearing trees; constructing roads; installing drainage and underground utilities; pouring concrete foundations; installing structural steel; and constructing buildings. Compared to other power plants, an additional cost allowance is made for underground installation. This provides fortification and physical protection from natural disasters and sabotage. Mechanical equipment supply and installation costs include power system equipment, such as: the nanofuel engine; the fuel system; auxiliary equipment (compressor, heat exchanger, pump, condenser); steam turbine; and balance of plant equipment. There is economic uncertainty in the nanofuel engine and the fuel system cost estimates. A recent Electric Power Research Institute report on power generation technology found that the unit cost prior to commercialization is typically a factor of 2-3 larger than predicted during the ideation stage. (S. Inwood. Program on technology innovation: integrated generation technology options. Technical Report 1022782, EPRI, June 2011.) Therefore, nanofuel engine power plant implementation plans account for a three-fold cost escalation before commercialization. Electrical instrumentation and control supply and installation costs include electrical commodities, such as: electric transformers; switchgear; motor control centers; switchyard; distributed control systems and instrumentation; and electrical commodities. Each generator is connected to a high-voltage bus in the switchyard by a dedicated generator circuit breaker (GSU) and a disconnect switch. The GSU is designed to stepup the generator voltage to the transmission voltage. Project indirect and contingency costs are expenses that do not directly fit into a specific capital cost category and account for unforeseen events or circumstances. Engineering, procurement, and construction (EPC) cost is the sum of the mechanical equipment supply and installation, electrical instrumentation and control supply and installation, electrical instrumentation and control supply and installation, and project indirect and contingency costs. Owner costs include preliminary feasibility and engineering studies, environmental studies, licensing, legal services, insurance, property taxes prior to operation, and electrical interconnect equipment. There is economic uncertainty in this cost estimate, which leverages early US Department of Energy (DOE) reports that included DOE-industry cost sharing scenarios for licensing new nuclear power plants. (US Department of Energy. Office of Nuclear Energy, Science and Technology. A roadmap to deploy new nuclear power plants in the United States by 2010: volume I summary report. October 2001. US Department of Energy. Office of Nuclear Energy, Science and Technology. A roadmap to deploy new nuclear power plants in the United States by 2010: volume II main report. October 2001.) and uses information from a more recent DOE report discussing the lessons learned by electric utilities in obtaining an ESP. (US Department of Energy. Report on lessons learned from the NP 2010 early site permit program: final report. Prepared by Energetics Incorporated. 26 Mar. 2008.).

TABLE 5

Wankel nanofuel engine electric power plant OCC estimate.

| Capital cost category | Million 2015$ |
|---|---|
| Civil and structural material and installation | 15.0 |
| Mechanical equipment supply and installation | 55.0 |
| Electrical instrumentation and control supply and installation | 30.0 |
| Project indirect and contingency | 25.0 |
| Engineering, procurement, and construction (EPC) | 125.0 |
| Owner | 45.0 |
| Overnight capital cost (OCC) | 170.0 |

Table 5 summarizes the Wankel nanofuel engine electric power plant OCC estimate. The OCC is 170.0 million 2015$ (2015 US dollars) for a 420 $MW_e$ power plant or 404.8 2015$/$kW_e$. Table 6 shows that this OCC is more economical than any fossil fuel power plant on the market; Table 7 shows that this OCC is an order-of-magnitude better than alternative energy power generation technology. For an electric power generating station comprised of several nanofuel engine power plants the owner cost for subsequent plants is negligible. Thus, to build a second plant the OCC is close to the EPC cost, which is 125.0 million 2015$ for a 420 $MW_e$ power plant or 297.6 2015$/$kW_e$.

Now let us consider the financing cost, operation and maintenance cost, and fuel cost. The financing cost is dominated by the cost of capital, which is commensurate with an entities business and financial risk, and the project duration, which is significantly reduced by the economies of mass manufacturing.

The operation and maintenance cost can be estimated from recent EIA data on the average power plant operating expenses of major US-investor-owned electric utilities. (US Department of Energy. US Energy Information Administration. Independent Statistics & Analysis. Electric power annual 2012. December 2013.) The average operation cost for gas turbine and small scale power plants in 2012 was 2.46 2012$ per megawatt-hour (2012$/MWh); the average maintenance cost for gas turbine and small scale power plants in 2012 was 2.76 2012$/MWh. The nanofuel engine plant will have additional security requirements imposed

TABLE 6

Fossil fuel electric power plant OCC estimates. (US Department of Energy. US Energy Information Administration. Independent Statistics & Analysis. *Updated capital cost estimates for utility scale electricity generation plants.* April 2013.) Capacity is in units of $kW_e$ and the OCC is in units of 2012$/$kW_e$ or million 2012$ ($M). Abbreviations include: carbon capture and sequestration (CCS); combined cycle (CC); integrated gasification combined cycle (IGCC); and pulverized coal (PC).

| Power Plant | Capacity [$kW_e$] | OCC [$/$kW_e$] | OCC [$M] |
|---|---|---|---|
| Coal | | | |
| Single Unit Advanced PC | 650,000 | 3,246 | 2,110 |
| Dual Unit Advanced PC | 1,300,000 | 2,934 | 3,814 |
| Single Unit Advanced PC with CCS | 650,000 | 5,227 | 3,398 |
| Dual Unit Advanced PC with CCS | 1,300,000 | 4,724 | 6,141 |
| Single Unit IGCC | 600,000 | 4,400 | 2,640 |
| Dual Unit IGCC | 1,200,000 | 3,784 | 4,541 |
| Single Unit IGCC with CCS | 520,000 | 6,599 | 3,431 |
| Natural Gas | | | |
| Conventional CC | 620,000 | 917 | 569 |
| Advanced CC | 400,000 | 1,023 | 409 |
| Advanced CC with CCS | 340,000 | 2,095 | 712 |
| Conventional Combustion Turbine | 85,000 | 973 | 83 |
| Advanced Combustion Turbine | 210,000 | 676 | 142 |
| Fuel Cells | 10,000 | 7,108 | 71 |

TABLE 7

Alternative energy electric power plant OCC estimates. (US Department of Energy. US Energy Information Administration. Independent Statistics & Analysis. *Updated capital cost estimates for utility scale electricity generation plants.* April 2013.) Capacity is in units of $kW_e$ and the OCC is in units of 2012$/$kW_e$ or million 2012$ ($M).

| Power Plant | Capacity [$kW_e$] | OCC [$/$kW_e$] | OCC [$M] |
|---|---|---|---|
| Nuclear, Nanofuel Engine | 420,000 | 405 | 170 |
| Nuclear, Dual Unit | 2,234,000 | 5,530 | 12,354 |
| Hydroelectric | 500,000 | 2,936 | 1,468 |
| Hydro, Pumped Storage | 250,000 | 5,288 | 1,322 |
| Wind, Onshore | 100,000 | 2,213 | 221 |
| Wind, Offshore | 400,000 | 6,230 | 2,492 |
| Solar, Thermal | 100,000 | 5,067 | 507 |
| Solar, Small Photovoltaic | 20,000 | 4,183 | 84 |
| Solar, Large Photovoltaic | 150,000 | 3,873 | 581 |
| Geothermal, Dual Flash | 50,000 | 6,243 | 312 |
| Geothermal, Binary | 50,000 | 4,362 | 218 |
| Biomass, Combined Cycle | 20,000 | 8,180 | 164 |
| Biomass, Bubbling Fluidized Bed | 50,000 | 4,114 | 206 |
| Municipal Solid Waste | 50,000 | 8,312 | 416 | by the NRC that give rise to an extra operating cost of 5.43 2015$/MWh. Although these numbers can be improved by an order-of-magnitude, they can serve as a starting point for future economic discussions.

In 2014 the Henry Hub natural gas spot price averaged 35.8 2014$/MWh. (US Department of Energy. US Energy Information Administration. Independent Statistics & Analysis. Henry Hub natural gas spot price (dollars per million Btu). Accessed 6 May 2015. http://www.eia.gov/dnav/ng/hist/rngwhhdm.htm/.) In April 2015 the Powder River Basin coal spot price was 6.00 2015$/MWh. (US Department of Energy. US Energy Information Administration. Independent Statistics & Analysis. Coal—U.S. Energy Information Administration (EIA). Accessed 6 May 2015. http://www.eia.gov/coal/.) This factor-of-six price difference, where natural gas costs significantly more than coal, balances the factor-of-three difference in OCC and operation and maintenance cost, where coal power plants cost significantly more to build and operate than natural gas power plants. The result sets the market price for electricity generation.

For the nanofuel engine power plant the targeted fuel cost is 0.0 2015$/MWh. A negative (positive) fuel cost implies a profit on the consumption of LWR SNF. Since energy consumption is proportional to economic output, and the standard of living, both negative and positive fuel costs are counterproductive. A negative fuel cost requires taxpayers to indirectly pay more for energy; a positive fuel cost directly increases the price of energy by slowing market penetration.

10.2 Safety

The Wankel nanofuel engine has two important inherent safety features. First, the nanofuel has a negative $\alpha_T$. As the nanofuel temperature increases, k decreases and the system turns subcritical. Second, the dynamic engine core geometry decreases the system criticality as the engine core moves away from the TDC position. When the engine core volume increases, p decreases and the neutron leakage increases.

There are additional safety features in the fuel system. With 40M of nanofuel loaded into the fuel system, the engine can operate for 320.9 days and contains approximately 100 times less nuclear material than commercial LWRs. This greatly reduces the source term in an accident scenario. The fuel system also avoids the LWR decay heat problem. Decay heat is due to radioactive decay in the nuclear fuel. In an accident scenario, LWR coolant and power to circulate the coolant are required to remove the decay heat and maintain the solid fuel in the reactor core at temperatures below the melting temperature. In the nanofuel engine fuel system no coolant or external power is required to manage the decay heat. The fission products are removed as part of the continuous recycling fuel system.

Finally, the Wankel nanofuel engine has two important obvious safety features, which are important for public acceptance. First, the entire power plant can be placed underground and heavily fortified against natural disasters and sabotage. Second, the engine functions autonomously and is shielded from all types of human error.

10.3 Waste Management

The Wankel nanofuel engine electric power plant has no greenhouse gas emissions and operates in a closed thermodynamic cycle that permits complete fuel utilization. Scheduling mechanical equipment minor (major) maintenance every 8,000 (24,000) hours of operation provides a regular opportunity to add nanofuel and remove fission products.

Fuel efficiency can be improved by introducing fertile fuel into the nanofuel. In particular, for the nanofuel comprised of the transuranic elements from LWR SNF, introducing uranium isotope 238 hexafluoride ($^{238}UF_6$) provides a modest breeding ratio.

The Blue Ribbon Commission (BRC) on America's Nuclear Future was chartered to recommend a new strategy for managing the back end of the nuclear fuel cycle. In 2012 the BRC issued a final report that details important failings in the present nuclear fuel cycle, recommends the creation of a new nuclear waste management organization, and announces the large cost to the taxpayers incurred by implementing a deeply flawed nuclear waste management program. (US Department of Energy. Blue Ribbon Commission on America's Nuclear Future. Blue ribbon commission on America's nuclear future: report to the Secretary of Energy. January 2012.)

By consuming the transuranic elements from LWR SNF, which contains the longlived radioactive material from past, present, and future commercial nuclear power plants, the nanofuel power plant eliminates the need for long-term, high-cost, and very unpopular geological nuclear waste repositories. The nanofuel engine can help reshape the back end of the nuclear fuel cycle, reduce the present economic and environmental nuclear waste burden on society, and stimulate nuclear power growth during the second nuclear era.

10.4 Nonproliferation

Commercial nuclear reactors operating today are almost exclusively of the LWR-type developed for producing plutonium during World War II. For electric power generation these early reactors were modified by: replacing the graphite moderator with water for use in a Rankine cycle; increasing the isotopic concentration of fissile fuel in natural uranium; and introducing inherent safety features, such as a negative $\alpha_T$. (E. Teller, M. Ishikawa, L. Wood, R. Hyde, and J. Nuckolls. Complete automated nuclear power reactors for longterm operation: III. enabling technology for large-scale, low-risk affordable nuclear electricity. Technical Report UCRL-JRNL-122708, LLNL, 2003.)

Plutonium-uranium reduction extraction (PUREX) was also developed during World War II to separate plutonium from LWR SNF. During the first nuclear era, PUREX was an integral part of reprocessing commercial LWR SNF and the back-end of the nuclear fuel cycle. For example, from 1966-1972 the Western New York Nuclear Service Center used PUREX to process 640 metric tons of LWR SNF. (New York State Energy Research and Development Authority. *Western New York Nuclear Service Center background and history*. By Paul J. Bembia. 27 Apr. 2011.)

Today there is an ongoing concern that the dissemination of LWR and PUREX technology will encourage nuclear weapon proliferation. History is full of examples where this has already occurred. (Thomas C. Reed and Danny B. Stillman. *The nuclear express: apolitical history of the bomb and its proliferation*. Zenith Press, Minneapolis, Minn., 2009.)

In 1976, shortly after India detonated a nuclear device, President Gerald R. Ford announced
the reprocessing and recycling of plutonium should not proceed unless there is sound reason to conclude that the world community can effectively overcome the associated risks of proliferation . . . that the United States should no longer regard reprocessing of used nuclear fuel to produce plutonium as a necessary and inevitable step in the nuclear fuel cycle, and that we should pursue reprocessing and recycling in the future only if they are found to be consistent with our international objectives. (Anthony Andrews. Nuclear fuel reprocessing: U.S. policy development. *Congressional Research Service Report for Congress*, March 2008.) When President Ford issued this statement there was a confident belief that scientists would develop proliferation resistant nuclear power solutions within five years. This did not happen, and in 1981 President Ronald W. Reagan announced the lifting [of] the indefinite ban which previous administrations placed on commercial reprocessing activities in the United States. (Anthony Andrews. *Nuclear fuel reprocessing: U.S. policy development*. Congressional Research Service Report for Congress, March 2008.)

In sharp contrast to the nuclear technology developed during World War II for defense applications, the nanofuel engine consumes plutonium and the nanofuel can be created without separating plutonium into a separate product stream. In addition, enrichment facilities are not required to create nanofuel.

For any nuclear technology the potential threat from a dirty bomb is also a concern. Charles G. Bathe et al. (Charles G. Bathke, Bartley B. Ebbinghaus, Brad W. Sleaford, Richard K. Wallace, Brian A. Collins, Kevin R. Hase, Gordon D. Jarvinen, Keith S. Bradley, John R. Ireland, M. W. Johnson, Andrew W. Prichard, and Brian W. Smith. The attractiveness of materials in advanced nuclear fuel cycles for various proliferation and theft scenarios. Technical Report LA-UR-09-02466, LANL, 2009.) defines a potential nuclear threat as the point at which the nuclear explosive energy exceeds the conventional explosive energy. Dirty bombs release less nuclear explosive energy than the conventional explosive energy and distribute radioactive material over a larger area. The nanofuel engine consumes the transuranic elements from LWR SNF and decreases the possible inventory of radioactive material that could be used in dirty bomb.

10.5 Summary

Nanofuel internal engine power plants have favorable economic, safety, and waste management attributes when compared to existing power generation technology. An economic advantage is sufficient to ensure market adoption. Safety and waste management improvements provide environmental benefits and facilitate public acceptance. Nonproliferation characteristics are necessary for global market penetration.

The Industrial Revolution increased the quality of life for many and moved Europe out of the Dark Ages. Today, 750 million people are without access to clean drinking water and more than 840,000 people die each year from water related diseases. (Water.org. Water facts: water. Accessed 17 Feb. 2015. http://water.org/water-crisis/waterfacts/water/.) Access to affordable energy is the solution. The nanofuel internal engine offers an affordable clean energy solution for the 21st century and can improve the quality of life for present and future generations around the world. With favorable economics the second nuclear era drive a second Industrial Revolution.

A Housing Neutron Transport

Neutron reflectors reduce the neutron leakage from the engine core. Facilitating the selection of a suitable nanofuel engine neutron reflector, this appendix analytically determines the probability that a fission neutron is thermalized in the reflector and returned to the engine core. This analytic approach closely follows the work of George I. Bell (George I. Bell. Calculations of the critical mass of $UF_6$ as a gaseous core, with reflectors of $D_2O$, Be and C. Technical Report LA-1874, LANL, February 1955.) and incorporates established nuclear data (Robert V. Meghreblian and David K. Holmes. *Reactor analysis*. McGraw-Hill Book Company, New York, 1960. James J. Duderstadt and Louis J. Hamilton. *Nuclear reactor analysis*. John Wiley & Sons, New York, 1976.).

Let us begin by considering a nanofuel bracketed by two semi-infinite reflectors in slab geometry. In the analysis:
1. assume the fast neutrons escape the nanofuel and enter the reflector;
2. employ Fermi age theory to describe the deceleration of neutrons from fast to thermal energies in the reflector; and
3. use a one-speed diffusion model to calculate the subsequent migration of thermal neutrons from the reflector to the nanofuel.

From Fermi age theory, the slowing down density S for a plane source of one fission neutron per second in an infinite non-absorbing medium is $$S(z, \tau_F) = \frac{1}{\sqrt{4\pi\tau_F}} \exp\left\{\frac{-z^2}{4\tau_F}\right\}, \tag{39}$$

where z is the distance from the nanofuel-reflector interface and $\tau_F$ is the Fermi age. The slowing down density at the age to thermal is the source of thermal neutrons. Next, the transport of thermal neutrons is governed by the one-speed one-dimensional neutron diffusion equation:

$$\frac{d^2\phi}{dz^2} - \frac{1}{L^2}\phi = \frac{-S}{D}, \qquad (40)$$

where $\varphi$ is the neutron flux and the other quantities are defined in Sec. 4.

Equation 40 is solved using the Green function (kernel) method. The kernel function is $$\phi(z) = \frac{1}{2\kappa D}\int_{-\infty}^{\infty} S(y)e^{-\kappa|z-y|}\,dy, \qquad (41)$$

where $\kappa=1/L$. Inserting Eq. 39 (source function) into Eq. 41 (kernel function) and integrating gives the following neutron flux solution:

$$\phi(z) = Ae^{-\kappa z} + \frac{e^{\tau_F\kappa^2}}{4\kappa D}\{2\cosh(\kappa z) + e^{-\kappa z}\Phi(\beta_-) - e^{\kappa z}\Phi(\beta_+)\}, \qquad (42)$$

where $$\beta_\pm = \frac{z}{2\sqrt{\tau_F}} \pm \kappa\sqrt{\tau_F} \qquad (43)$$

and $\Phi$ is the error function $$\Phi(z) = \frac{2}{\sqrt{\pi}}\int_0^z e^{-t^2}\,dt. \qquad (44)$$

The unknown constant A is found from the boundary condition $\varphi(0)=0$. The result is $$A = -\frac{e^{\tau_F\kappa^2}}{4\kappa D}\left[1 - \left(\Phi\sqrt{\tau_F}\,\kappa\right)\right]. \qquad (45)$$

Collecting terms, the neutron flux is given b $$\phi(z) = -\frac{e^{\tau_P\kappa^2}}{2\kappa D}\left[1 - \Phi\left(\sqrt{\tau_P}\,\kappa\right)\right]e^{-\kappa z} +$$
$$\frac{e^{\tau_P\kappa^2}}{4\kappa D}\{2\cosh(\kappa z) + e^{-\kappa z}\Phi(\beta_-) - e^{\kappa z}\Phi(\beta_+)\}. \qquad (46)$$

The current into the nanofuel is found from Fick's law applied to the nanofuel-reflector interface:

$$D\frac{d\phi}{dz}\bigg|_{z=0} = \frac{1}{2}e^{\tau_P\kappa^2}\left[1 - \Phi\left(\sqrt{r_P}\,\kappa\right)\right]. \qquad (47)$$

Since there are two reflectors, Eq. 47 is half the probability that a fission neutron is thermalized in either reflector and returned to the nanofuel. Thus, the total probability $P_\infty$ is $$P_\infty(\tau_F,L) = e^{\tau_F\kappa^2}[1-\Phi(\sqrt{\tau_F}\kappa)], \qquad (48)$$

which is only a function of the dimensionless parameter $\sqrt{\tau_F}\kappa = \sqrt{\tau_F}/L$.

This dimensionless parameter is the ratio of the distance traveled while slowing down to the distance traveled following thermalization and should be much less than one for a good reflector.

Now let us consider a nanofuel bracketed by two finite thickness reflectors in slab geometry. Assuming the slowing down density S has no slope at the fuel-reflector interface (z=0) and vanishes at the external reflector boundary (z=Δ), Bell (George I. Bell. Calculations of the critical mass of $UF_6$ as a gaseous core, with reflectors of $D_2O$, Be and C. Technical Report LA-1874, LANL, February 1955.) found the following solution to the age equation:

$$S(z,\tau_F,\Delta) = \frac{1}{\sqrt{4\pi\tau_F}} \qquad (49)$$

$$\left[\exp\left\{\frac{-z^2}{4\tau_F}\right\} - \frac{\exp\left\{\frac{-(z-2\Delta)^2}{4\tau_F}\right\} + \exp\left\{\frac{-(z+2\Delta)^2}{4\tau_F}\right\}}{1+\exp\left\{\frac{-2\Delta^2}{\tau_F}\right\}}\right]$$

$$= \frac{\exp\left\{\frac{-z^2}{4\tau_F}\right\}}{\sqrt{4\pi\tau_F}}\left[1-\cosh\left(\frac{\Delta z}{\tau_F}\right)\mathrm{sech}\left(\frac{\Delta^2}{\tau_F}\right)\right].$$

Similar to the semi-infinite reflector case, insert Eq. 49 (source function) into Eq. 41 (kernel function), carry out the integration, apply Fick's law, and account for both reflectors to find the total probability $P_\Delta$ that a fission neutron is thermalized in either reflector of finite thickness $\Delta$ and returned to the nanofuel. The solution is $$P_\Delta(\tau_p,L,\Delta) = e^{\tau_p\kappa^2}\{\Phi(\beta_1)-\Phi(\beta_2)++_-[\alpha_1\Phi(\beta_3)+\alpha_2\Phi(\beta_4)]+\alpha_r[\Phi(\beta_5)-\Phi(\beta_6)]\}, \qquad (50)$$

where $$\alpha_\pm = \frac{\exp\left\{\frac{2\Delta}{\tau_F}(\Delta\pm\tau_p\kappa)\right\}}{1-\exp\left\{\frac{2\Delta^2}{\tau_F}\right\}}, \qquad (51)$$

$$\alpha_1 = \mathrm{sign}\left(\tau_F - \frac{\Delta}{\kappa}\right),$$

$$\alpha_2 = \mathrm{sign}\left(\frac{\Delta}{\kappa} - 2\tau_F\right),$$

$$\beta_1 = \sqrt{\frac{(\Delta+2\tau_F\kappa)^2}{4\tau_F}}, \qquad (52)$$

$$\beta_2 = \sqrt{\tau_p}\,\kappa,$$

$$\beta_3 = \sqrt{\left(\kappa - \frac{\Delta}{\tau_F}\right)^2 \tau_F},$$

$$\beta_4 = \sqrt{\frac{(\Delta - 2\tau_F\kappa)^2}{4\tau_F}}, \quad (53)$$

$$\beta_5 = (\Delta + \tau_F\kappa)\frac{1}{\sqrt{\tau_F}},$$

$$\beta_6 = \left(\frac{3}{2}\Delta + \tau_F\kappa\right)\frac{1}{\sqrt{\tau_F}}.$$

This result agrees with the asymptotic limit given by Bell (George I. Bell. Calculations of the critical mass of $UF_6$ as a gaseous core, with reflectors of $D_2O$, Be and C. Technical Report LA-1874, LANL, February 1955.).

Figure 28:
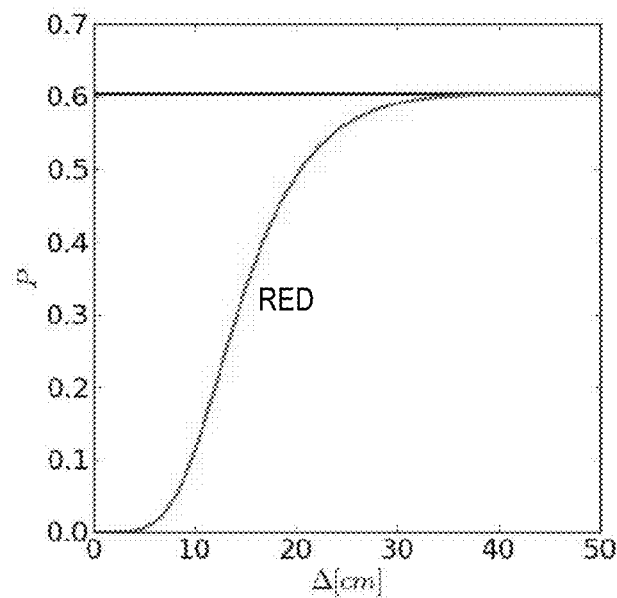
FIG. 28 depicts Total probability that a fission neutron is thermalized and returned to the nanofuel for a semi-infinite (Eq. 48, black) and finite (Eq. 50, red) Be reflector, using $\tau_F=97.2$ cm$^2$ (R. J. Templin, Reactor physics constants, Technical Report 5800, ANL, July 1963.) and L=18.9 cm, according to an exemplary embodiment.

FIG. 28 graph 2800 plots the total probability that a fission neutron is thermalized and returned to the nanofuel for a semi-infinite (Eq. 48, black, horizontal line) and finite (Eq. 50, red) Be reflector, using $\tau_F$=97.2 cm² (R. J. Templin. Reactor physics constants. Technical Report 5800, ANL, July 1963.) and L=18.9 cm (thermal). This figure shows that the probabilities converge when Δ~40 cm, which implies there is no further reduction in neutron leakage for thicker reflectors.

B Housing Strength

This appendix calculates the reciprocating nanofuel engine piston case (housing) deformation due to an internal gaseous nanofuel pressure using the theory of elasticity, which is described in Landau and Lifshitz (L. D. Landau and E. M. Lifshitz. *Theory of elasticity (course oftheoretical-physics; volume 7)*. Pergamon Press, Boston, third edition, 1986.).

This particular approach is also known as the theory of thick-walled cylinders.

The piston case is a cylinder. Away from the cylinder head and piston, the piston case deformation is entirely in the radial direction. Using cylindrical polar coordinates, the displacement vector (u) is radial and only a function of the radius (R).

In the absence of body forces, the solid body mechanical equilibrium equation is $$2(1-\sigma)\nabla(\nabla \cdot u) - (1-2\sigma)\nabla \times (\nabla \times u) = 0. \quad (54)$$

where σ is the Poisson ratio. Since $u_R = u(R)$, $\nabla \times u = 0$ and Eq. 51 reduces to $$\nabla(\nabla \cdot u) = 0 \quad (55)$$

Following Landau and Lifshitz (L. D. Landau and E. M. Lifshitz. *Theory of elasticity (course of theoretical physics; volume 7)*. Pergamon Press, Boston, third edition, 1986.), Eq. 55 has an intermediate solution $$\nabla \cdot u = \frac{1}{R}\frac{d(Ru)}{dR} = 2c_1, \quad (56)$$

and a final solution $$u = c_1 R + \frac{c_2}{R}, \quad (57)$$

where $c_1$ and $c_2$ are constants determined by the boundary conditions at the inner and outer surface of the piston case.

The nonzero components of the strain tensor are:

$$u_{RR} = \frac{\partial u_R}{\partial R} = c_1 - \frac{c_2}{R^2}, \quad (58)$$

$$u_{\theta\theta} = \frac{u_R}{R} = c_1 + \frac{c_2}{R^2}. \quad (59)$$

The radial stress tensor is given by $$\sigma_{RR} = \frac{E}{(1+\sigma)(1-2\sigma)}\{(1-\sigma)u_{RR} + \sigma u_{\theta\theta}\}, \quad (60)$$

where E is the Young modulus. Inserting Eqs. 58 and 59 into Eq. 60 gives $$\sigma_{RR} = \frac{E}{(1+\sigma)(1-2\sigma)}c_1 - \frac{E}{(1+\sigma)}\frac{c_2}{R^2}. \quad (61)$$

The unknown constants $c_1$ and $c_2$ are found by assigning the pressure acting on the piston case inner ($\sigma_{RR}(R_{in})=-p_{in}$) and outer ($\sigma_{RR}(R_{out})=-p_{out}$) surface. The result is:

$$c_1 = \frac{(1+\sigma)(1-2\sigma)}{E}\frac{p_{in}R_{in}^2 - p_{out}R_{out}^2}{R_{out}^2 - R_{in}^2}. \quad (62)$$

$$c_2 = \frac{(1+\sigma)}{E}\frac{(p_{in} - p_{out})R_{in}^2 R_{out}^2}{R_{out}^2 - R_{in}^2}. \quad (63)$$

The nonzero components of the stress tensor are:

$$\sigma_{RR} = \frac{p_{in}R_{in}^2 - p_{out}R_{out}^2}{R_{out}^2 - R_{in}^2} - \frac{(p_{in} - p_{out})R_{in}^2 R_{out}^2}{R_{out}^2 - R_{in}^2}\frac{1}{R^2}, \quad (64)$$

$$\sigma_{\theta\theta} = \frac{p_{in}R_{in}^2 - p_{out}R_{out}^2}{R_{out}^2 - R_{in}^2} + \frac{(p_{in} - p_{out})R_{in}^2 R_{out}^2}{R_{out}^2 - R_{in}^2}\frac{1}{R^2}, \quad (65)$$

$$\sigma_{zz} = 2\sigma\frac{p_{in}R_{in}^2 - p_{out}R_{out}^2}{R_{out}^2 - R_{in}^2}. \quad (66)$$

In particular. Eq. 65 is known as the hoop stress and has a value at the piston case inner surface of $$\sigma_{\theta\theta}|_{max} = \frac{p_{in}R_{in}^2 + (p_{in} - 2p_{out})R_{out}^2}{R_{out}^2 - R_{in}^2}, \quad (67)$$

which is the limiting (most damaging to the structural integrity) stress for the free piston case ($p_{out} \ll p_{in}$). Finally, the radial displacement is given by $$u = \frac{(1+\sigma)(1-2\sigma)}{E}\frac{p_{in}R_{in}^2 - p_{out}R_{out}^2}{R_{out}^2 - R_{in}^2}R + \quad (68)$$

$$\frac{(1+\sigma)}{E}\frac{(p_{in} - p_{out})R_{in}^2 - R_{out}^2}{R_{out}^2 - R_{out}^2}\frac{1}{R}.$$

For Be, the temperature dependent yield stress and Young modulus are:

$$\sigma_y[\text{bar}]=5287.3-4.7663T+0.001T^2, \quad (69)$$

$$E[\text{bar}]=3.1352\times10^6-5.6428\times10^2T, \quad (70)$$

respectively, where T is in degrees Kelvin. Be has a melting temperature Tm=1, 560 K and a Poisson ratio σ=0.032.

Various further and/or alternative processing may be performed, as is conventionally well known to further process the nuclear fuel in the exemplary nuclear fuel cycle, according to various exemplary embodiments.

CONCLUSION

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

In the description and claims, the terms "coupled" and "connected," along with their derivatives, may be used. It should be understood that these terms are not intended as synonyms for each other. Rather, in particular embodiments, "connected" may be used to indicate that two or more elements are in direct or indirect physical or electrical contact with each other. "Coupled" may mean that two or more elements are in direct physical or electrical contact. However, "coupled" may also mean that two or more elements are not in direct contact with each other, but yet still co-operate or interact with each other.

An algorithm and/or process and/or methodology, is here, and generally, is considered to be a self-consistent sequence of acts or operations leading to a desired result. These include physical manipulations of physical quantities. Usually, though not necessarily, these quantities may take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein, as well as complex systems incorporating various subsystems. An apparatus may be specially constructed for the desired purposes, or it may comprise a general purpose device selectively activated or reconfigured by a program stored in the device.

Embodiments of the invention may be implemented in one or a combinations of devices that further include control and/or monitoring computer systems comprised of, e.g., but not limited to, computer hardware, firmware, and/or software, etc. Embodiments of the invention may also be implemented as instructions stored on a machine-readable medium, which may be read and executed by a computing platform to perform the operations described herein. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other form of propagated signals (e.g., carrier waves, infrared signals, digital signals, etc.), and others.

While various embodiments of the present invention have been described above, it should be understood that they have been presented by way of example only, and not limitation. Thus, the breadth and scope of the present invention should not be limited by any of the above described exemplary embodiments, but should instead be defined only in accordance with the following claims and their equivalents.

What is claimed is:

1. A nanofuel engine apparatus adapted to receive nanofuel, comprising:
   an internal nanofuel engine configured to:
   receive the nanofuel that releases nuclear energy;
   receive the nanofuel internal to said internal nanofuel engine;
   compress the nanofuel in the internal nanofuel engine; and
   ignite the nanofuel using a neutron source,
   wherein the internal nanofuel engine is configured to:
   trigger a release of nuclear energy from the nanofuel;
   wherein said internal nanofuel engine comprises:
   a plurality of passive safety features,
   wherein at least one of said plurality of said passive safety features comprises:
   a dynamic criticality condition,
   wherein said dynamic criticality condition comprises at least one of:
   depends upon, or is a function of, a compression ratio r.

2. The nanofuel engine apparatus according to claim 1, wherein the nanofuel engine comprises:
   a rotary engine,
   wherein said rotary engine comprises
   a rotor, wherein said rotor comprises a rotor cavity shape that comprises at least one of:
   a cylindrical shape;
   an ellipsoidal shape;
   a rectangular shape; or
   a spherical shape.

3. The nanofuel engine apparatus according to claim 2, wherein said rotor cavity shape comprises said ellipsoidal shape, wherein said rotary engine dimensions are dependent on said ellipsoidal shape when said rotor is in a top dead center (TDC) position,
   wherein a geometric condition arises wherein a rotor center-to-tip distance $R_r$ depends on a minor radius b of said ellipsoidal shape and a reflector thickness Δ fitting between a rotor housing minor radius and an output shaft rotor journal when said rotor is in said TDC position, $$R_r = \frac{2b+\Delta}{1-5\left(\frac{e}{R_r}\right)},$$

wherein $e/R_r$ is an eccentricity ratio.

4. The nanofuel engine apparatus according to claim 3, wherein said rotary engine comprises a trochoid constant K, wherein said K is equal to the inverse of said eccentricity ratio ($K=R_r/e$), and wherein as said K increases said $R_r$ decreases and said rotary engine dimensions decrease overall.

5. The nanofuel engine apparatus according to claim 4, wherein said trochoid constant K is greater than 5 and less than 11 (5<K<11).

6. The nanofuel engine apparatus according to claim 4, wherein said trochoid constant $K=7.725+0.02105\Delta+0.00013\Delta^2$, wherein $\Delta$ is in centimeters.

7. A method of using a nanofuel in an internal nanofuel engine comprising:
a) compressing the nanofuel in the internal nanofuel engine; and
b) igniting the nanofuel using a neutron source, wherein said igniting comprises:
triggering a release of nuclear energy from the nanofuel;
wherein the internal nanofuel engine comprises:
a plurality of passive safety features,
wherein at least one of said plurality of said passive safety features comprises:
a dynamic criticality condition,
wherein said dynamic criticality condition comprises at least one of:
depends upon, or
is a function of,
a compression ratio r.

8. The method according to claim 7, wherein the internal nanofuel engine comprises a rotary engine, wherein said rotary engine comprises a rotor, wherein said rotor comprises a rotor cavity shape that comprises at least one of:
a cylindrical shape;
an ellipsoidal shape;
a rectangular shape; or
a spherical shape.

9. The method according to claim 8, wherein said rotor cavity shape comprises said ellipsoidal shape, wherein said rotary engine dimensions are dependent on said ellipsoidal shape when said rotor is in a top dead center (TDC) position,
wherein a geometric condition arises wherein a rotor center-to-tip distance $R_r$ depends on a minor radius b of said ellipsoidal shape and a reflector thickness $\Delta$ fitting between a rotor housing minor radius and an output shaft rotor journal when said rotor is in said TDC position, $$R_r = \frac{2b+\Delta}{1-5\left(\frac{e}{R_r}\right)},$$

wherein $e/R_r$ is an eccentricity ratio.

10. The method according to claim 9, wherein said rotary engine comprises a trochoid constant K, wherein said K is equal to the inverse of said eccentricity ratio ($K=R_r/e$), and wherein as said K increases said $R_r$ decreases and said rotary engine dimensions decrease overall.

11. The method according to claim 10,
wherein said trochoid constant K is greater than 5 and less than 11 (5<K<11).

12. The method according to claim 10, wherein said trochoid constant $K=7.725+0.02105\Delta+0.00013\Delta^2$, wherein $\Delta$ is in centimeters.

13. The nanofuel engine apparatus according to claim 1, further comprising at least one of:
a generator coupled to the nanofuel engine apparatus;
a compressor coupled to the nanofuel engine apparatus;
a heat exchanger coupled to the nanofuel engine apparatus; or
a fuel system coupled to the nanofuel engine apparatus.

14. The nanofuel engine apparatus according to claim 1, further comprising at least one of:
a turbocharger compressor and a turbocharger turbine, wherein said internal nanofuel engine is coupled to said turbocharger compressor and said turbocharger turbine;
a turbocharger compressor coupled to a turbocharger compressor turbine on at least one shaft coupled to said internal nanofuel engine, wherein said turbocharger compressor and said turbocharger turbine are coupled to said internal nanofuel engine;
a fuel system coupled to a heat exchanger and a turbocharger compressor, and said heat exchanger coupled to a turbocharger turbine, wherein said turbocharger compressor and said turbocharger turbine are coupled to said internal nanofuel engine; or
a generator coupled to said internal nanofuel engine.

15. The nanofuel engine apparatus according to claim 1, further comprising at least one of:
a supercharging compressor and a turbocompounding turbine, wherein said internal nanofuel engine is coupled to said supercharging compressor and said turbocompounding turbine;
a supercharging compressor and a turbocompounding turbine, wherein said internal nanofuel engine is coupled to a generator, said supercharging compressor, and said turbocompounding turbine;
a fuel system coupled to a heat exchanger and a supercharging compressor, wherein said supercharging compressor and said heat exchanger are coupled to said internal nanofuel engine, and wherein said heat exchanger is coupled to a turbocompounding turbine, and wherein said turbocompounding turbine is coupled to a condenser and a pump, and wherein said pump is coupled to said heat exchanger; or
a generator coupled to a supercharging compressor and a turbocompounding turbine by at least one shaft coupled to said internal nanofuel engine.

16. The nanofuel engine apparatus according to claim 1, further comprising at least one of:
a compressor, wherein said internal nanofuel engine is coupled to said compressor;
at least one generator, wherein said internal nanofuel engine is coupled to said at least one generator;
a compressor and a generator, wherein said nanofuel engine is coupled to said compressor and said generator;
a compressor coupled to said internal nanofuel engine and a fuel system, wherein said fuel system is further coupled to a heat exchanger, wherein said heat exchanger is coupled to said internal nanofuel engine;
a compressor coupled to said internal nanofuel engine and a fuel system, wherein said fuel system is further coupled to a heat exchanger, wherein said heat exchanger is coupled to said internal nanofuel engine, and wherein said heat exchanger is further coupled to a turbine, a condenser, and a pump, wherein said turbine is coupled to a generator; or a compressor coupled to said internal nanofuel engine and a fuel system, wherein said fuel system is further coupled to a heat exchanger, wherein said heat exchanger is coupled to said internal nanofuel engine, wherein said internal nanofuel engine is coupled to a first generator, and wherein said heat exchanger is further coupled to a turbine, a condenser, and a pump, and wherein said turbine is coupled to a second generator.

17. The method of claim 7, wherein the internal nanofuel engine further comprises at least one of:

a turbocharger compressor and a turbocharger turbine, wherein the internal nanofuel engine is coupled to the turbocharger compressor and the turbocharger turbine;

a turbocharger compressor and a turbocharger turbine on at least one shaft coupled to the internal nanofuel engine, wherein the turbocharger compressor and the turbocharger turbine are coupled to the internal nanofuel engine;

a fuel system coupled to a heat exchanger and a turbocharger compressor, and the heat exchanger coupled to a turbocharger turbine, wherein the turbocharger compressor and the turbocharger turbine are coupled to the internal nanofuel engine; or a generator coupled to the internal nanofuel engine.

18. The method of claim 7, wherein the internal nanofuel engine further comprises at least one of:

a supercharging compressor and a turbocompounding turbine, wherein the internal nanofuel engine is coupled to the supercharging compressor and the turbocompounding turbine;

a supercharging compressor and a turbocompounding turbine, wherein the internal nanofuel engine is coupled to a generator, the supercharging compressor, and the turbocompounding turbine;

a fuel system coupled to a heat exchanger and a supercharging compressor, wherein the supercharging compressor and the heat exchanger are coupled to the internal nanofuel engine, and wherein the heat exchanger is coupled to a turbocompounding turbine, and wherein the turbocompounding turbine is coupled to a condenser and a pump, and wherein the pump is coupled to the heat exchanger; or a generator coupled to a supercharging compressor and a turbocompounding turbine by at least one shaft coupled to the internal nanofuel engine.

19. The method of claim 7, wherein the internal nanofuel engine further comprises at least one of:

a compressor, wherein the internal nanofuel engine is coupled to said compressor;

at least one generator, wherein the internal nanofuel engine is coupled to the at least one generator;

a compressor and a generator, wherein the internal nanofuel engine is coupled to the compressor and said generator;

a compressor coupled to the internal nanofuel engine and a fuel system, wherein the fuel system is further coupled to a heat exchanger, wherein the heat exchanger is coupled to the internal nanofuel engine;

a compressor coupled to the internal nanofuel engine and a fuel system, wherein the fuel system is further coupled to a heat exchanger, wherein the heat exchanger is coupled to the internal nanofuel engine, and wherein the heat exchanger is further coupled to a turbine, a condenser, and a pump, wherein the turbine is coupled to a generator; or a compressor coupled to the internal nanofuel engine and a fuel system, wherein the fuel system is further coupled to a heat exchanger, wherein the heat exchanger is coupled to the internal nanofuel engine, wherein the internal nanofuel engine is coupled to a first generator, and wherein the heat exchanger is further coupled to a turbine, a condenser, and a pump, and wherein the turbine is coupled to a second generator.

20. The nanofuel engine apparatus according to claim 1, further comprising at least one of:

a primary generator on at least one shaft coupled to said internal nanofuel engine, and a secondary generator coupled to a turbine, wherein said turbine is coupled to said internal nanofuel engine;

a first generator on at least one shaft coupled to said internal nanofuel engine, and a second generator coupled to at least one turbine, wherein said at least one turbine is coupled to said internal nanofuel engine;

a first generator on at least one shaft coupled to said internal nanofuel engine, and a second generator coupled to at least one turbine, wherein said at least one turbine is coupled to said internal nanofuel engine, wherein said first generator and said second generator are configured to balance electric power produced by said internal nanofuel engine and an exhaust;

a plurality of generators, wherein at least two of said plurality of generators are equivalent;

a generator directly driven by mechanical energy by said internal nanofuel engine, and a generator indirectly driven by exhaust heat; or a generator directly driven by mechanical energy by said internal nanofuel engine, and another generator indirectly driven by exhaust heat, wherein said generator and said another generator are configured to provide balanced electricity production.

\* \* \* \* \*